(12) United States Patent
Fukuta

(10) Patent No.: US 8,472,125 B2
(45) Date of Patent: Jun. 25, 2013

(54) VARIABLE POWER OPTICAL SYSTEM, IMAGING DEVICE, AND DIGITAL DEVICE

(75) Inventor: Yasunari Fukuta, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 455 days.

(21) Appl. No.: 12/741,674

(22) PCT Filed: Nov. 4, 2008

(86) PCT No.: PCT/JP2008/070022
§ 371 (c)(1),
(2), (4) Date: May 6, 2010

(87) PCT Pub. No.: WO2009/063766
PCT Pub. Date: May 22, 2009

(65) Prior Publication Data
US 2010/0265380 A1      Oct. 21, 2010

(30) Foreign Application Priority Data

Nov. 15, 2007   (JP) .................................. 2007-297160
Nov. 15, 2007   (JP) .................................. 2007-297161

(51) Int. Cl.
*G02B 15/14*       (2006.01)
(52) U.S. Cl.
USPC .......................................... 359/689; 359/686

(58) Field of Classification Search
USPC .................................................. 359/686, 689
See application file for complete search history.

(56) References Cited

U.S. PATENT DOCUMENTS

| 5,999,329 A | 12/1999 | Ohtake | 359/686 |
| 2007/0019302 A1 | 1/2007 | Fujisaki | 359/680 |

FOREIGN PATENT DOCUMENTS

| JP | 7-181377 A | 7/1995 |
| JP | 9-179026 A | 7/1997 |
| JP | 09179026 A * | 7/1997 |
| JP | 2004-333572 A | 11/2004 |
| JP | 2005-37935 A | 2/2005 |
| JP | 2006-227129 A | 8/2006 |
| JP | 2007-33555 A | 2/2007 |
| JP | 2007-58054 A | 3/2007 |
| WO | WO 2009/063766 A1 | 5/2009 |

* cited by examiner

*Primary Examiner* — William Choi
(74) *Attorney, Agent, or Firm* — Cozen O'Connor

(57) ABSTRACT

A variable power optical system (1) comprises a first lens group (11) having a negative optical power, a second lens group (12) having a positive optical power, and a third lens group (13). The first to third lens groups are arranged in order from the object side to the image side. The first lens group (11) is composed of one negative lens (111) and is fixed in variable power. The third lens group (13) includes at least one aspherical surface. When the third lens group is divided into a front group and a rear group with the largest air space in the third group, the front group has a negative optical power, and the rear group has a positive optical power.

17 Claims, 36 Drawing Sheets

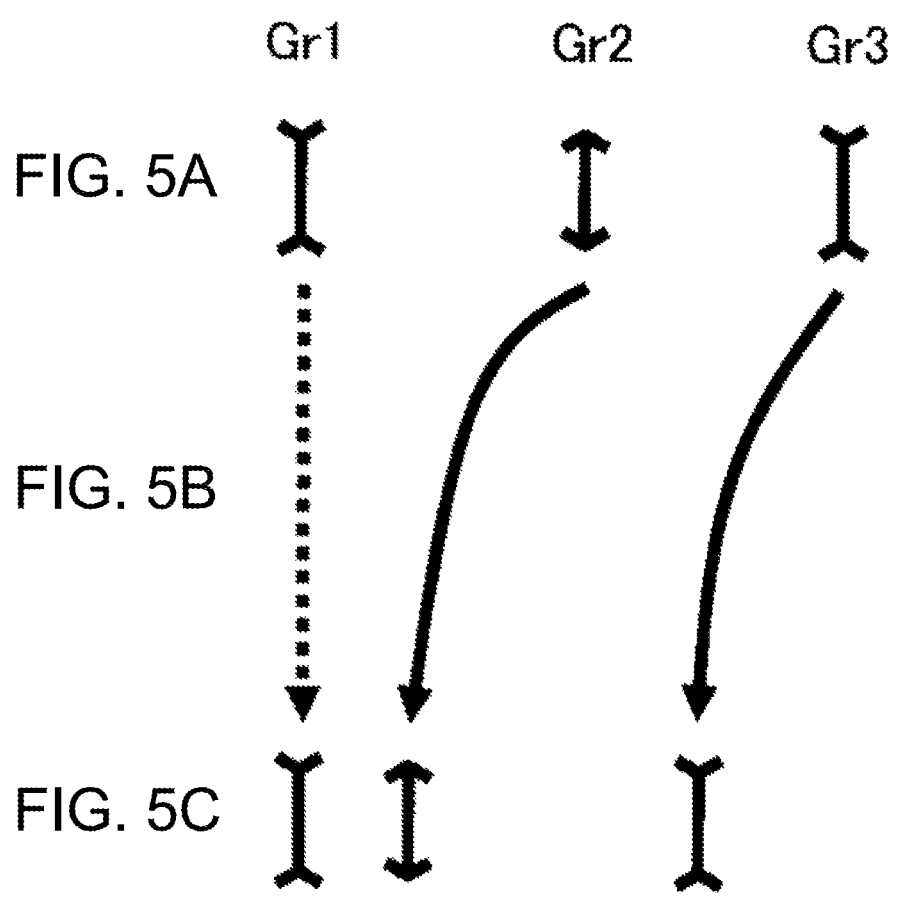

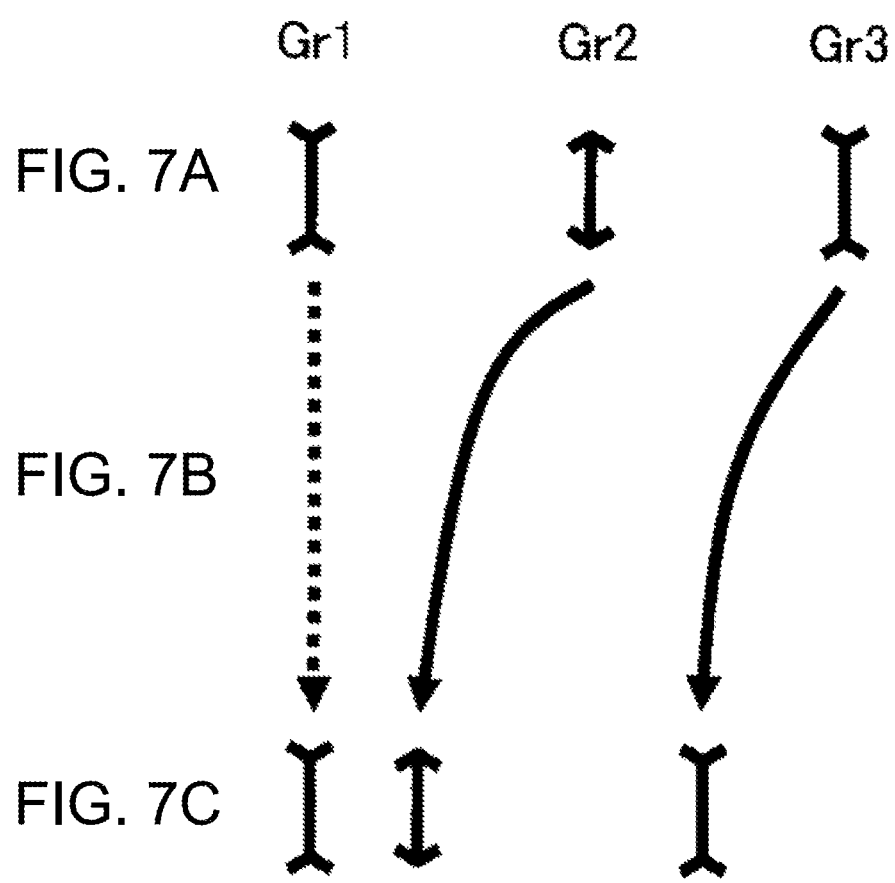

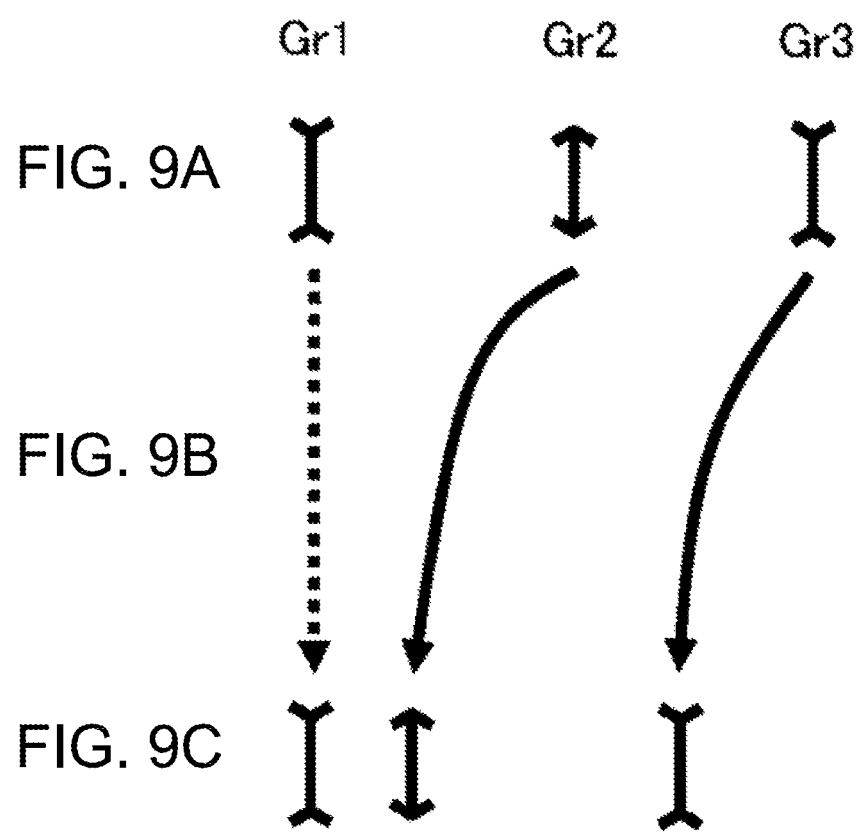

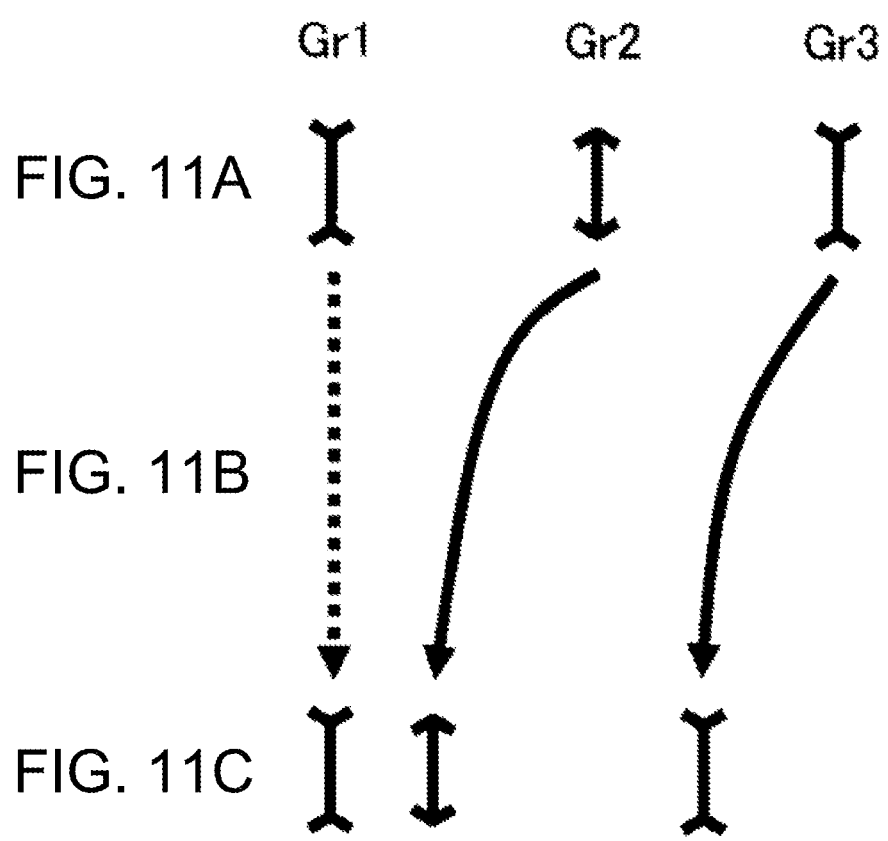

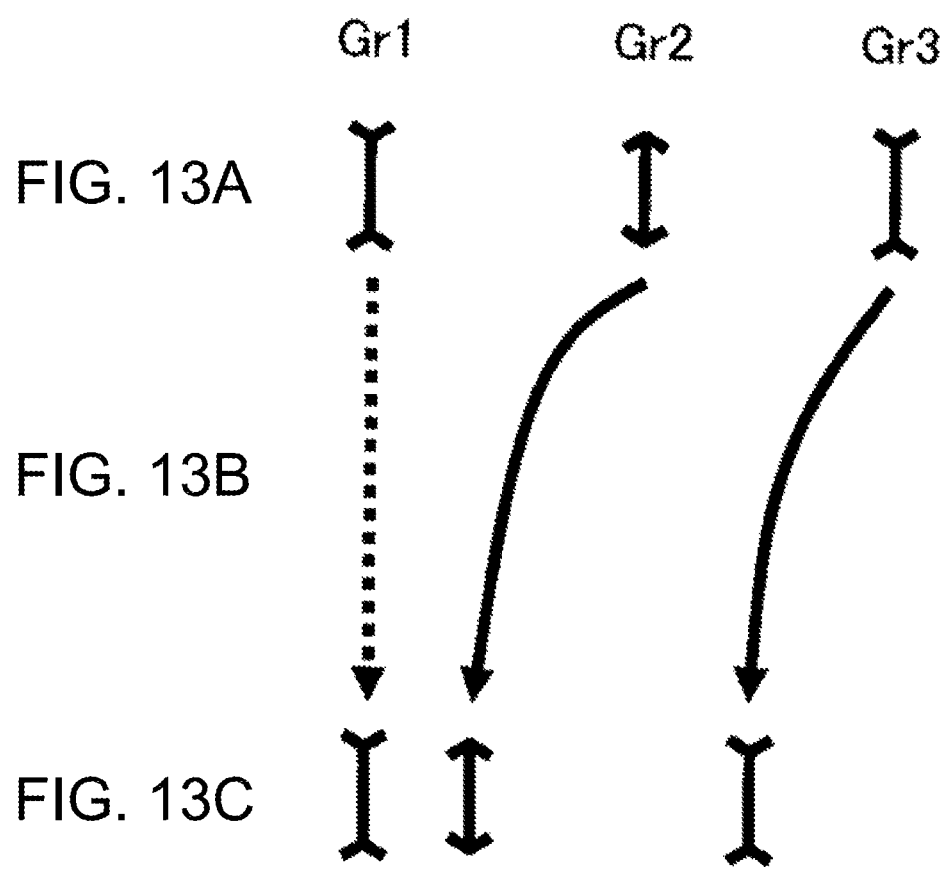

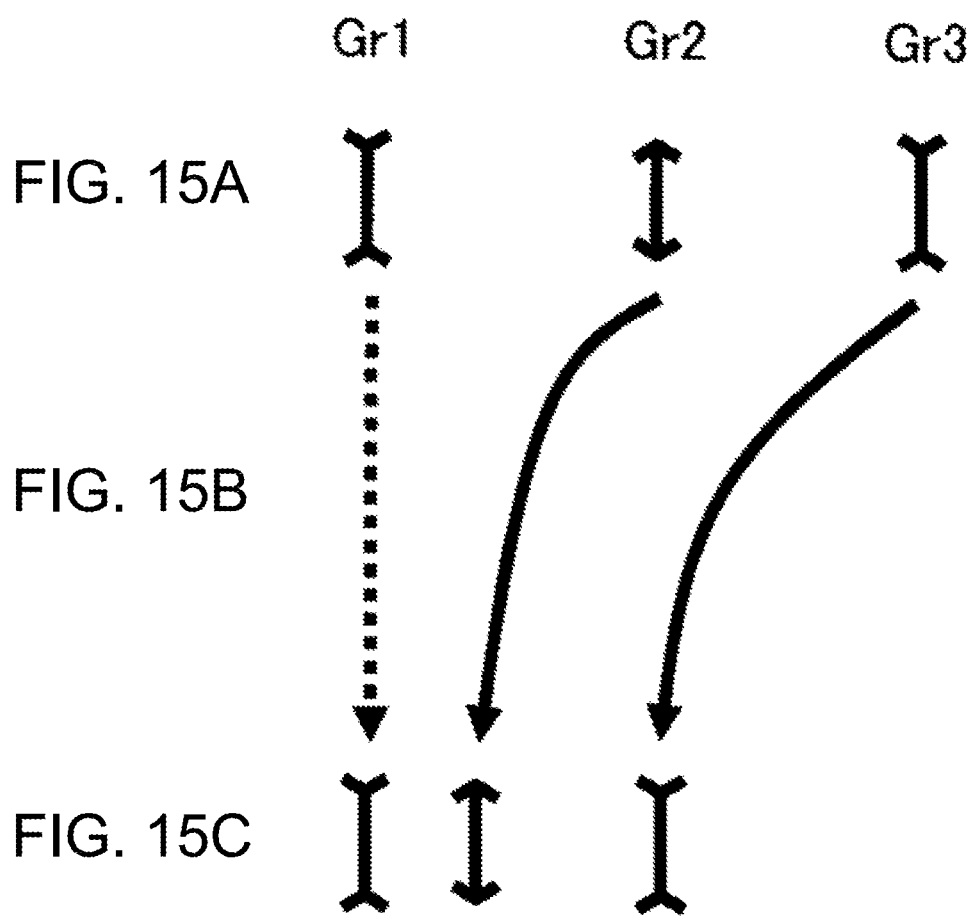

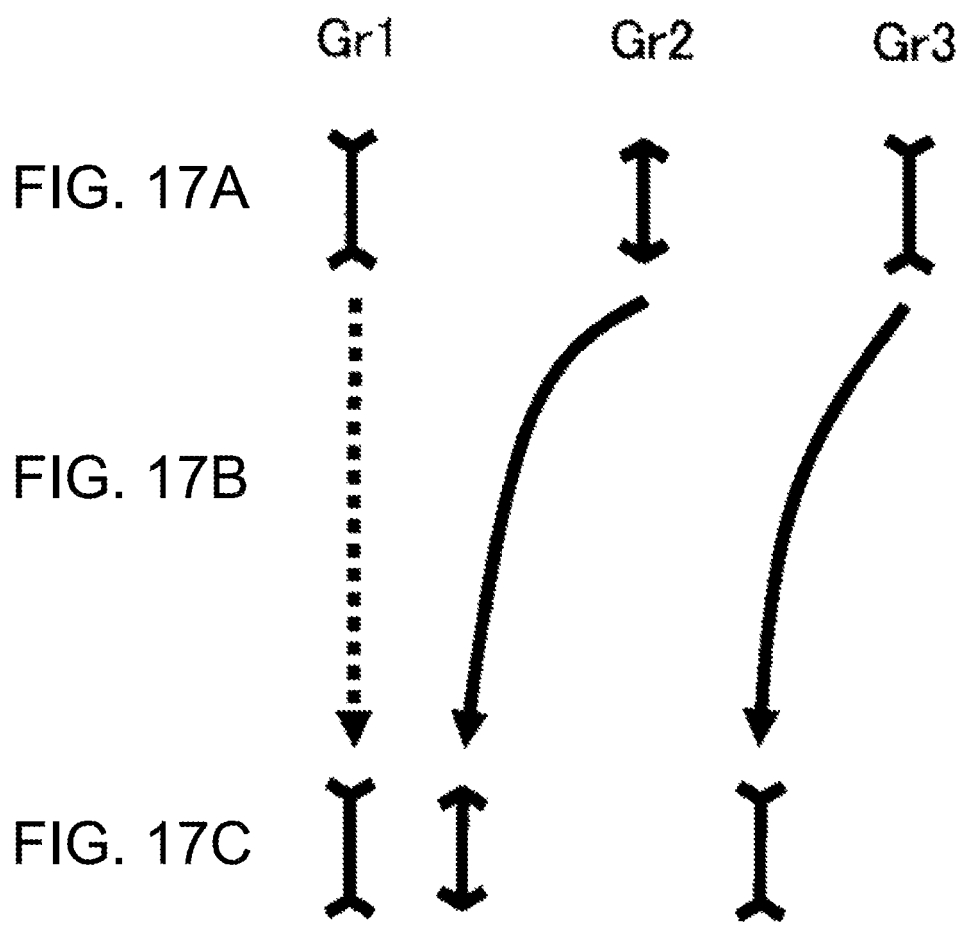

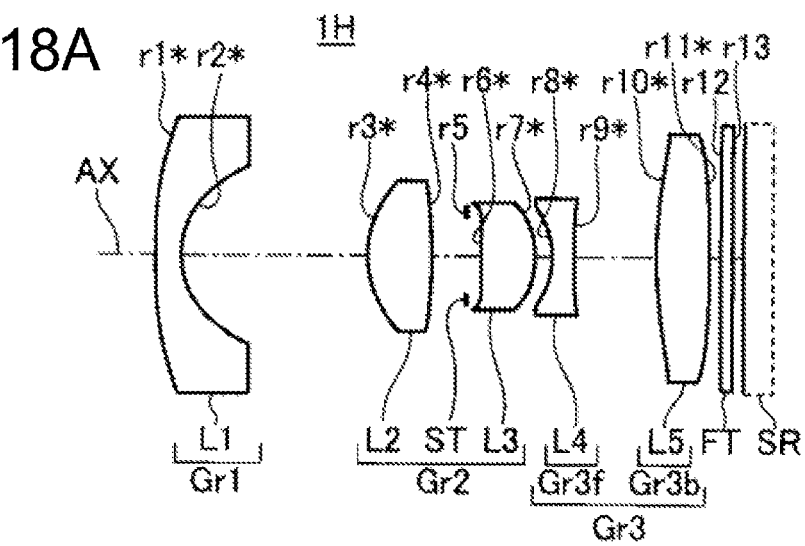
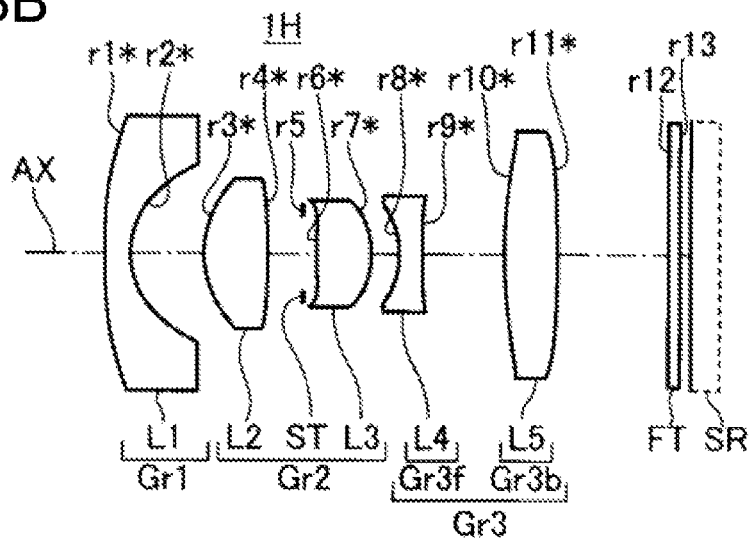
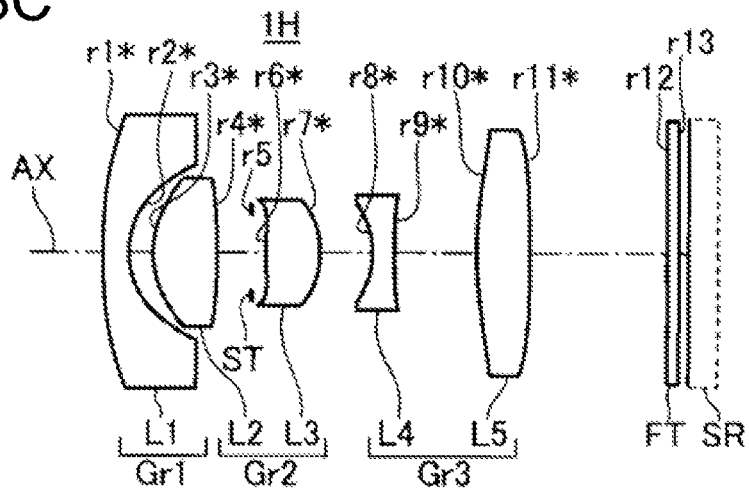

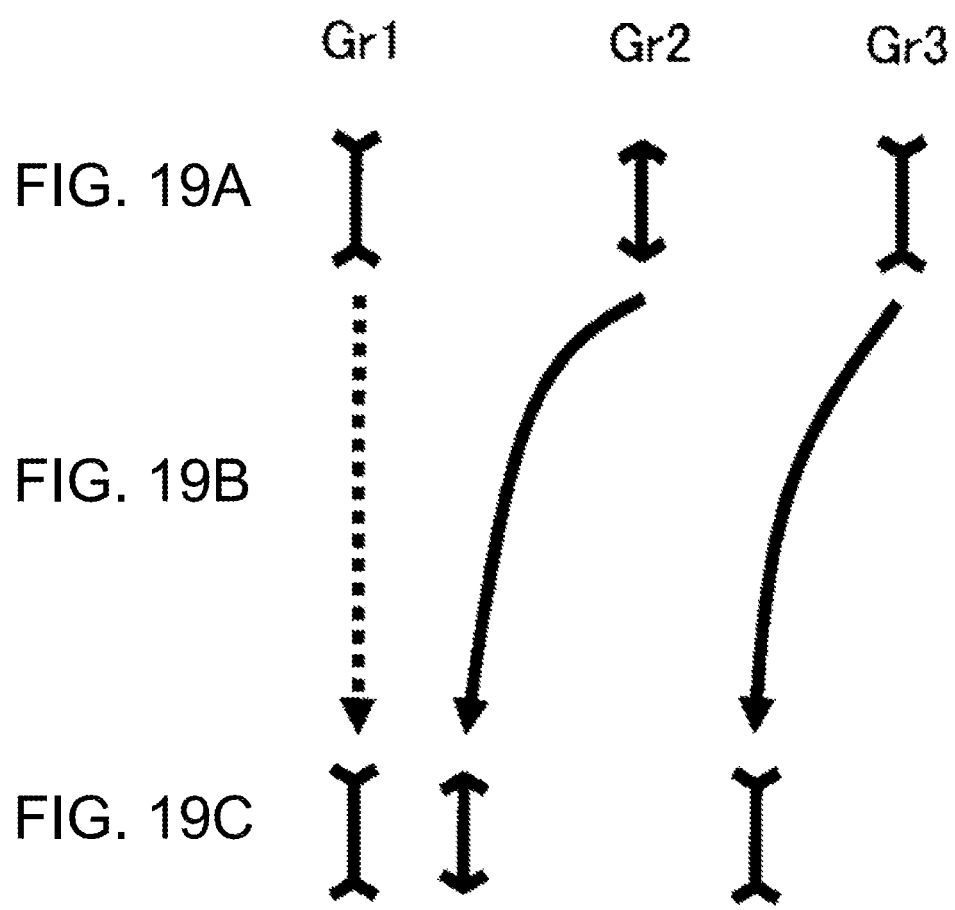

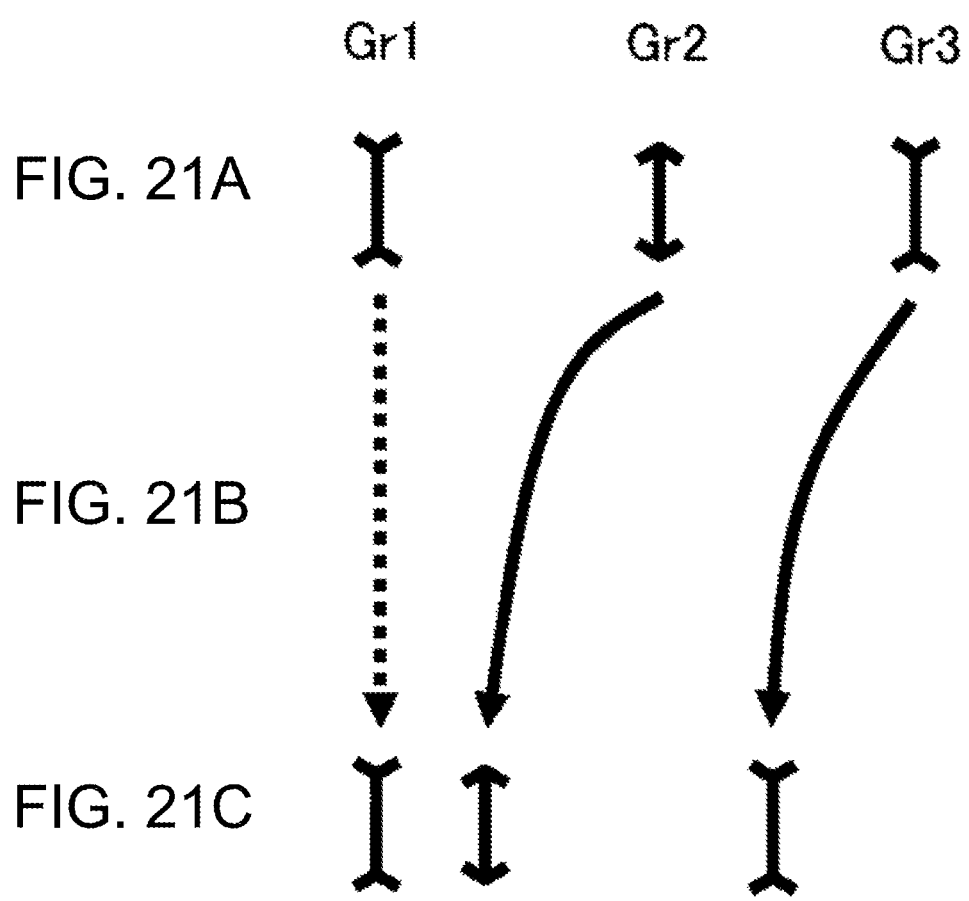

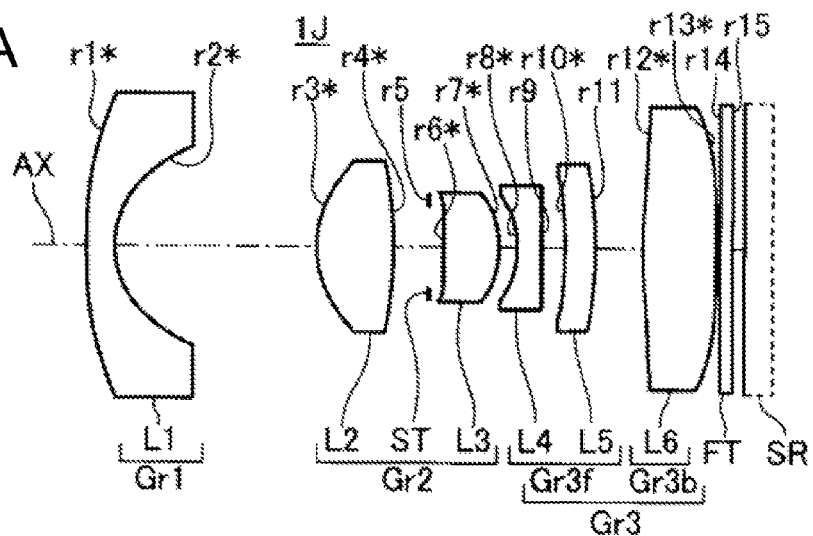
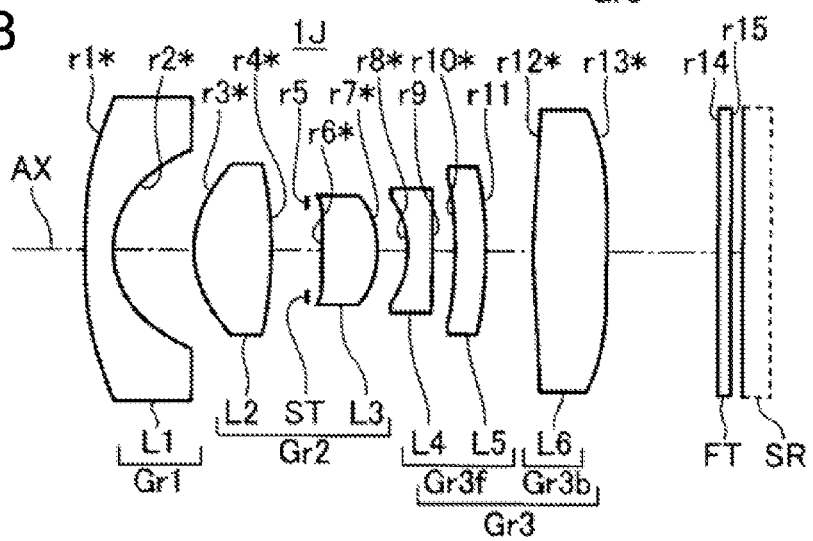
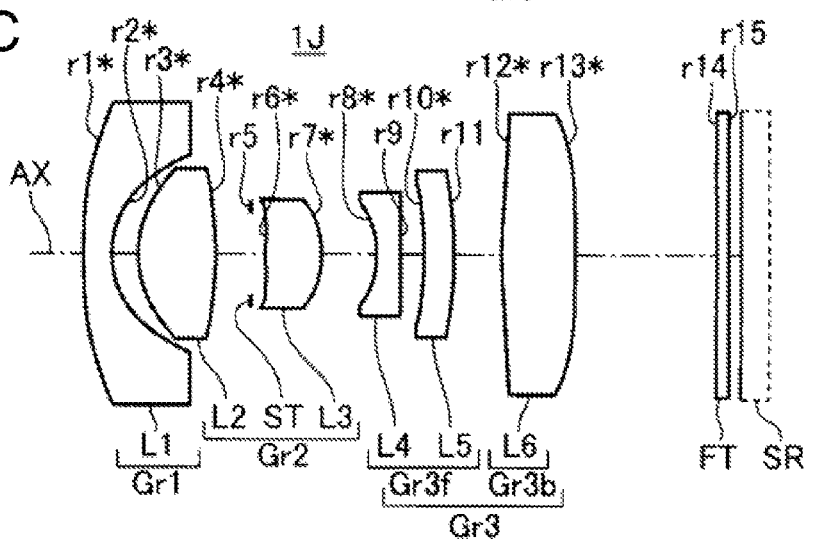

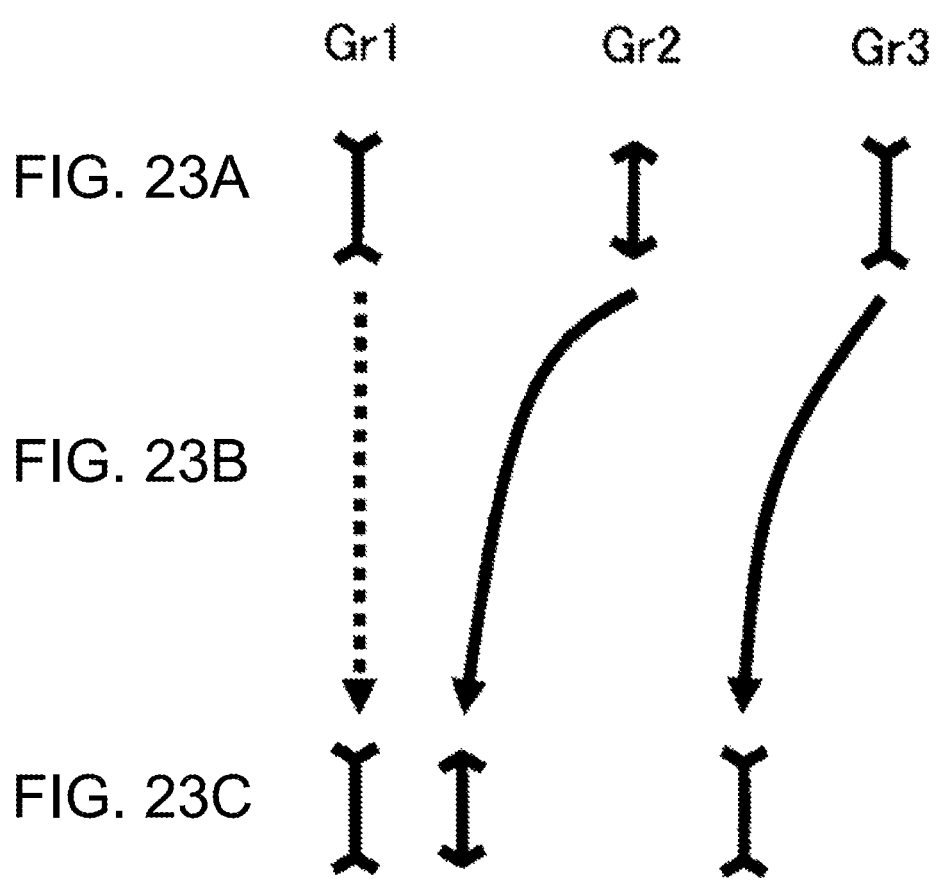

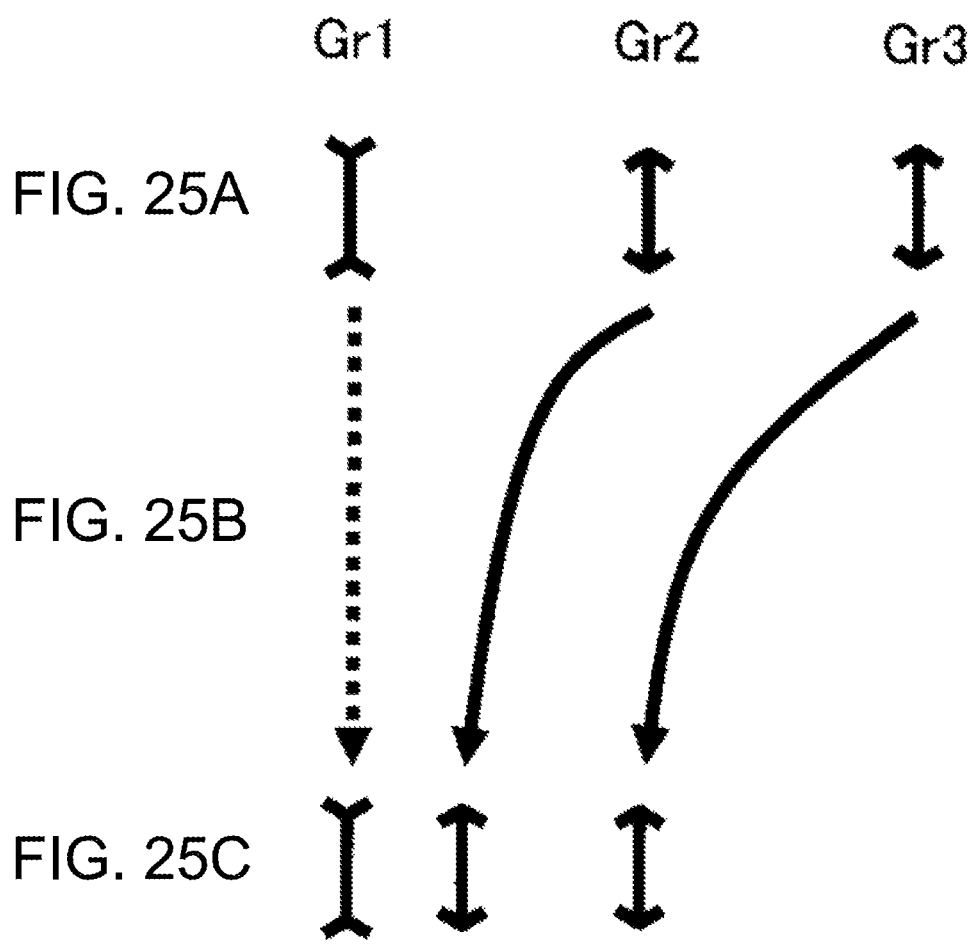

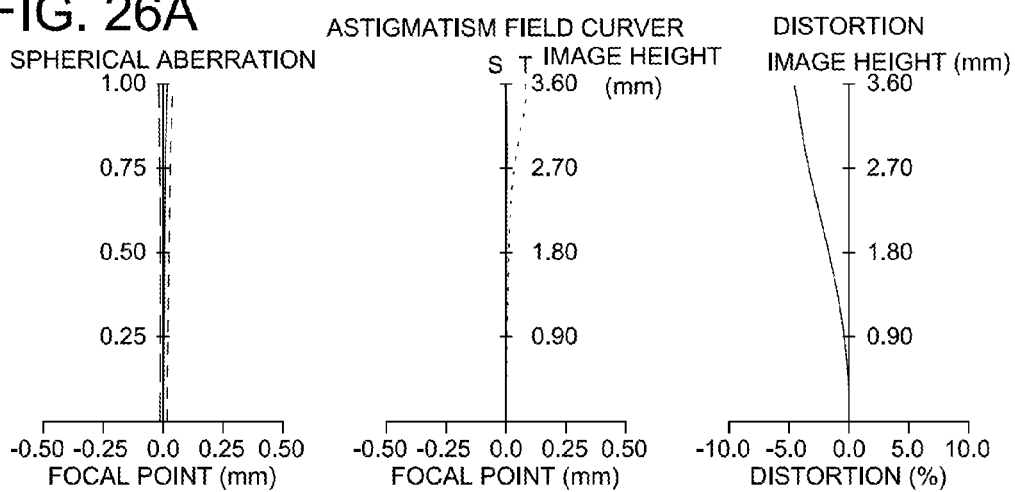
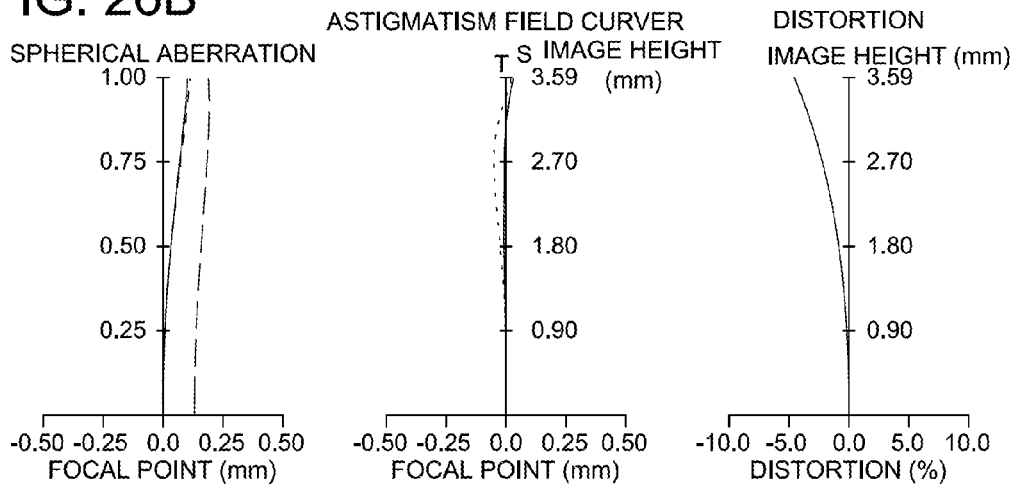
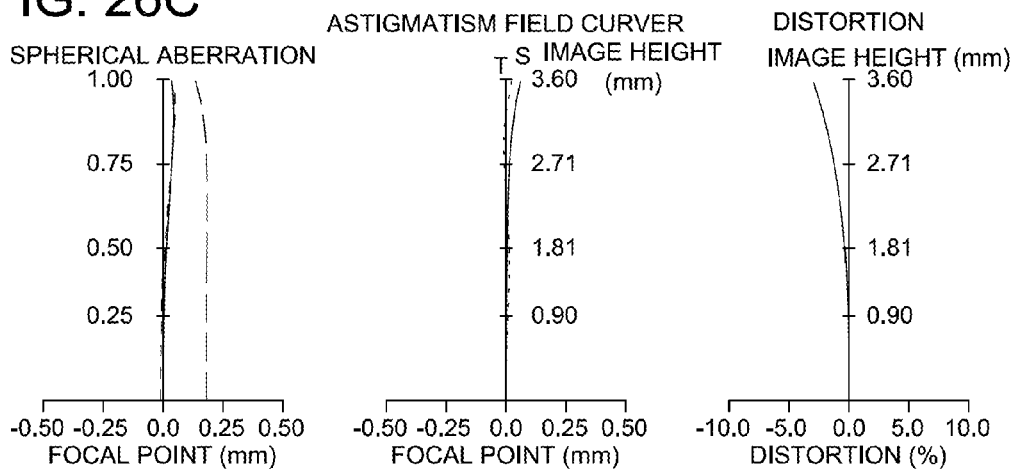

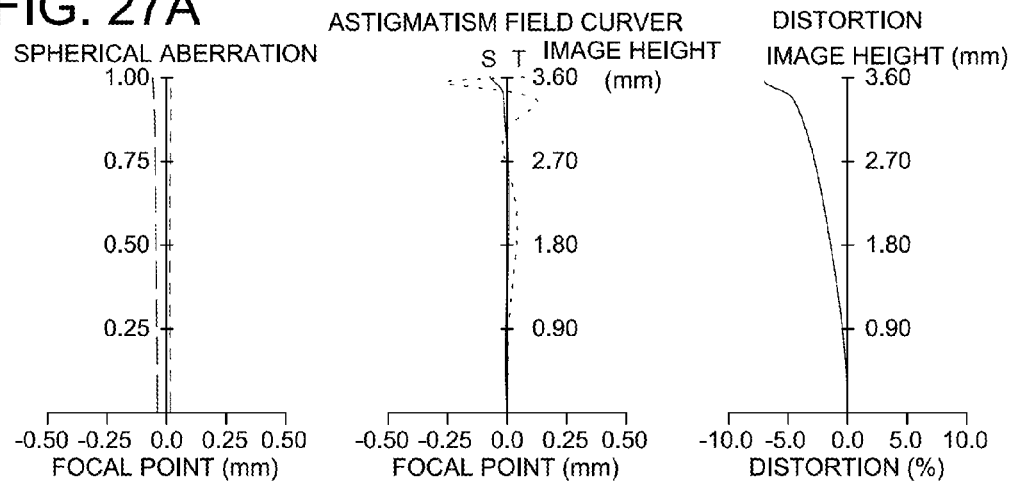
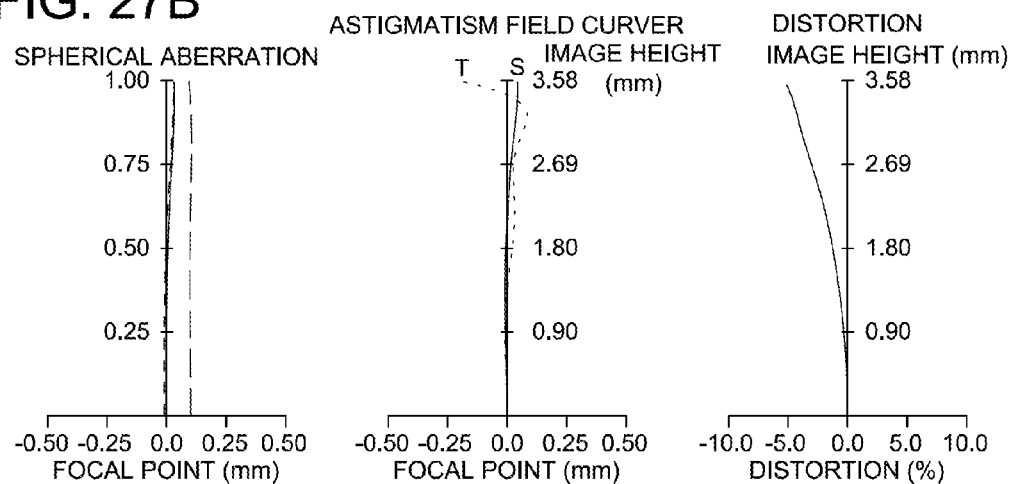
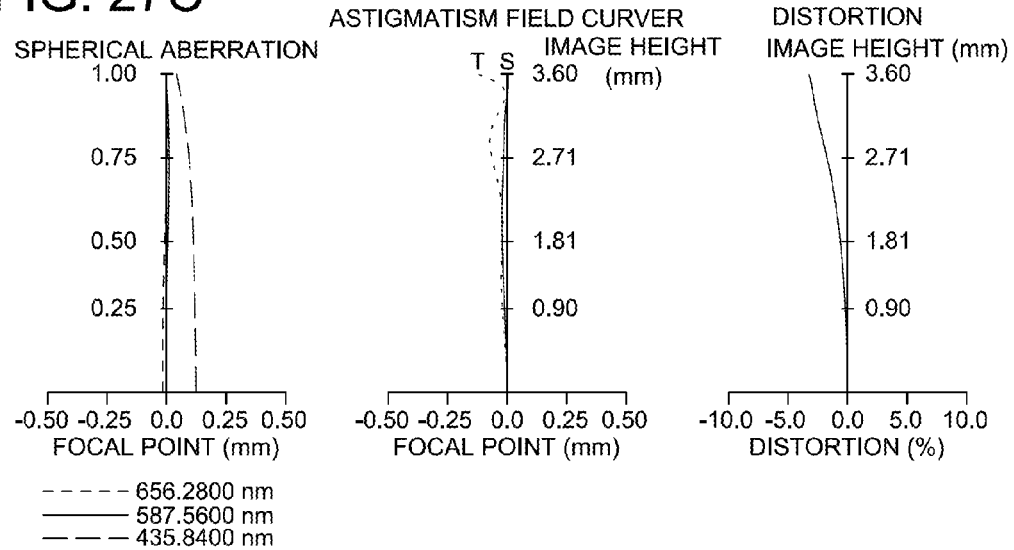

- - - - 656.2800 nm
——— 587.5600 nm
— — 435.8400 nm

----- 656.2800 nm
——— 587.5600 nm
— — — 435.8400 nm

----- 656.2800 nm
——— 587.5600 nm
— — — 435.8400 nm

- - - - - 656.2800 nm
——— 587.5600 nm
— — — 435.8400 nm

VARIABLE POWER OPTICAL SYSTEM, IMAGING DEVICE, AND DIGITAL DEVICE

RELATED APPLICATIONS

This is a U.S. National Phase under 35 U.S.C. §371 of International Application No. PCT/JP2008/070022, filed with in the Japanese Patent Office on Nov. 4, 2008, which claims priority on Japanese Patent Application Nos. 2007-297160, filed on Nov. 15, 2007, and 2007-297161, filed on Nov. 15, 2007.

TECHNICAL FIELD OF THE INVENTION

The present invention relates to variable power optical systems, and in particular, to variable power optical systems that can be made compact. Further, the present invention relates to imaging devices provided with such variable power optical systems, and to digital devices in which such imaging devices are installed.

TECHNICAL BACKGROUND OF THE INVENTION

In recent years, the proliferation is striking of portable terminals provided with communication functions such as mobile telephones, PDA (Personal Digital Assistants), etc., that are portable, and very often imaging devices capable of still image photography or moving image photography such as, for example, digital still cameras or digital movie cameras, etc., are installed in these devices. The restrictions of size (dimensions) and cost on the imaging devices installed in these devices, normally, are very severe. Because of this, compared to the so called independent digital camera, small sized imaging elements with low numbers of pixels are used, and generally an imaging device provided with a single focal point optical system configured using 1 to 3 plastic lenses are adopted. However, advances such as larger numbers of pixels and advanced functions are progressing even in the case of the imaging devices installed in such devices, and because of this, compact variable power optical systems are being demanded that are compatible with imaging elements with large numbers of pixels, and also, that are capable of imaging subjects of photographs distant from the photographer with power ratios exceeding about 2.5 times, and that can be installed in these devices.

As variable power optical systems of imaging devices installed in such devices, there are descriptions, for example, such as in Patent Document 1 to Patent Document 7. A variable power optical system described in Patent Document 1 is an optical system for endoscopes with negative-positive two components with one group fixed. A variable power optical system described in Patent Document 2 is an optical system with negative-positive-negative three components with the feature that the number of constituent lenses is extremely small. A variable power optical system described in Patent Document 3 is an optical system with negative-positive-negative three components in which, relatively, shortening of the overall length has been achieved. A variable power optical system described in Patent Document 4 is an optical system in which, relatively, shortening of the overall length has been achieved, and also, the distortion has been made small. A variable power optical system described in Patent Document 5 is an optical system with negative-positive-negative three components in which the first group is movable. A variable power optical system described in Patent Document 6 is an optical system with negative-positive-negative-positive four components in which the first group is fixed. A variable power optical system described in Patent Document 7 is a variable power optical system with negative-positive-negative-positive four components in which small size is aimed at by making the first group fixed.

Patent Document 1: Japanese Patent Application Publication No. Hei 07(1995)-181377
Patent Document 2: Japanese Patent Application Publication No. 2005-037935
Patent Document 3: Japanese Patent Application Publication No. 2007-058054
Patent Document 4: Japanese Patent Application Publication No. 2007-033555
Patent Document 5: Japanese Patent Application Publication No. 2004-333572
Patent Document 6: Japanese Patent Application Publication No. Hei 09(1997)-179026
Patent Document 7: Japanese Patent Application Publication No. 2006-227129

DISCLOSURE OF THE INVENTION

Problems to be Solved by the Invention

However, in the variable power optical system described in Patent Document 1, although making compact the variable power optical system has been achieved by making one group fixed, the system is extremely wide-angle, even the distortion is relatively large, and also the power ratio is small. Further, in the variable power optical system described in Patent Document 2, the corrections of axial chromatic aberration and chromatic aberration of magnification are not sufficient, and it is difficult to satisfy the high number of pixels of imaging devices of recent years. Further, in the variable power optical system described in Patent Document 3, since the system is too wide-angle, it is not suitable for standard photography but is for special applications. In addition, the distortion at the wide angle end is too large being −40%, the power ratio is small, and also the tele-centric characteristics are bad. Further, in the variable power optical system described in Patent Document 4, the power ratio is small, and also the tele-centric characteristics are bad. Further, in the variable power optical system described in Patent Document 5, the size reduction is not sufficient in both the effective diameter and the overall length. Further, in the variable power optical system described in Patent Document 6, relatively, the overall length is large, and even the size reduction is not sufficient. Further, in the variable power optical system described in Patent Document 7, since the second group and the third group are both formed by one lens each, the corrections of spherical aberration and astigmatism are not sufficient.

In this manner, in the variable power optical systems proposed in Patent Document 1 to Patent Document 7, because compactness was aimed at, the tele-centric characteristics became poor, or the system became too wide-angle limiting the applications, or the power ratio was too small. Further, since the differences in the light beam incidence angles at the time of varying the power become too large, color shading occurs, or the amount of peripheral light decreases. In addition, if attempts are made to achieve wide-angles, from the large number of variable power groups or the amount of movement during power variation, the compactness is not sufficient in terms of the unit volume of the variable power optical system. Further, even if the tele-centric characteristics are enhanced, the aberration correction is not sufficient, and it is difficult to make them compatible with imaging elements with a large number of pixels.

The present invention was made with the above situation in view, and an object of the present invention is to provide a variable power optical system which can, while achieving a relatively high power ratio and compactness, while ensuring an angle of view appropriate for the photographing application at the wide-angle end, can correct better compared to prior art the tele-centric characteristics, difference in the angle of incidence to the imaging element, as well as the different aberrations such as spherical aberration, chromatic aberration, astigmatism, and distortion, etc., and to provide an imaging device and a digital device provided therewith.

Means for Solving the Problems

The present invention, in order to solve the above technical problems, provides a variable power optical system, an imaging device, and a digital device having the following structures. Further, the terminology used in the following explanations is, in the present invention, those defined as follows.

(a) The refractive index is the refractive index for the d-line wavelength (587.56 nm).

(b) When the Abbe number is denoted by vd, and the refractive indices for the d-line, F-line (486.13 nm), and the C-line (656.28 nm) are respectively denoted by nd, nF, and nC, the Abbe number is the one obtained using the following defining equation.

$$vd=(nd-1)/(nF-nC)$$

(c) The expressions related to surface shapes are the expressions based on paraxial curvature.

(d) When expressions such as "concave", or "convex", or "meniscus" are used regarding lenses, these are to be taken as expressions (based on paraxial curvature) of the lens shape in the vicinity of the optical axis (in the vicinity of the center of the lens).

(e) The expression of the optical power of each individual lens constituting a cemented lens is the power when air is on both sides of the lens surface of the individual lens.

(f) The amount of aspherical surface sag expresses the difference between the distance in the direction of the optical axis between the apex point of the lens surface and a point on the aspherical surface curved line relative to the maximum effective radius, and the amount of spherical surface sag based on the paraxial curvature.

(g) Since the plastic material used for a compound type aspherical surface lens has only an additional function to the substrate glass material, it is not handled as an independent optical material, but the handling is equivalent to the case when the substrate glass material has an aspherical surface, and even the number of lenses is taken as one. Further, even the refractive index of the lens is taken as the refractive index of the glass material that is the substrate. A compound type aspherical surface lens is a lens that is made to have an aspherical surface shape by coating a thin plastic material on a glass material that becomes the substrate.

1. A variable power optical system comprising, in order from an object side toward an image side thereof, a first lens group having a negative optical power, a second lens group having a positive optical power and a third lens group, wherein said first lens group is composed of a single negative lens, and is fixed when varying the power of the variable power optical system, and wherein said third lens group comprises at least one aspherical surface, and when the group is divided into a front group and a rear group with the largest air space within the group, said front group has a negative optical power, and said rear group has a positive optical power.

2. The variable power optical system of 1, characterized in that said third lens group satisfies the following conditional expression (1):

$$0.3<Da/D3<0.8 \tag{1}$$

where, Da is the maximum lens spacing within said third lens group, and D3 is, in said third lens group, a distance from a most object side surface to a most image side surface.

3. The variable power optical system of 1 or 2, characterized in that said third lens group has a negative optical power as a whole and satisfies the following conditional expression (2):

$$1<|f3|/fw<3 \tag{2}$$

where, f3 is a composite focal length of said third lens group, and fw is a composite focal length of the entire system at a wide-angle end.

4. The variable power optical system of any one of 1 to 3, characterized in that said first lens group satisfies the following conditional expression (4):

$$1<|f1|/fw<1.5 \tag{3}$$

where, f1 is a composite focal length of said first lens group, and fw is a composite focal length of the entire system at a wide-angle end.

5. The variable power optical system of any one of 1 to 4, characterized in that said negative lens of said first lens group satisfies the following conditional expression (4):

$$40<v1 \tag{4}$$

where, v1 is the Abbe number of said negative lens of said first lens group.

6. The variable power optical system of any one of 1 to 5, characterized in that said negative lens of said first lens group is a negative meniscus lens having a convex surface on its object side.

7. The variable power optical system of any one of 1 to 6, characterized in that a surface on an image side of said negative lens of said first lens group satisfies the following conditional expression (5):

$$0.6<r12/fw<0.8 \tag{5}$$

where, r12 is a radius of curvature of a surface on an image side of said negative lens of said first lens group, and fw is a composite focal length of the entire system at a wide-angle end.

8. The variable power optical system of any one of 1 to 7, characterized in that said first lens group and said third lens group satisfy the following conditional expression (6).

$$0.5<|f1/f3|<1 \tag{6}$$

where, f1 is a composite focal length of said first lens group, and f3 is a composite focal length of said third lens group.

9. The variable power optical system of any one of 1 to 8, characterized in that said third lens group is composed of one negative lens and one positive lens.

10. The variable power optical system of any one of 1 to 9, characterized in that said second lens group has an aperture opening within the group, and when varying the optical power of the variable power optical system the aperture opening moves integrally with said second lens group.

11. The variable power optical system of any one of 1 to 10, characterized in that said first lens group and said second lens group satisfy the following conditional expression (7).

$$1.2<|f1|/f2<3.2 \tag{7}$$

where, f1 is a composite focal length of said first lens group, and f2 is a composite focal length of said second lens group.

12. The variable power optical system of any one of 1 to 11, characterized in that said second lens group satisfies the following conditional expression (8).

$$0.7 < f2/fw < 1 \tag{8}$$

where, f2 is a composite focal length of said second lens group, and fw is a composite focal length of the entire system at a wide-angle end.

13. The variable power optical system of any one of 1 to 12, characterized in that said second lens group comprises at least two positive lenses.

14. The variable power optical system of any one of 1 to 13, characterized in that focusing is made using said second lens group or said third lens group.

15. The variable power optical system of any one of 1 to 14, characterized in that, desirably, said third lens group has a negative optical power as a whole and the variable power optical system consists of three groups of said first to third lens groups.

16. The variable power optical system of any one of 1 to 15, characterized in that when varying the power of the variable power optical system only two lens groups of said three lens groups are movable.

17. An imaging device with the feature that, it is provided with the variable power optical system of any one of 1 to 16 above, and an imaging element that converts optical images to electrical signals, and said variable power optical system can form an optical image of the object on the light receiving surface of said imaging element.

18. A digital device with the feature that, it is provided with the imaging device according to 17 and a control section that can make said imaging device to carry out at least one of still image photography or movie photography of the object of photography, and said variable power optical system of said imaging device is assembled so that an optical image of said object of photography can be formed on the light receiving surface of said imaging element.

Effect of the Invention

According to the present invention, in a variable power optical system having a first lens group having a negative optical power, a second lens group having a positive optical power, and a third lens group having negative optical power, the first lens group is constituted from a single negative lens, and is fixed during power variation, the third lens group is constituted to have, not only at least one aspherical surface, but also a front group having a negative optical power and a rear group having a positive optical power. Because of this, it is possible to provide a variable power optical system, an imaging device, and a digital device, which can, while achieving a relatively high power ratio and compactness, while ensuring an angle of view appropriate for the photographing application at the wide-angle end, can correct better compared to prior art the tele-centric characteristics, difference in the angle of incidence to the imaging element, as well as the different aberrations such as spherical aberration, chromatic aberration, astigmatism, and distortion, etc.

BRIEF DESCRIPTION OF THE DRAWINGS

FIGS. 5A, 5B, and 5C are diagrams showing the form of movement of the different lens groups during power variation of a variable power optical system of the Implementation Example 1.

FIGS. 7A, 7B, and 7C are diagrams showing the form of movement of the different lens groups during power variation of a variable power optical system of the Implementation Example 2.

FIGS. 9A, 9B, and 9C are diagrams showing the form of movement of the different lens groups during power variation of a variable power optical system of the Implementation Example 3.

FIGS. 11A, 11B, and 11C are diagrams showing the form of movement of the different lens groups during power variation of a variable power optical system of the Implementation Example 4.

FIGS. 13A, 13B, and 13C are diagrams showing the form of movement of the different lens groups during power variation of a variable power optical system of the Implementation Example 5.

FIGS. 15A, 15B, and 15C are diagrams showing the form of movement of the different lens groups during power variation of a variable power optical system of the Implementation Example 6.

FIGS. 17A, 17B, and 17C are diagrams showing the form of movement of the different lens groups during power variation of a variable power optical system of the Implementation Example 7.

FIGS. 18A, 18B, and 18C are cross-sectional view diagrams showing an example of the arrangement of lens groups in a variable power optical system according to the Implementation Example 8.

FIGS. 19A, 19B, and 19C are diagrams showing the form of movement of the different lens groups during power variation of a variable power optical system of the Implementation Example 8.

FIGS. 21A, 21B, and 21C are diagrams showing the form of movement of the different lens groups during power variation of a variable power optical system of the Implementation Example 9.

FIGS. 22A, 22B, and 22C are cross-sectional view diagrams showing an example of the arrangement of lens groups in a variable power optical system according to the Implementation Example 10.

FIGS. 23A, 23B, and 23C are diagrams showing the form of movement of the different lens groups during power variation of a variable power optical system of the Implementation Example 10.

FIGS. 25A, 25B, and 25C are diagrams showing the form of movement of the different lens groups during power variation of a variable power optical system of the Implementation Example 11.

FIGS. 26A, 26B, and 26C are aberration diagrams of a variable power optical system of the Implementation Example 1.

FIGS. 27A, 27B, and 27C are aberration diagrams of a variable power optical system of the Implementation Example 2.

| EXPLANATION OF SYMBOLS | |
| --- | --- |
| AX | Optical axis |
| 1, 1A to 1K | Variable power optical system |
| 3 | Digital Device |
| 5 | Mobile telephone |
| 11, Gr1 | First lens group |
| 12, Gr2 | Second lens group |
| 13, Gr3 | Third lens group |
| Gr3f | Front group |
| Gr3b | Rear group |
| 16, SR | Imaging element |
| 21 | Imaging device |

DESCRIPTION OF THE PREFERRED EMBODIMENT

A preferred embodiment of the present invention is explained below with reference to the drawings. Further, in the different diagrams, configurations that have been numbered alike indicate that they are identical configurations, and their explanations are omitted.

Figure 1:
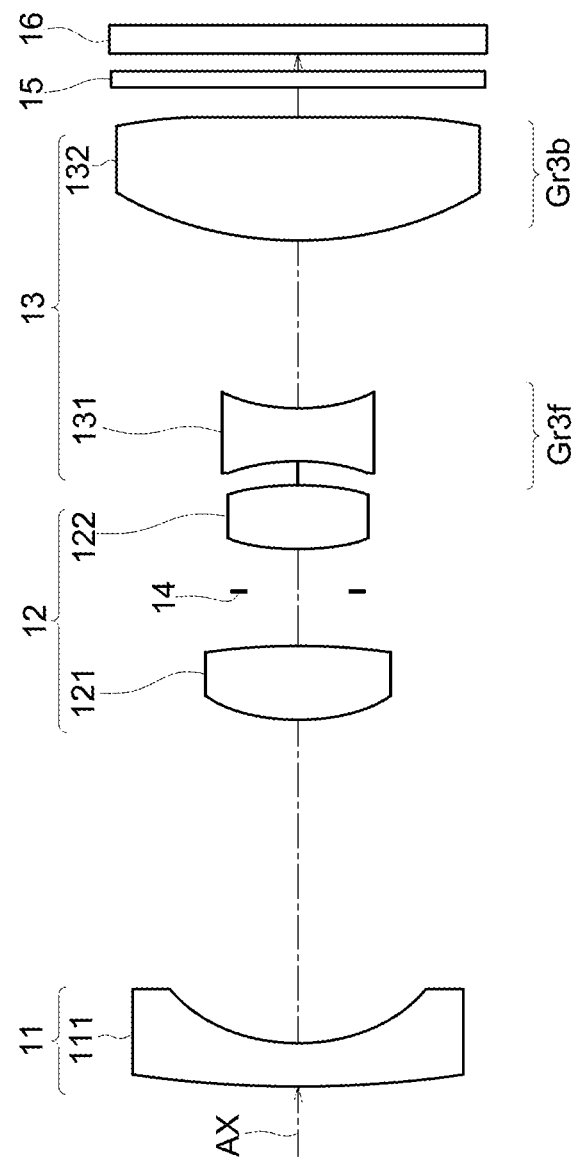
FIG. 1 is a lens cross-sectional view diagram showing its construction, for the sake of explaining a variable power optical system in a preferred embodiment.

FIG. 1 is a lens cross-sectional view diagram showing its construction, for the sake of explaining a variable power optical system in a preferred embodiment.

In FIG. 1, this variable power optical system 1 is a variable optical system that forms an optical image of an object (the photographed object) on the light receiving surface (imaging surface) of an imaging element 16 that converts optical images into electrical signals, and has, in sequence from the object side (left side in the figure) towards the image side (right side in the figure), a first lens group 11 having negative optical power, a second lens group 12 and a third lens group 13 having positive optical powers, and at the time of varying the power, the first lens group 11 is fixed. Further, the variable optical system 1 shown in the example in FIG. 1 has the same construction as the variable power optical system 1A (FIG. 4) of Implementation Example 1 to be described later.

In FIG. 1 an example is shown in which, the first lens group 11 is constituted from a negative meniscus lens 111 which is convex on the object side, the second lens group 12, moves during power variation, and is constituted from, sequentially from the object side towards the image side, a both sides convex positive lens 121, an aperture opening 14 that is movable together with this second lens group 12 during power variation, and a both sides convex positive lens 122, the third lens group 13, moves during power variation, and is constituted from, sequentially from the object side towards the image side, a both sides concave negative lens 131 and a positive meniscus lens 132 which is convex on the object side. Further, when the third lens group 13 is divided at the maximum air space within the third lens group 13 into a front lens group (Gr3*f*) and a rear lens group (Gr3*b*), the front group (Gr3*f*) has a negative optical power and the rear group (Gr3*b*) has a positive optical power. The positive lens 121, the positive lens 122 in the second lens group 12 as well as the negative lens 131 and the positive meniscus lens 132 of the third lens group 13, respectively, have aspherical surfaces on both sides, and also, for example are lenses made of a plastic material.

In such a variable power optical system 1, the first lens group 11 is constituted from a single negative lens. In the example shown in FIG. 1, the first lens group 11 is constituted from a negative meniscus lens 111. Further, in this variable power optical system 1, the third lens group 13, has not only at least one aspherical surface but also at least one lens having a negative optical power, and at least one lens having a positive optical power. Further, when the third lens group 13 is divided at the maximum air space within the third lens group 13 into a front lens group (Gr3*f*) and a rear lens group (Gr3*b*), that front group (Gr3*f*) has a negative optical power and that rear group (Gr3*b*) has a positive optical power. In the example shown in FIG. 1, the negative lens 131 of the third lens group 13 is the front group (Gr3*f*) and the positive meniscus lens 132 of the third group 13 is the rear group (Gr3*b*), and both surfaces are aspherical of both the negative lens 131 and the positive meniscus lens 132.

The variable power optical system 1 according to the present preferred embodiment has three "negative-positive-negative" components in sequence from the object side, which is a so called negative lead optical system, and the placement is the so called retro focus placement with negative-positive sequentially from the object side to the image side. Because of this, this is an advantageous placement for reducing the overall optical length and the diameter of the front lens.

In addition, in this variable power optical system 1, the second and third lens groups 12 and 13 satisfy the following conditional equation (1) when the composite focal length of the second lens group is taken as f2 and the composite focal length of the third lens group is taken as f3.

$$0.3 < f2/|f3| < 0.8 \quad (1)$$

If the overall length is attempted to be shortened while keeping the retro focus placement as it is, the amount of movement of the second lens group 12 will be restricted, and strong optical power will be needed for the second lens group 12 in order to acquire a high power ratio. Because of this, if a strong optical power is used for the second lens group 12, along with the reduction in the overall length, there is a trend of an increased wide angle of view. As a result, if an attempt is made to achieve compactness, the applications become limited due to an increased wide angle of view. However, in the present variable power optical system 1, next to the second lens group 12 (in the succeeding stage) a third lens group 13 with negative optical power is placed, and by exceeding the lower limit of the conditional equation (1), it is possible to appropriately control the optical powers of the second and third lens groups 12 and 13. As a result of this, while being compact, the system does not become too wide angled. On the other hand, by being less than the upper limit of the conditional equation (1), since the light beam emitted from the second lens group 12 is not bent wide by the third lens group 13, even when there is a fine eccentricity of the third lens group 13, in the present variable power optical system, it is possible to realize an optical system with small deterioration in its performance. Further, it is possible to prevent the deterioration of the tele-centric characteristics occurring due to the optical power of the third lens group 13 becoming too strong.

Further, if, the overall length is tried to be shortened, since the position of the exit pupil necessarily comes closer to the imaging surface, the deterioration particularly of the tele-centric characteristics becomes pronounced, causing a drop in the peripheral exposure or the occurrence of color shading (color striations), etc. However, in the present variable power optical system 1, since inside the third lens group 13 there is not only at least one negative optical power lens (the negative lens 131 in the example shown in FIG. 1) but also at least one positive optical power lens (the positive meniscus lens 132 in the example shown in FIG. 1), and also, since they have aspherical surfaces, it is possible to converge the light beam outside the axis, and to improve the tele-centric characteristics effectively.

Further, from the point of view of acquiring an appropriate angle of view and tele-centric characteristics while being compact, it is still more desirable that the variable power optical system 1 satisfies the following conditional equation (1').

$$0.5 < f2/|f3| < 0.7 \quad (1')$$

Further, if, the first lens group 11 is made a movable group, on the outside in the diagonal direction of this first lens group 11, it is necessary to place a driving device for driving this first lens group 11. However, in the present variable power optical system 1, since the first lens group 11 is fixed at the time of varying the power, there is no need to place a driving device on the outside for driving this first lens group 11, and it becomes possible to reduce the size in the outer direction. In addition, since the first lens group 11 is constituted from a single negative meniscus lens 111, it is possible to make the mechanical construction supporting the lens a simple one, and it is possible to reduce the size in the outer direction to the minimum limit. Further, by reducing the number of constituent lenses in the first lens group 11 that has a trend of increasing the effective diameter even in the entire lens system, it is possible to reduce the cost.

Further, if, the first lens group 11 is made fixed, the path of the light beam that passes through the first lens group 11 becomes limited, and the capacity of aberration correction becomes greatly reduced. In particular, when a wide angle of view is attempted to be achieved, this trend becomes pronounced. However, in the present variable power optical system 1, after the second lens group 12 (in the succeeding stage), since a third lens group 13 is provided which is made of a front group (Gr3*f*) having a negative lens 131 with a negative optical power and a rear group (Gr3*b*) having a positive meniscus lens 132 with a positive optical power, it becomes possible, while achieving a compact size, to improve the various aberrations. In more concrete terms, when the first lens group 11 is constituted from a single fixed negative lens, it is difficult to correct off-axis aberrations, and in particular, it is difficult to correct the field curvature aberrations and distortions. However, in the present variable power optical system 1, since a both sides concave negative lens 131 has been placed as the front group (Gr3*f*) with a negative optical power inside the third lens group 13, the Petzval sum is decreased, and it is possible to decrease the field curvature aberration. On the other hand, if such a group having a negative optical power is placed, the light beam is strongly diverged, and the tele-centric characteristics are deteriorated. However, in the present variable power optical system 1, since a positive meniscus lens 132 with a positive optical power has been placed as a rear group (Gr3*b*) within the third lens group 13, the light beam is converged, and it becomes possible to realize tele-centric characteristics. Further, by providing a spacing between the front group (Gr3*f*) having a negative optical power and a rear group (Gr3*b*) having a positive optical power, it becomes possible to separate the interval between the mutual principal points of the groups, the power is weakened, and it becomes possible to improve the aberration balance. In addition, near the imaging surface, by providing at least one aspherical surface within the third lens group 13 in which the light beam passes through at a position away from the optical axis, it becomes possible to effectively correct the distortion.

In addition, on the image side of this variable power optical system 1, a filter 15 or an imaging element 16 are provided. The filter 15 is a parallel plate type optical element, and is a schematic expression used for denoting various types of optical filters, the cover glass of the imaging element, etc. According to the purpose of use, the imaging element, the camera configuration, etc., it is possible to appropriately place an optical filter such as a low pass filter, an infrared cut off filter, etc. The imaging element 16 is an element that carries out photoelectric conversion into a video signal of the different components of R (red), G (green), and B (blue) corresponding to the quantity of light in the optical image of a photographed object imaged by this variable power optical system and outputs to a prescribed image processing circuit (not shown in the figure). Because of these, the optical image on the image side of the photographed object is guided by the variable power optical system along its optical axis AX with an appropriate power ratio to the light receiving surface of the imaging element 16, and the optical image of the photographed object is photographed by the imaging element 16.

Further, in the present variable power optical system 1, the lens 111 of the first lens group 11 is a negative meniscus lens with its convex surface facing towards the object. Therefore, by placing a negative meniscus lens with its convex side towards the object side as the first lens in the first lens group, the angle of incidence of the light beam becomes small, and it becomes possible to make the spherical aberration small.

Further, in the present variable power optical system 1, the second lens group 12 has at least the two positive lenses 121 and 122. Normally, if compactness is pursued, in order to suppress the amount of movement of the power varying groups, the optical power of the positive lenses within the second lens group 12 becomes large. In the present variable power optical system 1, by constituting the second lens group 12 with a positive optical power using at least two positive lenses 121 and 122, it is possible to reduce the load of positive optical power on each of the positive lenses, and it is possible to reduce the various aberrations. In particular, it is possible to reduce spherical aberrations and coma aberrations.

Further, in the present variable power optical system 1, the positive lenses 121 and 122 within the second lens group 12 have aspherical surfaces. Therefore, it is possible to satisfactorily correct the spherical aberrations and coma aberrations that are caused due to the increase in the optical power of the second lens group 12 due to size reduction.

In addition, in the present variable power optical system 1, the second lens group 12, has inside it an aperture opening 14, and this aperture opening 14 moves integrally with the second lens group 12 at the time of varying the optical power. Therefore, by placing an aperture opening 14 inside the second lens group 12 having a positive optical power in a three component construction of negative-positive-positive, it is possible to obtain nearly symmetric placement of optical power with the aperture opening 14 at the center. Because of this, it is possible to effectively reduce distortion and chromatic aberration of magnification.

In addition, in the present variable power optical system 1, the third lens group 13 is constituted from one negative lens 131 and one positive lens 132. Therefore, by constituting the third lens group 13 which is a movable group using two lenses, as a result of making the lens elements light in weight, it is possible to reduce the load on the driving device (not shown in the figure) for driving the third lens group 13. Because of this, it is possible to make the size of the driving device small.

Further, in the present variable power optical system 1, focusing is made using the second lens group 12 or the third lens group 13. Therefore, by carrying out focusing using the second lens group 12 or the third lens group 13, it becomes possible to obtain clear images even of very near objects without increasing the overall optical length due to extending out and without inviting an increase in the diameter of the front lens.

In addition, in the present variable power optical system 1, there are only two groups that are movable at the time of varying the optical power. Therefore, by limiting the two movable groups as a power varying group and an image correction group due to zooming, it is possible to reduce the volume taken up by the driving devices that drive each of the lens groups, and as a result, it is possible to reduce the volume of the unit. Here, it is not necessary that the functions of the two groups are completely separated into a power varying group and an image correction group, the two groups can mutually have the functions of each other.

Further, in the present variable power optical system 1, two or more lenses, in the present preferred embodiment, the four lenses 121, 122, 131, and 132, are constituted from a plastic material. Therefore, this is excellent from the point of view of cost and productivity.

Further, in a variable power optical system 1 with this type of construction, it is desirable that, when Da is taken to denote the maximum lens spacing within the third lens group 13, and D3 is, in the third lens group 13, the maximum distance from the surface on the object side to the surface on the image side, the third lens group 13 satisfies the following conditional equation (2).

$$0.3 < Da/D3 < 0.8 \quad (2)$$

By being less than the upper limit in the conditional equation (2), it is possible to make small the overall optical length of the third lens group 13, and to reduce the overall size of the variable power optical system 1. On the other hand, by exceeding the lower limit in the conditional equation (2), it is possible to increase the spacing of principal points of the front and rear lens groups with the maximum lens spacing within the third lens group 13 at the center, and to weaken the optical power of each lens group.

Further, from the point of view of making the variable power optical system 1 compact, it is desirable that the variable power optical system 1 satisfies the following conditional equation (2').

$$0.3 < Da/D3 < 0.5 \quad (2')$$

Further, in a variable power optical system 1 with this type of construction, it is desirable that, the third lens group 13 on the whole has a negative optical power, and when the composite focal distance of the third lens group 13 is taken as f3 and the composite focal distance of the entire system at the wide-angle end is taken as fw, the third lens group 13 satisfies the following conditional equation (3).

$$1 < |f3|/fw < 3 \quad (3)$$

By being less than the upper limit in the conditional equation (3), it becomes possible to lengthen the composite focal distance of the first and second lens groups 11 and 12, and to prevent the angle of view becoming too wide. On the other hand, by exceeding the lower limit in the conditional equation (3), without the optical power of the third lens group 13 becoming too strong, and without the need for adopting an extreme optical power ratio in the positive lens and negative lens within the third lens group 13, it becomes possible to prevent the deterioration in the performance due to fine lens eccentricities. Because of this, assembling at the time of manufacturing becomes easy.

Further, in order to obtain a more appropriate angle of view and ease of assembling, it is desirable that the variable power optical system 1 satisfies the following conditional equation (3'), and it is still more desirable that it satisfies the following conditional equation (3").

$$1<|f3|/fw<2 \tag{3'}$$

$$1<|f3|/fw<1.5 \tag{3''}$$

Further, in a variable power optical system 1 with this type of construction, it is desirable that, when the composite focal distance of the first lens group 11 is taken as f1 and the composite focal distance of the entire system at the wide-angle end is taken as fw, the first lens group 11 satisfies the following conditional equation (4).

$$1<|f1|/fw<1.5 \tag{4}$$

By being less than the upper limit in the conditional equation (4), without the optical power of the first lens group 11 becoming too weak, it is possible to make the front lens diameter small. On the other hand, by exceeding the lower limit in the conditional equation (4), without the radius of curvature of the lens constituting the first lens group 11 becoming too small, or without having to make the number of lenses large in order to weaken the optical power of each lens, it is possible to lower the difficulty of manufacturing and cost.

In addition, from the point of view of making further small the front lens diameter without the optical power of the first lens group 11 becoming too weak, it is desirable that the variable power optical system 1 satisfies the following conditional equation (4').

$$1<|f1|/fw<1.3 \tag{4'}$$

Further, in a variable power optical system 1 with this type of construction, it is desirable that, the negative lens of the first lens group 11, the meniscus lens 111 in the example shown in FIG. 1, when its Abbe number is denoted by v1, satisfies the following conditional equation (5).

$$40<v1 \tag{5}$$

By exceeding the lower limit of this conditional equation (5), it is possible to reduce the axial chromatic aberration and chromatic aberration of magnification.

Further, from the point of view of further reducing the axial chromatic aberration and chromatic aberration of magnification, it is still more desirable that the variable power optical system 1 satisfies the following conditional equation (5').

$$50<v1 \tag{5'}$$

Further, in a variable power optical system 1 with this type of construction, it is desirable that, the negative lens of the first lens group 11, the meniscus lens 111 in the example shown in FIG. 1, when the radius of curvature of its surface on the image side is taken as r12, and the composite focal distance of the entire system at the wide-angle end is taken as fw, the surface on the image side of the negative meniscus lens 111 satisfies the following conditional equation (6).

$$0.6<r12/fw<0.8 \tag{6}$$

By being less than the upper limit of the conditional equation (6), it is possible to reduce the Petzval sum, and to make the field curvature small. On the other hand, by exceeding the lower limit in the conditional equation (6), it is possible to prevent an increase in the manufacturing difficulty due to the radius of curvature of the surface becoming too small.

Further, in a variable power optical system 1 with this type of construction, it is desirable that, when the composite focal distance of the first lens group 11 is taken as f1 and the composite focal distance of the third lens group 13 is taken as f3, the first lens group 11 and the third lens group 13 satisfy the following conditional equation (7).

$$0.5<|f1/f3|<1 \tag{7}$$

By being less than the upper limit of the conditional equation (7), it is possible to suppress the Petzval sum to a small value, and to make the field curvature small. On the other hand, by exceeding the lower limit in the conditional equation (7), it is possible to shorten the overall length while not becoming too wide angled.

Further, from the point of view of making the field curvature still smaller, it is desirable that the variable power optical system 1 satisfies the following conditional equation (7').

$$0.5<|f1/f3|<0.9 \tag{7'}$$

Further, in a variable power optical system 1 with this type of construction, it is desirable that, when the composite focal distance of the first lens group 11 is taken as f1 and the composite focal distance of the second lens group 12 is taken as f2, the first lens group 11 and the second lens group 12 satisfy the following conditional equation (8).

$$1.2<|f1|/f2<3.2 \tag{8}$$

By being less than the upper limit of the conditional equation (8), it is possible to realize a high power ratio while making small the effective diameter of the first lens group 11. On the other hand, by exceeding the lower limit in the conditional equation (7), it is possible to make small the field curvature without the so called Petzval sum becoming too large. In addition, in particular, on the telephoto side, the spherical aberration generated in the first lens group 11 can be canceled out by the second lens group 12, and it is possible to acquire satisfactory performance over the entire screen.

Further, from the point of view of realizing a high power ratio while making small the effective diameter of the first lens group 11 still further, it is desirable that the variable power optical system 1 satisfies the following conditional equation (8'), and it is still more desirable that it satisfies the following conditional equation (8").

$$1.2<|f1|/f2<2.1 \tag{8'}$$

$$1.2<|f1|/f2<1.5 \tag{8''}$$

Further, in a variable power optical system 1 with this type of construction, it is desirable that, when the composite focal distance of the second lens group 12 is taken as f2 and the composite focal distance of the entire system at the wide-angle end is taken as fw, the second lens group 12 satisfies the following conditional equation (9).

$$0.7<f2/fw<1 \tag{9}$$

By being less than the upper limit of the conditional equation (9), it is possible to reduce the 1movable distance of the second lens group 12 without making the optical power of the second lens group 12 too weak even while having a high power ratio, and it is possible to realize compactness of the overall length. On the other hand, by exceeding the lower limit of the conditional equation (9), without making the optical power of the second lens group 12 too strong, without the radius of curvature of the lenses constituting the second lens group 12 becoming too small, and without having to increase the number of lenses in order to weaken the optical power of each of the lenses, it is possible to reduce the manufacturing difficulty and cost.

Further, from the point of view of making it still more compact, it is still more desirable that the variable power optical system 1 satisfies the following conditional equation (9').

$$0.7<f2/fw<0.9 \tag{9'}$$

Further, in a variable power optical system 1 with this type of construction, it is desirable that the third lens group 13 has on the whole a negative optical power, and the variable power optical system 1 is constituted only from the three groups of the first to third lens groups.

Normally, when small size is aimed at, due to the limitations in manufacturing, since the lenses definitely occupy a certain amount of space, the space occupation rate of the lenses with respect to the overall space of the lens unit becomes relatively high. Because of this, even if the accuracy of the individual lenses is made high, it is necessary to reduce to the maximum possible extent the number of groups and the number of lenses. In a variable power optical system 1 with this type of construction, by having negative-positive-negative three components, more than other zoom types, it is possible to optimize the balance of compactness and high performance, focusing performance, manufacturing error sensitivity, and tele-centric characteristics of the image incidence angle.

Further, in a variable power optical system 1 with this type of construction, from the point of view of using it in a camera with the purpose of photographing scenery and portraits of persons, when the overall angle of view at the wide angle end is 2ωw, it is desirable that the variable power optical system 1 satisfies the following conditional equation (10).

$$40 < 2\omega w < 94 \quad (10)$$

On the other hand, in a variable power optical system 1 with this type of construction, from the point of view of using it in a camera that requires a wide angle of view, for example, a monitoring camera, etc., when the overall angle of view at the wide angle end is 2ωw, it is desirable that the variable power optical system 1 satisfies the following conditional equation (10').

$$94 < 2\omega w \quad (10')$$

Further, in a variable power optical system 1 with this type of construction, it is desirable that the first lens group 11 has at least one aspherical surface. By having a construction like this, it is possible to effectively reduce the negative distortion generated in a negative lens, and also possible to reduce the astigmatism.

Further, in a variable power optical system 1 with this type of construction, when the composite focal distance of the entire system at the wide-angle end is taken as fw, and the composite focal distance of the entire system at the telescope end is taken as ft, in the first lens group 11, it is desirable that the thickness T1 along the optical axis from the surface closest to the object side to the surface closest to the image side satisfies the following conditional equation (11).

$$0.5 < T1/(fw \times ft)^{0.5} < 1 \quad (11)$$

When less than the lower limit of the conditional equation (11), since the core thickness is thin in each lens within the first lens group 11 which has a large lens external diameter, the lens manufacturing difficulty increases. On the other hand, when the upper limit of the conditional equation (11) is exceeded, the thickness of the first lens group 11 becomes too much, and the overall length becomes too large.

Further, in a variable power optical system 1 with this type of construction, for the driving of the second and third lens groups 12 and 13, or the optical aperture 14, or the shutter (not shown in the figure), etc., it is possible to use a cam, or a stepping motor, etc., or else, it is possible to use a piezoelectric actuator. When a piezoelectric actuator is used, while suppressing the increase in the volume of the driving device and the power consumption, it is also possible to drive each group independently, and it is possible to attempt to make the imaging device still more compact.

Further, in a variable power optical system 1 with this type of construction, it is desirable that all the lens surfaces that are in contact with air are aspherical surfaces. Because of this construction, it is possible to achieve both compactness and high image quality.

Further, in a variable power optical system 1 with this type of construction, it is desirable that this variable power optical system 1 is constructed from 6 or fewer lenses. By constructing in this manner, it is possible to achieve both shortening of the overall length and cost reduction.

Here, the size reduction (making compact) in the present invention is, when, in the entire system of the variable power optical system 1, the distance along the optical axis from the lens surface closest to the object side to the focal point on the image side, that is, if the overall lens length is taken as TL, the length of the diagonal line of the imaging surface of the imaging element (the length of the diagonal line of the rectangular effective pixel area of the imaging element), that is, twice the height of the image in the imaging surface is taken as 2Y', given by a level that satisfies the following conditional equation (12), $$TL/2Y' < 4 \quad (12)$$

Because of this, it is possible to reduce the size of the entire variable power optical system, and as a result, even making the imaging device compact and lightweight becomes possible.

Further, from the point of view of making the variable power optical system and the entire imaging device more compact and lightweight, it is more desirable that the variable power optical system 1 satisfies the following conditional equation (12'), and still more desirable that it satisfies the following conditional equation (12").

$$TL/2Y' < 3 \quad (12')$$

$$TL/2Y' < 2.5 \quad (12'')$$

By being less than the upper limit of the conditional equation (12'), even the amount of movement of the movable groups becomes small along with that, and it is possible to reduce the load on the actuator that moves the movable groups. Because of this, it is not only possible to achieve reduced power consumption, but also to widen the range of selection of the actuators that can be used. For example, there are stepping motors, voice coil motors, piezoelectric actuators, etc. In addition, by being less than the upper limit of the conditional equation (12"), even the amount of movement of the movable groups becomes still smaller along with that, and it is possible to reduce further the load on the actuator that moves the movable groups.

Further, in a variable power optical system 1 with this type of construction, it is also possible that, the glass lens having an aspherical surface is a glass molded aspherical surface lens, or a polished aspherical surface glass lens, or a composite type aspherical surface lens (a lens in which aspherical shaped plastic is formed on a spherical surface glass lens). Glass molded aspherical surface lenses are desirable because they are suitable for mass manufacturing, composite type aspherical surface lenses make the degree of design freedom high since there are a large number of types of glass materials that can become the substrate. In particular, in an aspherical surface lens using a high refractive index material, since forming by molding is not easy, composite type aspherical surface lenses are desirable. Further, in the case of one side being an aspherical surface, it is possible to exploit to the maximum extent the advantages of the composite type aspherical surface lenses.

Further, in a variable power optical system 1 with this type of construction, the optical aperture 14 can also be a mechanical shutter that is provided with the function of cutting off light to the imaging element 16. Such a mechanical shutter, for example, is effective for preventing smears when a CCD type element is used for the imaging element 16.

Further, in a variable power optical system 1 with this type of construction, it is also possible to use plastic lenses and glass lenses together. Generally, since the changes in the refractive index with respect to changes in the temperature are large in the case of plastic materials, as in the Implementation Example 1 described later, if many lenses are constituted as plastic lenses, when the ambient temperature changes, it is possible that the position of the image point of the entire variable power optical system 1 changes. Depending on the specifications required of the variable power optical system 1, if it is not possible to neglect the variations in the position of the image point, for example, as in the Implementation Example 6 described later, by making the first to fourth lenses L1 to L4 lenses formed from a glass material (including glass molded lenses) and making the fifth and sixth lenses plastic lenses, and also, by distributing the refractive index so that the change in the position of the image point when the temperature changes is canceled out by the fifth lens L5, it is possible to reduce the variations in the position of the image point when the ambient temperature changes. Further, when using glass molded lenses, in order to reduce the wear of the forming molds, it is desirable to use a glass material with a glass transition temperature (Tg) of less than 400° C.

Further, in a variable power optical system 1 with this type of construction, when using a plastic lens, it is desirable that the lens is a plastic lens formed using a material obtained by dispersing particles of a maximum length of less than 30 nanometers in the plastic (plastic material).

In general, when fine particles are mixed in transparent plastic materials, since the light is dispersed thereby reducing the transmissivity, although it was difficult to use them as optical materials, by making the size of the fine particles smaller than the wavelength of the transmitted light beam, in effect the light is not scattered. Further, although in the case of a plastic material the refractive index increases with an increase in temperature, in the case of inorganic particles, on the contrary, the refractive index increases with an increase in temperature. Because of this, by using such temperature dependence to cause them to cancel out each other, it is possible to ensure that there is almost no change in the refractive index with changes in the temperature. In more concrete terms, by dispersing inorganic fine particles with a maximum length of less than 30 nanometers in a plastic material that acts as the base material, it becomes a plastic material in which the temperature dependence of the refractive index has been reduced. For example, Niobium pentoxide ($Nb_2O_5$) fine particles are dispersed in PMMA plastic. In a variable power optical system 1 with this type of construction, for at least one lens, by using a lens made of a plastic material in which inorganic fine particles are dispersed in this manner, it is possible to suppress to a small value the shift in the performance of the variable power optical system 1 due to environmental temperature changes.

It is desirable that a lens made of a plastic material in which inorganic fine particles are dispersed in this manner is formed in the following manner.

Explaining about the changes in the refractive index with respect to changes in the temperature, the change with temperature of the refractive index n(T) can be expressed by the equation (13) by differentiating the refractive index n with respect to the temperature T, based on the Lorentz-Lorenz equation.

$$n(T) = ((n^2+2) \times (n^2-1))/6n \times (-3\alpha + (1/[R]) \times (\partial[R]/\partial T)) \quad (13)$$

Where, $\alpha$ is the linear expansion coefficient, and [R] is the molecular refraction.

In the case of a plastic material, in general, the contribution to temperature dependence of the refractive index is smaller in the second term than of the first term in equation (13), and can almost be neglected. For example, in the case of the PMMA plastic, the linear expansion coefficient $\alpha$ is $7 \times 10^{-5}$, and when substituted into equation (13), we get $n(T) = -12 \times 10^{-5}$ (/° C.), which roughly matches with the actually measured value.

In concrete terms, it is desirable that, the temperature dependence of the refractive index n(T) that, conventionally, was about $-12 \times 10^{-5}$ (/° C.), is suppressed to an absolute value of less than $8 \times 10^{-5}$ (/° C.). It is more desirable to make it an absolute value of less than $6 \times 10^{-5}$ (/° C.).

Therefore, as such plastic materials, polyolefin series plastic materials, or polycarbonate series plastic materials, or polyester series plastic materials are desirable. In the case of polyolefin series plastic materials the temperature dependence of the refractive index n(T) becomes about $-11 \times 10^{-5}$ (/° C/), in the case of polycarbonate series plastic materials the temperature dependence of the refractive index n(T) becomes about $-14 \times 10^{-5}$ (/° C.), and in the case of polyester series plastic materials the temperature dependence of the refractive index n(T) becomes about $-13 \times 10^{-5}$ (/° C.).

As an example, in the case of the variable power optical system 1A of the Implementation Example 1 described later, the differences in the amount of change of back focus during temperature changes according to whether or not a lens made of a plastic material with fine particles dispersed in it is used are given below.

To begin with, in the case when a lens made of a plastic material with fine particles dispersed in it is not used in the variable power optical system 1A of the Implementation Example 1, the amount of change in the back focus (Δfb) when the temperature increases by +30° C. with respect to room temperature (20° C.) is +0.118 mm at the wide angle end, and is +0.376 mm at the telephoto end, and the amount of change in the back focus (Δfb) when the temperature decreases by −30° C. with respect to room temperature (20° C.) is −0.115 mm at the wide angle end, and is −0.353 mm at the telephoto end.

On the other hand, in the case when lenses made of a plastic material with fine particles dispersed in it are used for the second and third lenses L2 and L3 (see FIG. 4) and also lenses made of a plastic material without any fine particles dispersed in them are used for the fourth and fifth lenses L4 and L5 (see FIG. 4), the refractive index of the first lens L1, when the temperature change of the refractive index n(T) is $5 \times 10^{-6}$ (/° C.), is 1.7725 at room temperature (20° C.), is 1.7727 when temperature increases by +30° C. with respect to room temperature (20° C.), and is 1.7724 when the temperature decreases by −30° C. with respect to room temperature (20° C.). The refractive index of the second and third lenses L2 and L3, when the temperature change of the refractive index n(T) is $-8 \times 10^{-5}$ (/° C.), is 1.5305 at room temperature (20° C.), is 1.5281 when the temperature increases by +30° C. with respect to room temperature (20° C.), and is 1.5329 when the temperature decreases by −30° C. with respect to room temperature (20° C.). On the other hand, the refractive index of the second and third lenses L2 and L3, when the temperature change of the refractive index n(T) is $-6 \times 10^{-5}$ (/° C.), is 1.530 at room temperature (20° C.), is 1.5287 when the temperature increases by +30° C. with respect to room temperature (20° C.), and is 1.5323 when the temperature decreases by −30° C. with respect to room temperature (20° C.). The refractive index of the fourth lens L4, when the temperature change of the refractive index n(T) is $-13 \times 10^{-5}$ (/° C.), is 1.6322 at room temperature (20° C.), is 1.6283 temperature increases by +30° C. with respect to room temperature (20° C.), and is 1.6361 when the temperature decreases by −30° C. with respect to room temperature (20° C.). The refractive index of the fifth lens L5, when the temperature change of the refractive index n(T) is $-14 \times 10^{-5}$ (/° C.), is 1.5834 at room temperature (20° C.), is 1.5792 when the temperature increases by +30° C. with respect to room temperature (20° C.), and is 1.5876 when the temperature decreases by −30° C. with respect to room temperature (20° C.).

Therefore, the amount of change in the back focus (ΔfB) when the temperature increases by +30° C. with respect to room temperature (20° C.), if the temperature change of the refractive index of the second and third lenses L2 and L3 n(T) is $-8 \times 10^{-5}$ (/° C.), is +0.071 mm at the wide angle +0.241 mm at the telephoto end, and further, if the temperature change of the refractive index of the second and third lenses L2 and L3 n(T) is $-6 \times 10^{-5}$ (/° C.), it is +0.040 mm at the wide angle +0.152 mm at the telephoto end, and on the other hand, the amount of change in the back focus (ΔfB) when the temperature decreases by −30° C. with respect to room temperature (20° C.), if the temperature change of the refractive index of the second and third lenses L2 and L3 n(T) is $-8 \times 10^{-5}$ (/° C.), is −0.069 mm at the wide angle end, is −0.230 mm at the telephoto end, and further, if the temperature change of the refractive index of the second and third lenses L2 and L3 n(T) is $-6 \times 10^{-5}$ (/° C.), it is −0.039 the wide angle end, and is −0.146 mm at the telephoto end.

Therefore, compared to the case when absolutely no fine particles are dispersed, when a plastic material with fine particles dispersed in it is used for the second lens L2 and the third lens L3, if n(T) is $-6 \times 10^{-5}$ (/° C.), it can be understood that it is possible to suppress the amount of change in the back focus (ΔfB) with changes in the temperature to a low value.

Further, it is also possible to use for the second lens L2 and the third lens L3 lenses made of plastic materials with fine particles dispersed in them and respectively having different values of the temperature dependence of the refractive index n(T), and in this case, by selecting the appropriate value of the temperature dependence of the refractive index n(T) considering the size of contribution of each lens to the change in the position of the image point with changes in the temperature, it is also possible to make sure that there is absolutely no change in the position of the image point at the time of temperature changes for an entire imaging lens 1.

Explanation of a digital device incorporating a variable power optical system:

Next, explanations are given about a digital device in which a variable power optical system 1 described above is incorporated.

Figure 2:
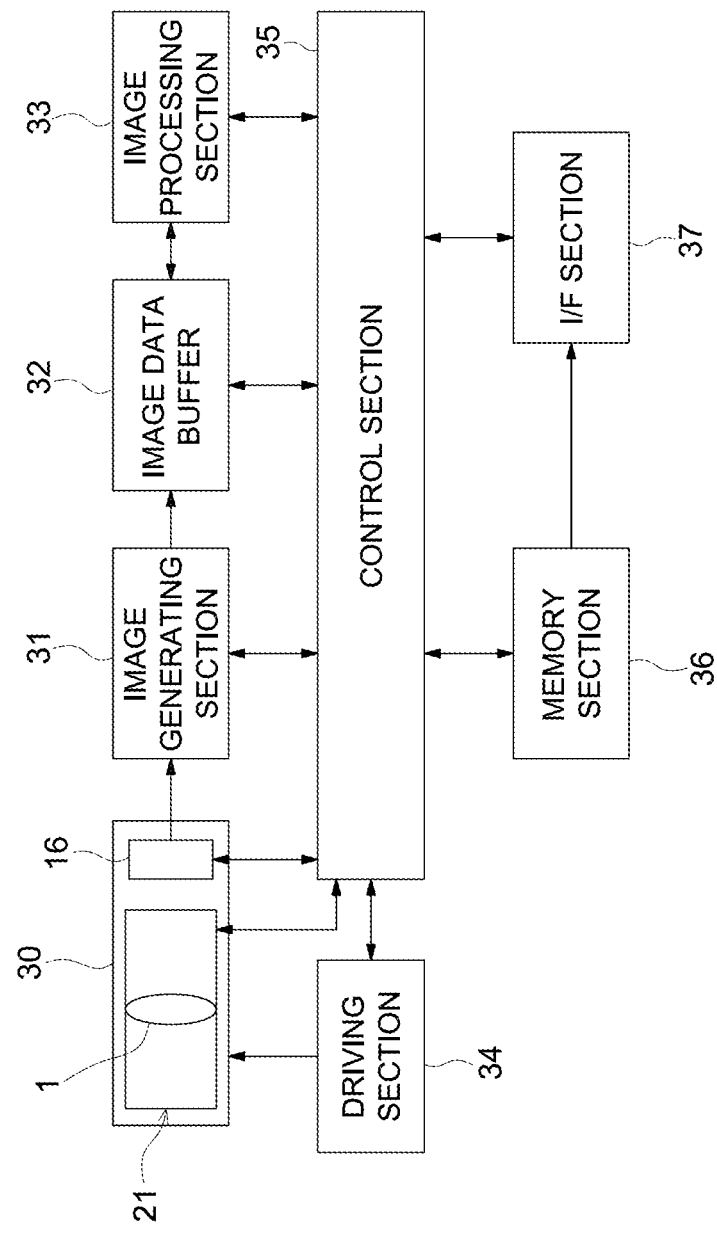
FIG. 2 is a block diagram showing the configuration of a digital device in a preferred embodiment.

FIG. 2 is a block diagram showing the configuration of a digital device according to a preferred embodiment. The digital device 3, for the photographing function, is configured to be provided with an imaging section 30, an image generation section 31, an image data buffer 32, an image processing section 33, a driving section 34, a control section 35, a storage section 36, and an I/F section 37. As a digital device 3, for example, it is possible to consider, a digital still camera, a video camera, a monitoring camera (monitor camera), a portable terminal such as a mobile telephone or a portable data terminal (PDA), etc., a personal computer, and a mobile computer, and can also include peripheral equipment of these (for example, a mouse, a scanner, a printer, etc.).

The imaging section 30 is configured to be provided with an imaging device 21 and an imaging element 16. The imaging device 21, as is configured to be provided with a variable power optical system 1 shown in FIG. 1, a lens driving device, not shown in the figure, for carrying out power variation and focusing by driving the lenses in the direction of the optical axis, etc. The light beam from the photographed object is formed on the light receiving surface of the imaging element 16 by the variable power optical system 1, and becomes the optical image of the photographed object.

The imaging element 16, as has been described above, converts the optical image of the photographed object formed by the variable power optical system 1 into an electrical signal (video signal) with the color components of R, (and B, and outputs the video signals of each of the colors R, (and B to the image generation section 31. The photographing operations of the imaging element 16 are controlled by the control section 35 such as photographing either still images or moving images, or reading out the output signals of the different pixels in the imaging element 16 (horizontal synchronization, vertical synchronization, transfer), etc.

The image generation section 31, not only carries out amplification processing, digital conversion processing, etc., on the analog output signal from the imaging element 16, but also carries out various well known image processings of determining the appropriate black level for the entire image, γ correction, while balance adjustment (WB adjustment), contour correction, and color striation correction, etc., and generates from the image signal the image data of different pixels. The image data generated in the image generation section 31 is output to the image data buffer 32.

The image data buffer 32 is a memory that is used not only for temporarily storing the image data, but also as a working storage at the time of the processings described later that are carried out by the image processing section 33 on this image data, and is constituted, for example, from a RAM (Random Access Memory) which is a nonvolatile storage device.

The image processing section 33 is a circuit that carries out image processings such as resolution conversion, etc., on the image data of the image data buffer 32. Further, according to the necessity, in the image processing section 33, it is also possible to configure so as to correct the aberrations that could not be completely corrected in the variable power optical system 1.

The driving section 34, by making the lens driving device not shown in the figure operate based on the control signals output from the control section 35, drives the one or a plurality of lenses in the variable power optical system 1 so as to carry out the desired power variation or focusing.

The control section 35, is configured for example to be provided with a microprocessor and its peripheral circuits, etc., and controls the operations of the imaging section 30, the image generation section 31, the image data buffer 32, the image processing section 33, the driving section 34, the storage section 36, and the I/F section 37 according to their functions. In other words, by this control section 35, the imaging device 21 is controlled so as to carry out at least one of still image photography or movie photography of the photographed object.

The storage section 36 is a storage circuit that stores the image data generated by the still image photography or movie photography of the photographed object, and for example, is configured to be provided with a ROM (Read Only Memory) which is a nonvolatile storage device, or an EEPROM (Electrically Erasable Programmable Read Only Memory) which is a rewritable nonvolatile storage device, or a RAM, etc. In other words, the storage section 36 has the function of a memory for still images or moving images.

The I/F section 37 is an interface that transmits and receives image data with an external device, and for example, is an interface conforming to the standards such as USB, IEEE 1394, etc.

The photographing operation of a digital device 3 with such a configuration is described next.

When photographing a still image, the control section 35, not only carries out control so as to make the imaging section 21 photograph still images, but also carries out focusing by driving the lens driving device not shown in the figure of the imaging device 21 via the driving section 34. Because of this, focused optical images are formed periodically and repeatedly on the light receiving surface of the imaging element 16, after being converted into a video signal of R, G, and B color components, output to the image generation section 31. This video signal is temporarily stored in the image data buffer 32, after image processings are carried out by the image processing section 33, an image based on what video signal is displayed in a display device (not shown in the figure). Further, the photographer, by referring to the display, can make adjustments so that the main photographed object is at the desired position in the screen. By pressing the so called shutter button (not shown in the figure) in this condition, the image data is stored in the storage section 36 as a memory for still images, and still images are obtained.

In this case, when the zooming function is to be used because the photographed object is at a position far from the imaging device 21, or if a photographed object that is near is to be enlarged, the control section 35, carries out lens driving for power variation, and causes the variable power optical system 1 to carry out zooming continuously. Because of this, even if the photographed object is far from the photographer, by adjusting the power, similar to the normal unity magnification photography, it is possible to adjust so that the main photographed object is at the desired position in the screen, and to obtain an enlarged still image.

Further, when carrying out movie photography, the control section 35 carries out control so as to make the imaging device 21 photograph moving images. After that, similar to the case of still image photography, the photographer, by referring to the display (not shown in the figure), can make adjustments through the imaging device 21 so that the main photographed object is at the desired position in the screen. In this case, similar to the case of still image photography, it is possible to adjust the magnification ratio of the photographed object, and by pressing the shutter button (not shown in the figure), movie photography is started. During this photography, it is possible to vary the magnification ratio of the photographed object at any time.

During movie photography, the control section 35, not only carries out control so as to make the imaging section 21 photograph moving images, but also carries out focusing by driving the lens driving device not shown in the figure of the imaging device 21 via the driving section 34. Because of this, focused optical images are formed periodically and repeatedly on the light receiving surface of the imaging element 16, after being converted into a video signal of R, G, and B color components, and output to the image generation section 31. This video signal is temporarily stored in the image data buffer 32, after image processings are carried out by the image processing section 33, an image based on that video signal is displayed in a display device (not shown in the figure). Next, the movie photography is stopped by pressing the shutter button again. The photographed moving images are guided to and stored in the storage section 36 as a memory for moving images.

In such an imaging device 21 and digital device 3, by providing a variable power optical system 1 which can, while achieving a relatively high power ratio and compactness, while ensuring an angle of view appropriate for the photographing application at the wide-angle end, can correct better compared to prior art the tele-centric characteristics, difference in the angle of incidence to the imaging element, as well as the different aberrations such as spherical aberration, chromatic aberration, astigmatism, and distortion, etc., it is possible to employ an imaging element 16 that has a large number of pixels while achieving compactness. In particular, since the variable power optical system 1 can be employed for an imaging element that is compact and has a large number of pixels, it is ideally suitable for portable terminals in which larger number of pixels and advanced functions are progressing. As an example, the case when an imaging device 21 is installed in a mobile telephone is explained below.

Figure 3A:
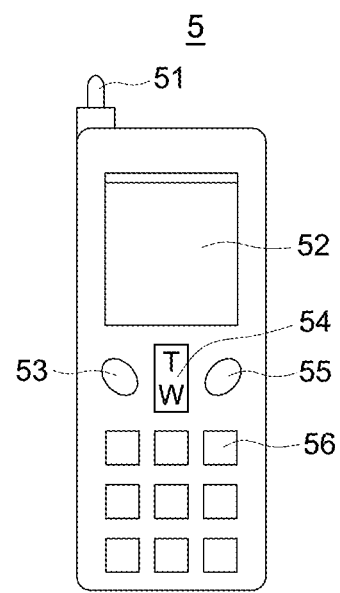
FIGS. 3A and 3B are external view configuration diagrams of a mobile phone with camera indicating a preferred embodiment of a digital device.
Figure 3B:
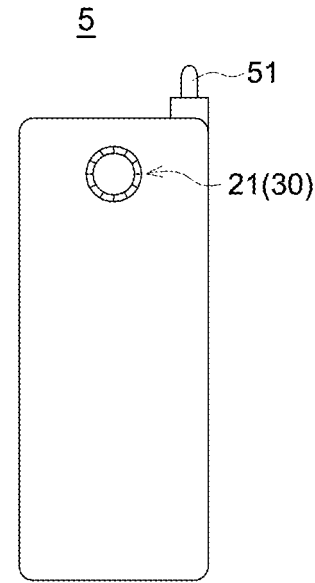

FIG. 3 is an external view configuration diagram of a mobile telephone with a camera that is a preferred embodiment of a digital device. FIG. 3A shows the operation screen of a mobile telephone, and FIG. 3B shows the back side of the operation screen, that is, the back panel.

In FIG. 3, the mobile telephone 5 is provided with an antenna 51 in the top part, and in its operation screen, as is shown in FIG. 3A, a rectangular display 52, an image photography button 53 for carrying out starting of the image photographing mode and for selecting between still image photography and moving image photography, a power varying button 54 for controlling the power variation (zooming), a shutter button 55, and a dial button 56.

Further, in this mobile telephone 5, not only are incorporated circuits for realizing telephone functions utilizing the mobile telephone network, but also are incorporated an imaging section 30, an image generation section 31, an image data buffer 32, an image processing section 33, a driving section 34, a control section 35, and a storage section 36, and the imaging device 21 of the imaging section 30 is on the back panel.

When the image photographing button 53 is operated, a control signal indicating the contents of that operation is output to the control section 35, and the control section 35 carries out operations according to those contents of the operation. The power varying button 54, for example, is constituted from a two contact type switch, a marking of "T" indicating telephoto is made on its top part and a marking of "W" indicating wide angle is made on its bottom part. Further, when the marked position of the power varying button 54 is pressed, a control signal indicating the respective power varying operation is output to the control section 35, and the control section 35 carries out operations according to those contents of the operation. Further, when the shutter button 55 is pressed, a control signal indicating the contents of that operation is output to the control section 35, and the control section 35 carries out operations according to those contents of the operation.

Explanation of more concrete implementation examples of a variable power optical system:

In the following, the concrete construction is explained with reference to drawings of a variable power optical system 1 as shown in FIG. 1, that is, of a variable power optical system 1 that is provided in an imaging device 21 that is installed in a digital device 3 as is shown in FIG. 2.

IMPLEMENTATION EXAMPLES

Implementation Example 1

Figure 4A:
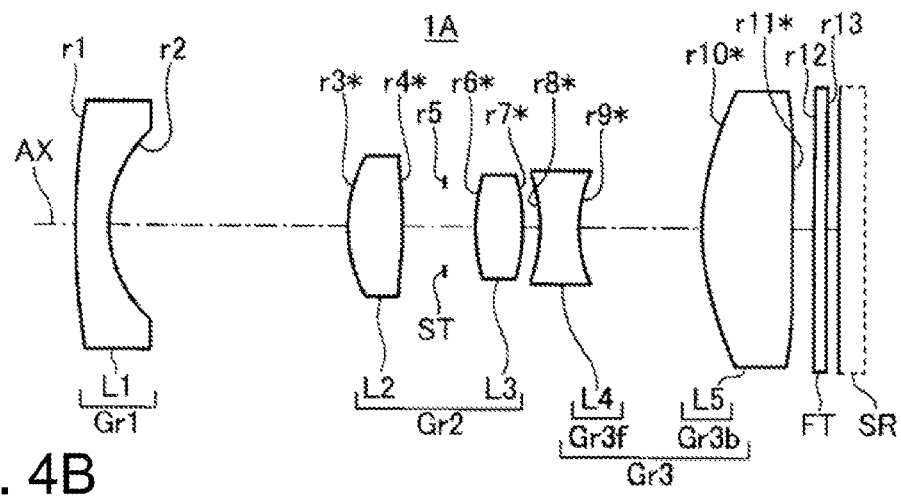
FIGS. 4A, 4B, and 4C are cross-sectional view diagrams showing an example of the arrangement of lens groups in a variable power optical system according to the Implementation Example 1.
Figure 4B:
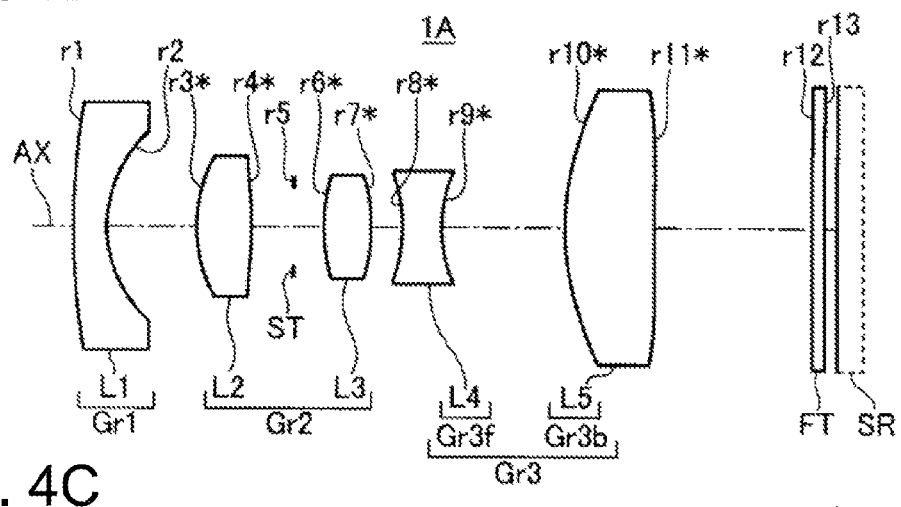
Figure 4C:
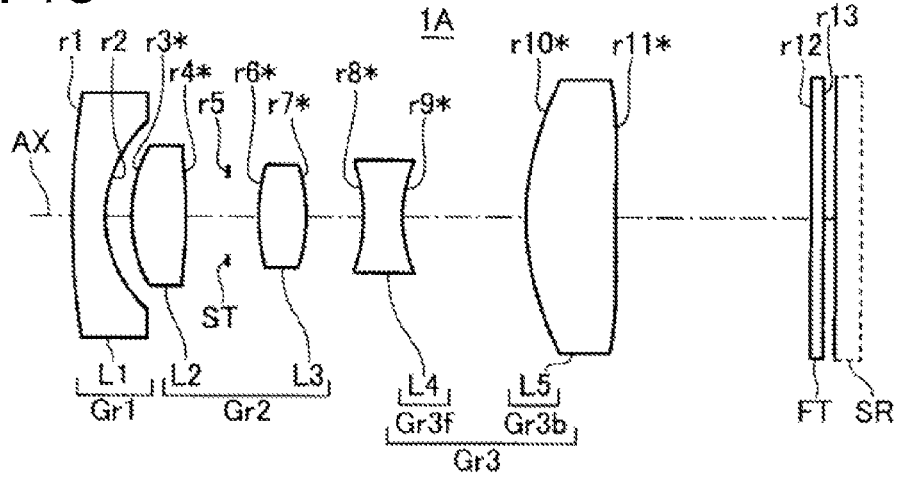

FIG. 4 is a cross-sectional view diagram showing an example of the arrangement of lens groups in a variable power optical system according to the Implementation Example 1. FIG. 4A shows the case at the wide angle end, FIG. 4B shows the case at the mid point, and FIG. 4C shows the case at the telephoto end. Further, similar cases are also shown in A, B, and C of FIG. 6, FIG. 8, FIG. 10, FIG. 12, FIG. 14, FIG. 16, FIG. 18, FIG. 20, FIG. 22, and FIG. 24 which are the cross-sectional view diagrams showing examples of the arrangement of lens groups in the variable power optical systems 1B to 1K according to the Implementation Example 2 through Implementation Example 11 which are described later.

FIG. 5 is a diagram showing the form of movement of the different lens groups during power variation of a variable power optical system of the Implementation Example 1. In this figure, A shows the case at the wide angle end described above, B shows the case at the mid point described above, and C shows the case at the telephoto end described above. Further, similar cases are also shown in A, B, and C of FIG. 7, FIG. 9, FIG. 11, FIG. 13, FIG. 15, FIG. 17, FIG. 19, FIG. 21, FIG. 23, and FIG. 25 which are diagrams showing the form of movement of the different lens groups during power variation of the variable power optical systems 1B to 1K according to the Implementation Example 2 through Implementation Example 11 which are described later.

FIG. 26 is an aberration diagram of a variable power optical system of the Implementation Example 1. FIG. 26A shows the case at the wide angle end, FIG. 26B shows the case at the mid point, and FIG. 26C shows the case at the telephoto end. Further, similar cases are also shown in A, B, and C of FIG. 27, FIG. 28, FIG. 29, FIG. 30, FIG. 31, FIG. 32, FIG. 33, FIG. 34, FIG. 35, and FIG. 36 which are aberration diagrams of the variable power optical systems 1B to 1K according to the Implementation Example 2 through Implementation Example 11 which are described later.

The variable power optical system 1A of the Implementation Example 1, as is shown in FIG. 4, is a negative-positive-negative three component zoom construction with the lens groups (Gr1, Gr2, and Gr3) arranged in sequence from the object side towards the image side to have, a first lens group (Gr1) having on the whole a negative optical power, a second lens group (Gr2) having on the whole a positive optical power, and a third lens group (Gr3) having on the whole a negative optical power, and at the time of zooming, as is shown in FIG. 5, the first lens group (Gr1) is fixed, while the second lens group (Gr2) and the third lens group (Gr3) both move. The aperture opening ST, as is shown in FIG. 4, moves along with the second lens group (Gr2).

In more concrete terms, the variable power optical system 1A of the Implementation Example 1 is constituted as follows with the different lens groups (Gr1, Gr2, and Gr3) arranged in sequence from the object side towards the image side as follows.

The first lens group (Gr1) is constituted from a negative meniscus lens (the first lens L1), which is convex on the object side, as a single negative lens.

The second lens group (Gr2) is constituted from a both sides convex positive lens (the second lens L2), an aperture opening ST, and a both sides convex positive lens (the third lens L3). In this manner the second lens group (Gr2) includes an aperture opening ST, the aperture opening ST is placed between the second lens L2 and the third lens L3, and moves together with this second lens group (Gr2). The second lens L2 and the third lens L3 have aspherical surfaces on both sides, and, for example, are lenses made from a plastic material.

The third lens group (Gr3) has, as the front group (Gr3f) a both sides concave negative lens (the fourth lens L4), and as the rear lens group (Gr3b) a positive meniscus lens (the fifth lens L5) which is convex on the object side. The fourth and fifth lenses L4 and L5 both have aspherical surfaces on both sides, and, for example, are lenses made of a plastic material.

Further, on the image side of the third lens group (Gr3) is placed, via a parallel plate FT, the light receiving surface (imaging surface) of an imaging element SR. The parallel plate FT is various types of optical filters, or the cover glass of the imaging element, etc.

In FIG. 4, the number ri (i=1, 2, 3, . . . ) assigned to each lens surface indicates that it is the ith lens surface counting from the object side (however, the cemented surfaces of lenses are treated as a single surface), and a surface with an asterisk "*" mark added to ri indicates that it is an aspherical surface. Further, even the two surfaces of the optical aperture ST and the parallel plate FT, and the light receiving surface of an imaging element SR are each treated as one surface. The meanings of this type of handling and symbols are similar also for the Implementation Example 2 through Implementation Example 11 that are described later (FIG. 6, FIG. 8, FIG. 10, FIG. 12, FIG. 14, FIG. 16, FIG. 18, FIG. 20, FIG. 22, and FIG. 24). However, it is not implied that they are completely identical, for example, in all of FIG. 6, FIG. 8, FIG. 10, FIG. 12, FIG. 14, FIG. 16, FIG. 18, FIG. 20, FIG. 22, and FIG. 24 of the Implementation Example 2 through Implementation Example 11, although the same symbol (r1) is assigned for the lens surface that is placed closest to the object side, it does not mean that their curvature, etc., are the same in all of the Implementation Example 2 through Implementation Example 11.

In this type of construction, the light beam entering from the object side passes through, along the optical axis AX, in sequence, the first lens group (Gr1), the second lens group (Gr2) (includes the aperture opening ST in the middle), the third lens group (Gr3), and the parallel plate FT, and forms an optical image of the object at the light receiving surface of the imaging element SR Further, in the imaging element SR, the optical image is converted into an electrical signal. This electrical signal, depending on the necessity, is subjected to pre-scribed digital signal processing, etc., and as a digital video signal, for example, is stored in the memory of a digital device such as a digital camera, etc., or is transmitted by wired or wireless communications to another digital device.

In the variable power optical system 1A of this Implementation Example 1, at the time of varying the power from the wide angle end, through the middle point, to the telephoto end, as is shown in FIG. 5, the first lens group (Gr1) is fixed, the second lens group (Gr2) is moved in a curved manner so as to move towards the object (in a curve that is convex towards the object), and the third lens group (Gr3) is moved in a relatively gradually curved manner so as to move towards the object (in a curve that is convex towards the object). The aperture opening ST, as is shown in FIG. 4, moves along with the second lens group (Gr2). During this type of power variation from the wide angle end towards the telephoto end, the first group (Gr1) and the second group (Gr2), and the first group (Gr1) and the third group (Gr3) move so that their respective spacing becomes smaller, and the second group (Gr2) and the third group (Gr3) move so that their spacing becomes larger.

The construction data of the different lenses in the variable power optical system 1A of this Implementation Example 1 is given below.

Numerical Value Implementation Example 1

Unit mm

Surface data

| Surface number | r | d | nd | vd |
|---|---|---|---|---|
| Object surface | ∞ | ∞ | | |
| 1 | 21.2564 | 0.8000 | 1.77250 | 49.62 |
| 2 | 3.4235 | Variable | | |
| 3* | 4.2140 | 1.3261 | 1.53048 | 55.72 |
| 4* | −9.7728 | 1.0064 | | |
| 5 (Aperture) | ∞ | 0.7470 | | |
| 6* | 5.2684 | 1.1454 | 1.53048 | 55.72 |
| 7* | −5.2889 | Variable | | |
| 8* | −5.1285 | 0.9414 | 1.63219 | 23.42 |
| 9* | 3.5999 | 2.9803 | | |
| 10* | 6.5443 | 2.1837 | 1.58340 | 30.22 |
| 11* | 52.7254 | Variable | | |
| 12 | ∞ | 0.3000 | 1.51680 | 64.20 |
| 13 | ∞ | 0.3000 | | |
| Image surface | ∞ | | | |

Aspherical surface data

Third surface

K = 0.00000e+000, A4 = 5.25419e−004, A6 = 5.45142e−004, A8 = −6.38339e−005, A10 = 4.02065e−005

Fourth surface

K = 0.00000e+000, A4 = 3.64905e−003, A6 = 5.38408e−004, A8 = 1.72305e−005, A10 = 4.21460e−005

Sixth surface

K = 0.00000e+000, A4 = 1.77930e−004, A6 = −7.62801e−004, A8 = −1.66121e−004, A10 = 1.62754e−005

Seventh surface

K = 0.00000e+000, A4 = −5.96458e−003, A6 = 4.27884e−004, A8 = −5.95194e−004, A10 = 1.41564e−004

Eighth surface

K = 0.00000e+000, A4 = −2.15483e−002, A6 = 7.83553e−003, A8 = −2.97686e−003, A10 = 6.64100e−004

Ninth surface

K = 0.00000e+000, A4 = −1.29548e−002, A6 = 7.38953e−003, A8 = −2.14312e−003, A10 = 3.03227e−004

Tenth surface

K = 0.00000e+000, A4 = −2.46107e−003, A6 = 1.26128e−004, A8 = −5.69914e−006, A10 = 1.99346e−007

Eleventh surface

K = 0.00000e+000, A4 = −1.86201e−003, A6 = −1.43890e−005, A8 = 3.71681e−006, A10 = −7.02703e−008

Various data
Zoom data
Zoom ratio 2.74

| | Wide angle | Middle point | Telephoto |
|---|---|---|---|
| Focal distance | 4.758 | 9.251 | 13.024 |
| F-Number | 4.178 | 5.989 | 7.100 |
| Angle of view | 38.545 | 22.247 | 15.937 |
| Image height | 3.600 | 3.600 | 3.600 |
| Overall lens length | 18.395 | 18.395 | 18.398 |

Unit mm

| | | | |
|---|---|---|---|
| BF | 1.038 | 4.322 | 5.227 |
| d2 | 5.808 | 2.191 | 0.645 |
| d7 | 0.419 | 0.752 | 1.396 |
| d11 | 0.544 | 3.797 | 4.691 |

Zoom lens group data

| Group | Starting surface | Ending surface | Focal distance |
|---|---|---|---|
| 1 | 1 | 2 | −5.388 |
| 2 | 3 | 7 | 3.644 |
| 3 | 8 | 11 | −6.357 |

In the above surface data, the surface number corresponds to the number i in the symbol ri (i=1, 2, 3, . . . ) assigned to each lens surface shown in FIG. 4. A surface with an asterisk "*" added to the number i is an aspherical surface (a refractive optical surface with an aspherical surface or a surface having a refractive action equivalent to an aspherical surface).

Further, "r" is the radius of curvature (unit: mm) of each surface, "d" is the spacing between different lens surfaces along the optical axis in the focused to infinity state (on-axis surface spacing), "nd" is the refractive index of each lens for the d-line (wavelength 587.56 nm), and "vd" is the Abbe number. Further, since both surfaces of the aperture opening ST and the parallel plate FT and the light receiving surface (imaging surface) of the imaging element SR are plane surfaces, their radii of curvature are ∞ (infinity)

The above aspherical surface data is the values of the quadratic surface parameter (cone constant K) and the asphericity coefficient Ai (i=4, 6, 8, 10, 12, 14, 16, 18, 20) of the surfaces that are aspherical surfaces (the surfaces for which an asterisk * is added to the number i in the surface data). Further, the aspherical surface shape of the optical surface is defined by the following equation using a local Cartesian coordinate system (x, y, z) taking the apex of the surface as the origin and the direction from the object towards the imaging element as the positive direction of the z-axis.

$$z(h)=ch^2/[1+\sqrt{\{1-(1+K)c^2h^2\}}]+\Sigma Ai \cdot h^i$$

Where, z (h): The amount of displacement along the z-axis at a position of height h (taking the apex of the surface as the reference)

h: Height in a direction perpendicular to the z-axis ($h^2=x^2+y^2$)

c: Near axis curvature (=1/radius of curvature)

Ai: ith order asphericity coefficient

K: Quadratic surface parameter (cone constant K)

Further, in the above aspherical surface data, "en" implies "nth power of 10". For example, "e+001" means "10 to the power of +1", and "e−003" means "10 to the power of −3".

With the above lens placement and constitution, the different aberrations in the imaging lens 1A of the Implementation Example 1 are shown in FIG. 26. In FIG. 26A, B, and C, sequentially from the left, are shown, respectively, spherical aberration (sine condition) (LONGITUDINAL SPHERICAL ABERRATION), astigmatism (ASTIGMATISM FIELD CURVE), and distortion (DISTORTION). The horizontal axis of spherical aberration represents the shift in mm units of the position of the focal point, and its vertical axis represents a value normalized at the maximum incidence height. The horizontal axis of astigmatism represents the shift in mm units of the position of the focal point, and its vertical axis represents the image height in mm units. The horizontal axis of distortion represents the ratio (%) of the actual image height with respect to the ideal image height, and its vertical axis represents that image height in mm units. Further, in the figure for astigmatism, the broken line T represents the results in the tangential (meridional) surface, and the continuous line S represents the results in the sagittal (radial) surface, respectively.

In the figure of the spherical aberration, the aberrations of three light beams are shown, by a continuous line for the d-line (wavelength 587.56 nm), by a long dashed line ( - - - ) for the g-line (wavelength 435.84 nm), and by a dotted line ( . . . ) for the C-line (wavelength 656.28 nm). The figure of astigmatism and distortion show the results when light of the d-line (wavelength 587.56 nm) is used.

The handling in the above manner is similar for the construction data and FIG. 27 to FIG. 36 showing the different aberrations.

Implementation Example 2

Figure 6A:
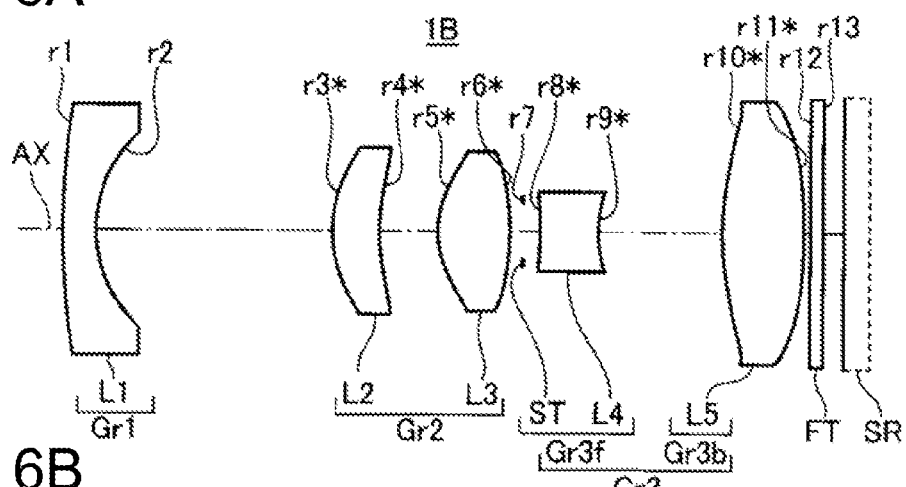
FIGS. 6A, 6B, and 6C are cross-sectional view diagrams showing an example of the arrangement of lens groups in a variable power optical system according to the Implementation Example 2.
Figure 6B:
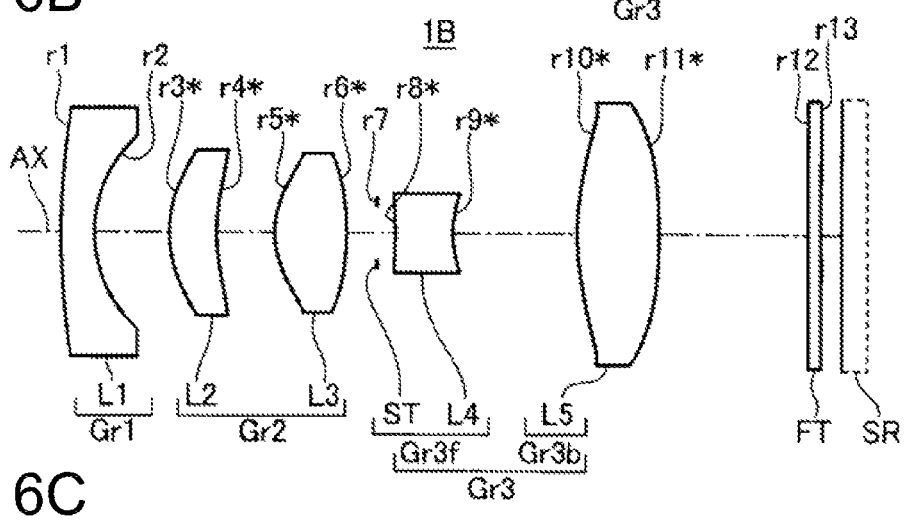
Figure 6C:
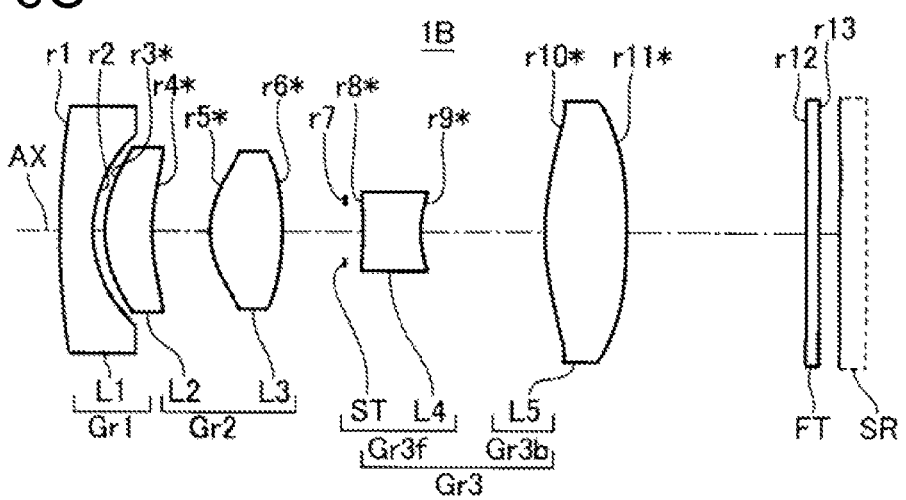

FIG. 6 is a cross-sectional view diagram showing an example of the arrangement of lens groups in a variable power optical system according to the Implementation Example 2. FIG. 7 is a diagram showing the form of movement of the different lens groups during power variation of a variable power optical system of the Implementation Example 2. FIG. 27 is an aberration diagram of a variable power optical system of the Implementation Example 2.

The variable power optical system 1B of the Implementation Example 2, as is shown in FIG. 6, is a negative-positive-negative three component zoom construction with the lens groups (Gr1, Gr2, and Gr3) arranged in sequence from the object side towards the image side to have, a first lens group (Gr1) having on the whole a negative optical power, a second lens group (Gr2) having on the whole a positive optical power, and a third lens group (Gr3) including an aperture opening ST and having on the whole a negative optical power, and at the time of zooming, as is shown in FIG. 7, the first lens group (Gr1) is fixed, while the second lens group (Gr2) and the third lens group (Gr3) both move. The aperture opening ST, as is shown in FIG. 6, moves along with the third lens group (Gr3).

In more concrete terms, the variable power optical system 1B of the Implementation Example 2 is constituted with the different lens groups (Gr1, Gr2, and Gr3) arranged in sequence from the object side towards the image side as follows.

The first lens group (Gr1) is constituted from a negative meniscus lens (the first lens L1), which is convex on the object side, as a single negative lens.

The second lens group (Gr2) is constituted from a positive meniscus lens (the second lens L2) that is convex on the object side, and a both sides convex positive lens (the third lens L3). The second lens L2 and the third lens L3 have aspherical surfaces on both sides, and, for example, are lenses made from a plastic material.

The third lens group (Gr3) has, an aperture opening ST, a both sides concave negative lens (the fourth lens L4) as the front group (Gr30), and as the rear lens group (Gr3b) a both sides convex positive lens (the fifth lens L5). In this manner the third lens group (Gr3) includes an aperture opening ST, the aperture opening ST is placed on the object side of the fourth lens L4 of the front group (Gr30, and moves together with this third lens group (Gr3). The fourth and fifth lenses L4 and L5 both have aspherical surfaces on both sides.

Further, on the image side of the third lens group (Gr3) is placed, via a parallel plate FT, the light receiving surface (imaging surface) of an imaging element SR The parallel plate FT is various types of optical filters, or the cover glass of the imaging element, etc.

In the variable power optical system 1B of this Implementation Example 2, at the time of varying the power from the wide angle end, through the middle point, to the telephoto end, as is shown in FIG. 7, the first lens group (Gr1) is fixed, the second lens group (Gr2) is moved in a curved manner so as to move towards the object (in a curve that is convex towards the object), and the third lens group (Gr3) is moved in a relatively gradually curved manner so as to move towards the object (in a curve that is convex towards the object), and the aperture opening ST moves along with the third lens group (Gr3). During this type of power variation from the wide angle end towards the telephoto end, the first group (Gr1) and the second group (Gr2), and the first group (Gr1) and the third group (Gr3) move so that their respective spacing becomes smaller, and the second group (Gr2) and the third group (Gr3) move so that their spacing becomes larger.

The construction data of the different lenses in the variable power optical system 1B of this Implementation Example 2 is given below.

Numerical Value Implementation Example 2

| Unit mm | | | | |
|---|---|---|---|---|
| Surface data | | | | |
| Surface number | r | d | nd | vd |
| Object surface | ∞ | ∞ | | |
| 1 | 20.8677 | 0.8000 | 1.80076 | 44.91 |
| 2 | 3.4718 | Variable | | |
| 3* | 3.3928 | 1.1261 | 1.53048 | 55.72 |
| 4* | 5.4212 | 1.3959 | | |
| 5* | 2.5214 | 1.7298 | 1.53048 | 55.72 |
| 6* | −7.2378 | Variable | | |
| 7 (Aperture) | ∞ | 0.4293 | | |
| 8* | −13.2758 | 1.3837 | 1.79850 | 22.59 |
| 9* | 3.1200 | 2.9872 | | |
| 10* | 7.4670 | 1.9582 | 1.55389 | 42.65 |
| 11* | −16.9629 | Variable | | |
| 12 | ∞ | 0.3000 | 1.51680 | 64.20 |
| 13 | ∞ | 0.5000 | | |
| Image surface | ∞ | | | |

| Aspherical surface data |
|---|

Third surface

K = 0.00000e+000, A4 = −2.49491e−003, A6 = −4.68477e−005, A8 = −8.19213e−005, A10 = −4.21206e−007

Fourth surface

K = 0.00000e+000, A4 = −7.89969e−003, A6 = 3.53362e−004, A8 = −1.92721e−004, A10 = 2.11383e−005

Fifth surface

K = 0.00000e+000, A4 = −1.00241e−002, A6 = −9.25022e−004, A8 = −1.63782e−004, A10 = −3.57058e−005

Sixth surface

K = 0.00000e+000, A4 = 7.80030e−004, A6 = −1.14129e−003, A8 = −1.10596e−004, A10 = 2.09199e−005

Eighth surface

K = 0.00000e+000, A4 = −1.80962e−002, A6 = −1.77796e−003, A8 = 4.63273e−003, A10 = −1.72488e−003

-continued

Unit mm

Ninth surface

K = 0.00000e+000, A4 = −1.53208e−002, A6 = 4.37149e−003,
A8 = −9.49467e−005, A10 = −8.66214e−005

Tenth surface

K = 0.00000e+000, A4 = −2.06397e−003, A6 = −3.83473e−004,
A8 = 6.96913e−005, A10 = −1.60985e−006, A12 = −1.42750e−007,
A14 = −3.70481e−009

Eleventh surface

K = 0.00000e+000, A4 = −2.36291e−003, A6 = 1.14060e−005,
A8 = −6.17666e−005, A10 = 1.10643e−005, A12 = −4.70765e−007,
A14 = −5.73691e−009

Various data

Zoom data
Zoom ratio 2.74

|  | Wide angle | Middle point | Telephoto |
|---|---|---|---|
| Focal distance | 4.789 | 9.317 | 13.117 |
| F-Number | 4.838 | 6.582 | 6.952 |
| Angle of view | 39.110 | 22.247 | 15.895 |
| Image height | 3.600 | 3.600 | 3.600 |
| Overall lens length | 18.650 | 18.627 | 18.623 |
| BF | 0.861 | 4.274 | 5.002 |
| d2 | 5.679 | 1.813 | 0.300 |
| d6 | 0.300 | 0.729 | 1.510 |
| d11 | 0.163 | 3.576 | 4.305 |

Zoom lens group data

| Group | Starting surface | Ending surface | Focal distance |
|---|---|---|---|
| 1 | 1 | 2 | −5.309 |
| 2 | 3 | 6 | 3.654 |
| 3 | 7 | 11 | −9.598 |

With the above lens placement and constitution, the spherical aberration (sine condition), astigmatism, and distortion in the imaging lens 1B of the Implementation Example 2 are shown in FIG. 27.

Implementation Example 3

Figure 8A:
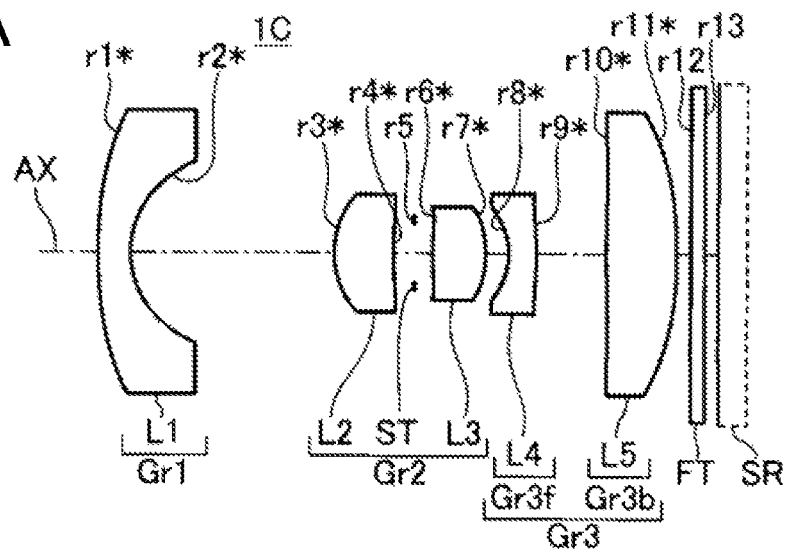
FIGS. 8A, 8B, and 8C are cross-sectional view diagrams showing an example of the arrangement of lens groups in a variable power optical system according to the Implementation Example 3.
Figure 8B:
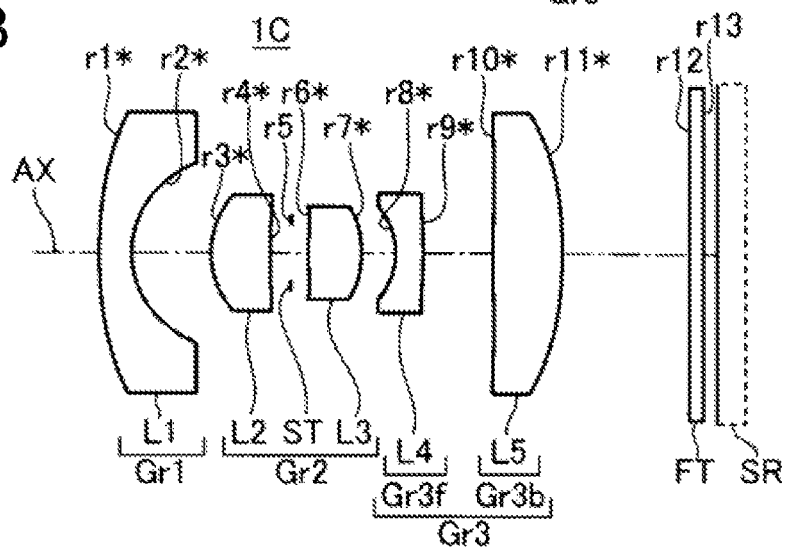
Figure 8C:
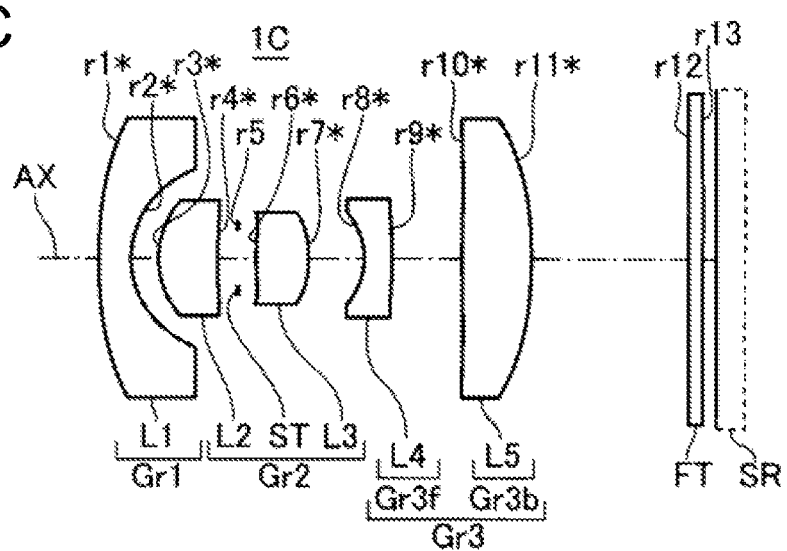
Figure 28A:
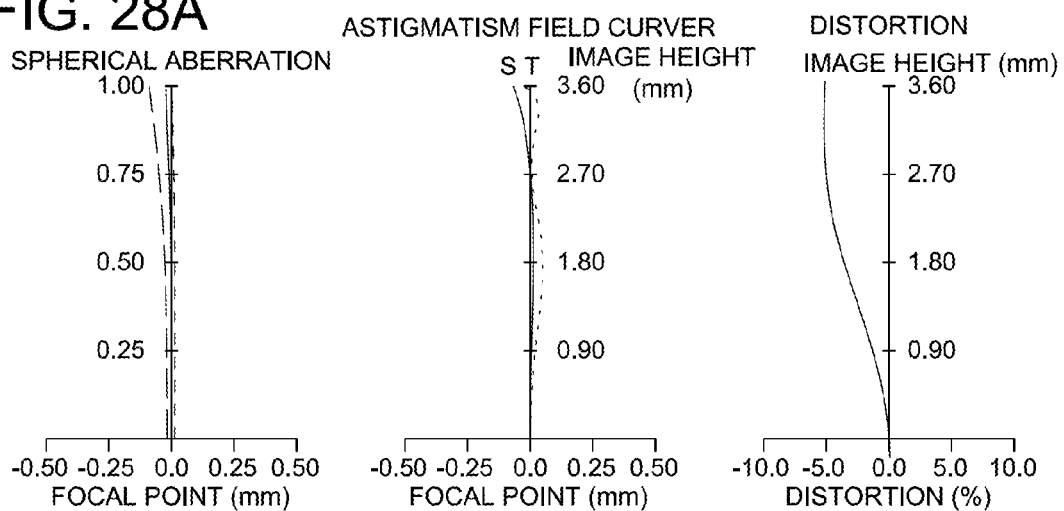
FIGS. 28A, 28B, and 28C are aberration diagrams of a variable power optical system of the Implementation Example 3.
Figure 28B:
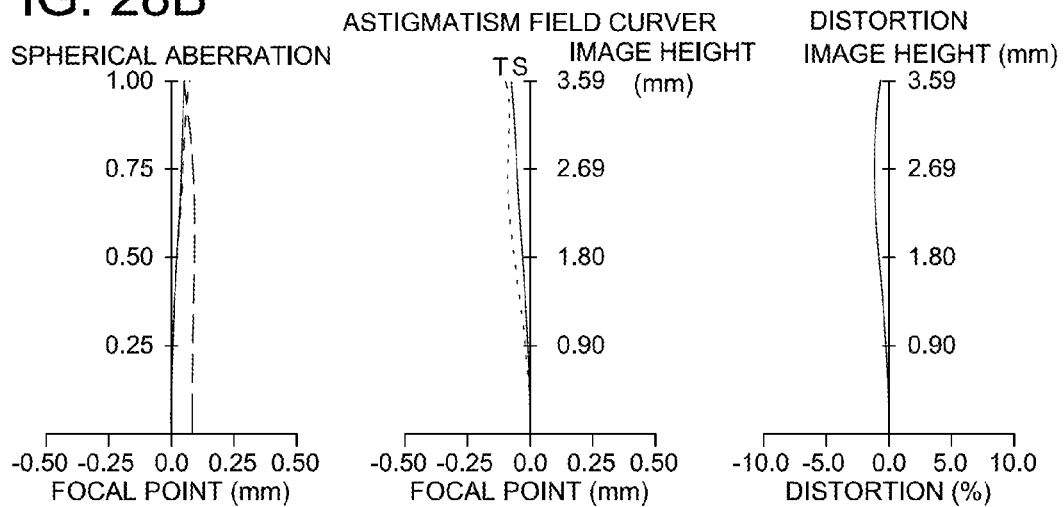
Figure 28C:
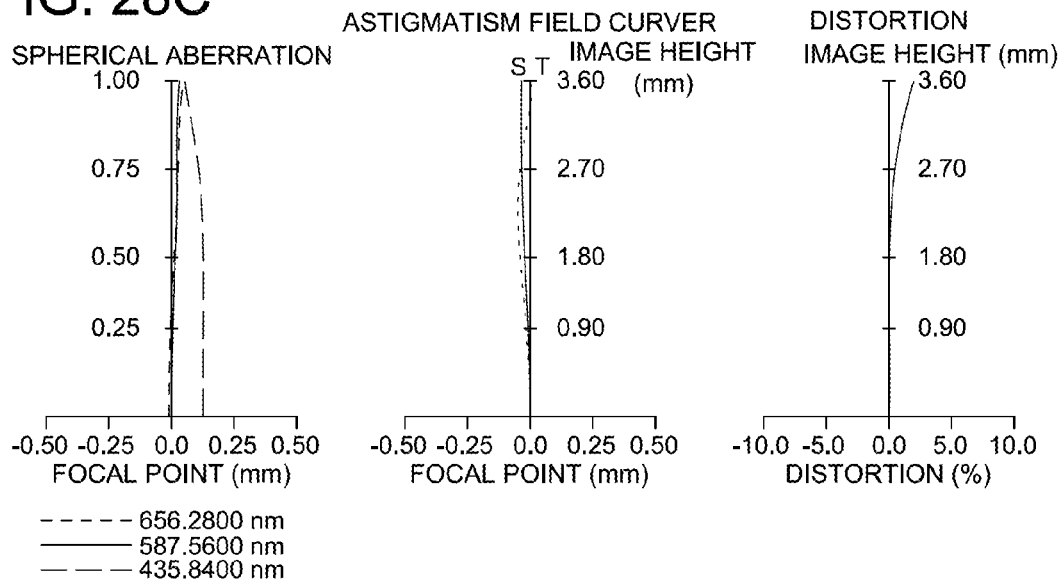

FIG. 8 is a cross-sectional view diagram showing an example of the arrangement of lens groups in a variable power optical system according to the Implementation Example 3. FIG. 9 is a diagram showing the form of movement of the different lens groups during power variation of a variable power optical system of the Implementation Example 3. FIG. 28 is an aberration diagram of a variable power optical system of the Implementation Example 3.

The variable power optical system 1C of the Implementation Example 3, as is shown in FIG. 8, is a negative-positive-negative three component zoom construction with the lens groups (Gr1, Gr2, and Gr3) arranged in sequence from the object side towards the image side to have, a first lens group (Gr1) having on the whole a negative optical power, a second lens group (Gr2) including an aperture opening ST and having on the whole a positive optical power, and a third lens group (Gr3) having on the whole a negative optical power, and at the time of zooming, as is shown in FIG. 9, the first lens group (Gr1) is fixed, while the second lens group (Gr2) and the third lens group (Gr3) both move. The aperture opening ST, as is shown in FIG. 8, moves along with the second lens group (Gr2).

In more concrete terms, the variable power optical system 1C of the Implementation Example 3 is constituted as follows with the different lens groups (Gr1, Gr2, and Gr3) arranged in sequence from the object side towards the image side as follows.

The first lens group (Gr1) is constituted from a negative meniscus lens (the first lens L1), which is convex on the object side, as a single negative lens. Both sides of the first lens L1 are aspherical surfaces.

The second lens group (Gr2) is constituted from a both sides convex positive lens (the second lens L2), an aperture opening ST, and a both sides convex positive lens (the third lens L3). In this manner the second lens group (Gr2) includes an aperture opening ST, the aperture opening ST is placed between the second lens L2 and the third lens L3, and moves together with this second lens group (Gr2). The second lens L2 and the third lens L3 have aspherical surfaces on both sides.

The third lens group (Gr3) has, as the front group (Gr3$f$) a negative meniscus lens (the fourth lens L4) that is concave on the object side, and as the rear lens group (Gr3$b$) a both sides convex positive lens (the fifth lens L5). The fourth and fifth lenses L4 and L5 both have aspherical surfaces on both sides.

Further, on the image side of the third lens group (Gr3) is placed, via a parallel plate FT, the light receiving surface (imaging surface) of an imaging element SR The parallel plate FT is various types of optical filters, or the cover glass of the imaging element, etc.

In the variable power optical system 1C of this Implementation Example 3, at the time of varying the power from the wide angle end, through the middle point, to the telephoto end, as is shown in FIG. 9, the first lens group (Gr1) is fixed, the second lens group (Gr2) is moved in a curved manner so as to move towards the object (in a curve that is convex towards the object), and the third lens group (Gr3) is moved in a relatively gradually curved manner so as to move towards the object (in a curve that is convex towards the object), and the aperture opening ST moves along with the second lens group (Gr2). During this type of power variation from the wide angle end towards the telephoto end, the first group (Gr1) and the second group (Gr2), and the first group (Gr1) and the third group (Gr3) move so that their respective spacing becomes smaller, and the second group (Gr2) and the third group (Gr3) move so that their spacing becomes larger.

The construction data of the different lenses in the variable power optical system 1C of this Implementation Example 3 is given below.

Numerical Value Implementation Example 3

Unit mm

Surface data

| Surface number | r | d | nd | vd |
|---|---|---|---|---|
| Object surface | ∞ | ∞ | | |
| 1* | 12.6174 | 0.7000 | 1.75450 | 51.56 |
| 2* | 2.2996 | Variable | | |
| 3* | 2.1497 | 1.2848 | 1.64015 | 59.06 |
| 4* | 21.0270 | 0.4424 | | |
| 5 (Aperture) | ∞ | 0.3952 | | |
| 6* | 7.1112 | 1.1498 | 1.57859 | 61.27 |
| 7* | −2.7760 | Variable | | |
| 8* | −1.6781 | 0.6000 | 1.99442 | 20.65 |
| 9* | −10.2655 | 1.5132 | | |

-continued

Unit mm

| | | | | |
|---|---|---|---|---|
| 10* | 23.3814 | 1.5224 | 2.00170 | 20.59 |
| 11* | −11.3000 | Variable | | |
| 12 | ∞ | 0.3000 | 1.51680 | 64.20 |
| 13 | ∞ | 0.3000 | | |
| Image surface | ∞ | | | |

Aspherical surface data

First surface

K = 0.00000e+000, A4 = 2.59195e−003, A6 = −8.94631e−005,
A8 = −3.24372e−006, A10 = 3.79659e−007
Second surface K = 0.00000e+000, A4 = 2.97022e−003, A6 = 2.87666e−004,
A8 = 4.03800e−005, A10 = −2.37724e−005
Third surface K = 0.00000e+000, A4 = −1.95300e−004, A6 = 1.02292e−003,
A8 = −2.49240e−004, A10 = 1.85337e−004
Fourth surface K = 0.00000e+000, A4 = 1.20109e−002, A6 = 8.33971e−004,
A8 = 5.94627e−004, A10 = 2.18635e−004
Sixth surface K = 0.00000e+000, A4 = −3.01920e−002, A6 = −2.18034e−002,
A8 = 5.21537e−003, A10 = −1.78632e−002
Seventh surface K = 0.00000e+000, A4 = −3.79732e−002, A6 = −7.92555e−003,
A8 = −3.94979e−004, A10 = −2.63545e−003
Eighth surface K = 0.00000e+000, A4 = −1.32718e−002, A6 = 1.87234e−002,
A8 = 9.22477e−003, A10 = −4.03894e−003
Ninth surface K = 0.00000e+000, A4 = −1.63399e−003, A6 = 1.23796e−002,
A8 = −2.20081e−003, A10 = 5.96643e−005
Tenth surface K = 0.00000e+000, A4 = −5.37580e−003, A6 = 4.30194e−004,
A8 = −1.21108e−005, A10 = 1.28388e−007
Eleventh surface K = 0.00000e+000, A4 = −2.81540e−003, A6 = 3.47505e−005,
A8 = 8.45659e−006, A10 = −4.49837e−007

Various data

Zoom data
Zoom ratio 2.74

| | Wide angle | Middle point | Telephoto |
|---|---|---|---|
| Focal distance | 3.366 | 6.548 | 9.222 |
| F-Number | 4.221 | 5.999 | 7.100 |
| Angle of view | 48.423 | 28.977 | 20.904 |
| Image height | 3.600 | 3.600 | 3.600 |
| Overall lens length | 13.314 | 13.314 | 13.313 |
| BF | 0.798 | 3.246 | 3.909 |
| d2 | 4.405 | 1.723 | 0.594 |
| d7 | 0.504 | 0.737 | 1.202 |
| d11 | 0.308 | 2.740 | 3.396 |

Zoom lens group data

| Group | Starting surface | Ending surface | Focal distance |
|---|---|---|---|
| 1 | 1 | 2 | −3.839 |
| 2 | 3 | 7 | 2.620 |
| 3 | 8 | 11 | −4.961 |

With the above lens placement and constitution, the spherical aberration (sine condition), astigmatism, and distortion in the imaging lens 1C of the Implementation Example 3 are shown in FIG. 28.

Implementation Example 4

Figure 10A:
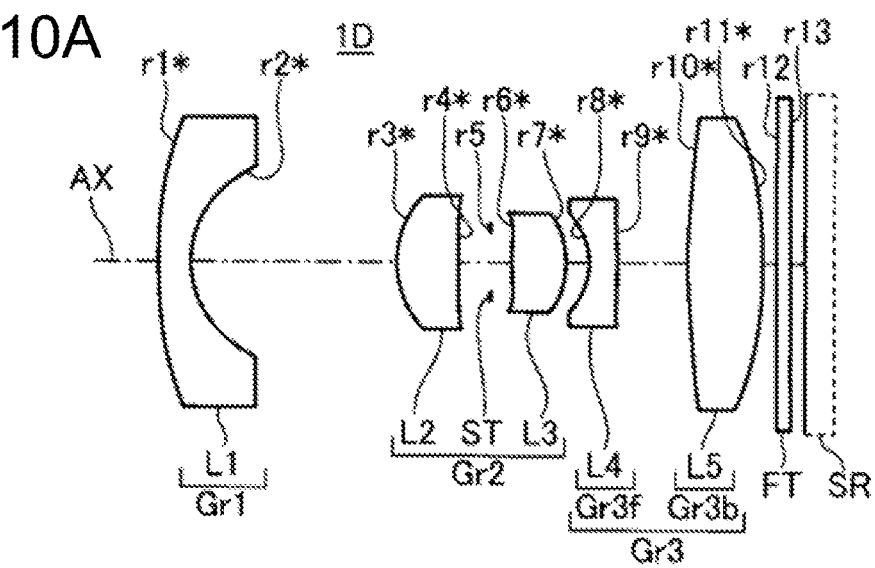
FIGS. 10A, 10B, and 10C are cross-sectional view diagrams showing an example of the arrangement of lens groups in a variable power optical system according to the Implementation Example 4.
Figure 10B:
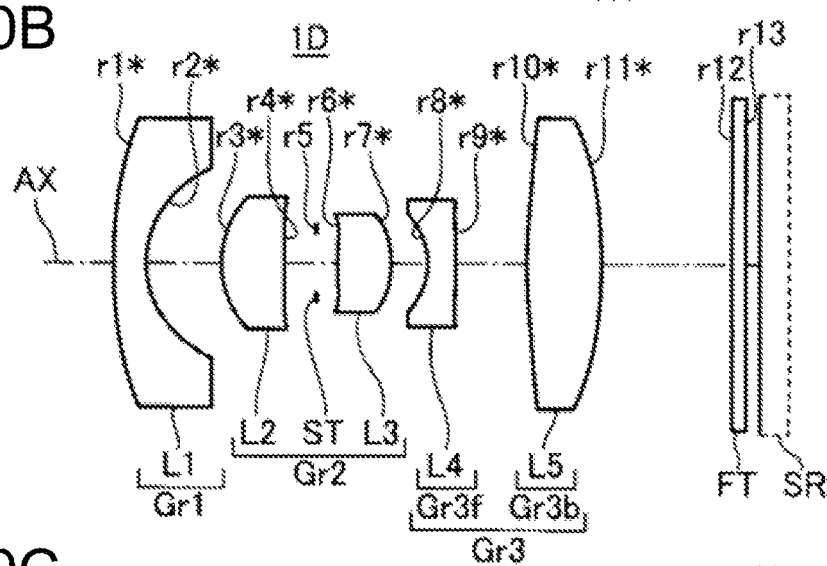
Figure 10C:
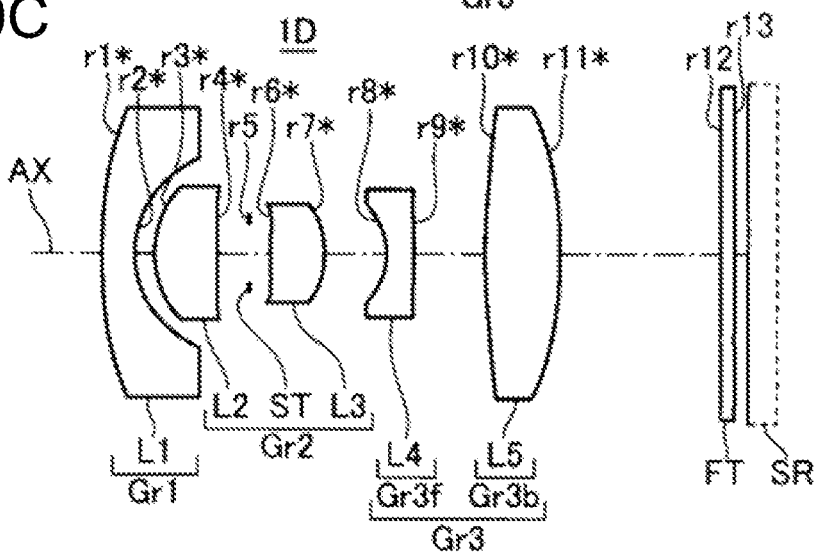
Figure 29A:
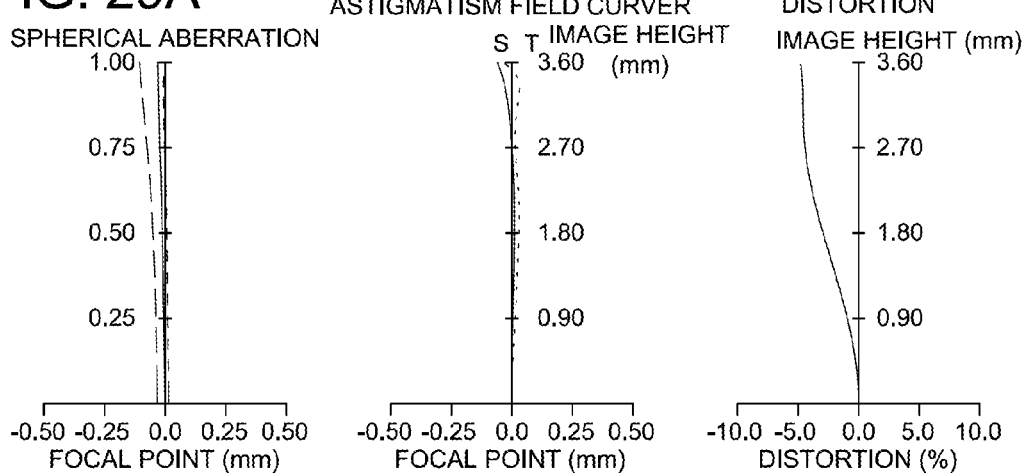
FIGS. 29A, 29B, and 29C are aberration diagrams of a variable power optical system of the Implementation Example 4.
Figure 29B:
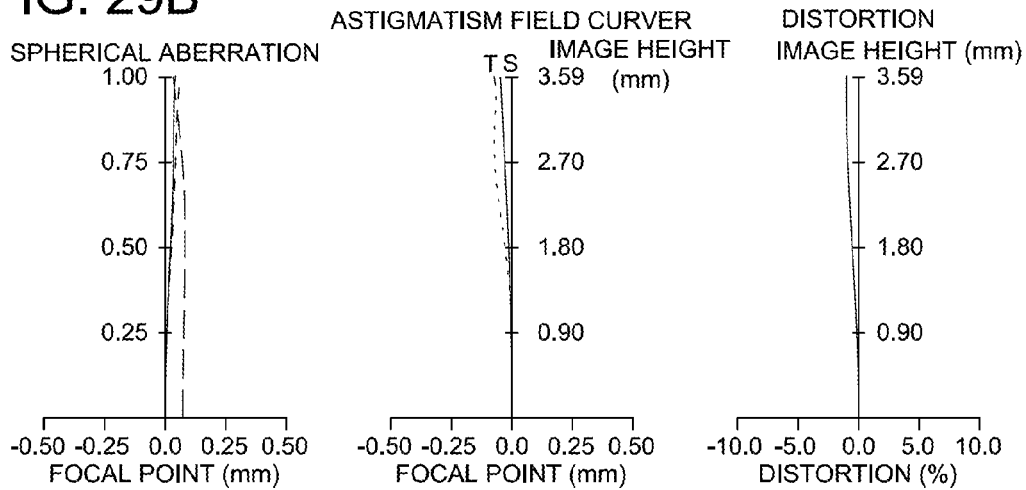
Figure 29C:
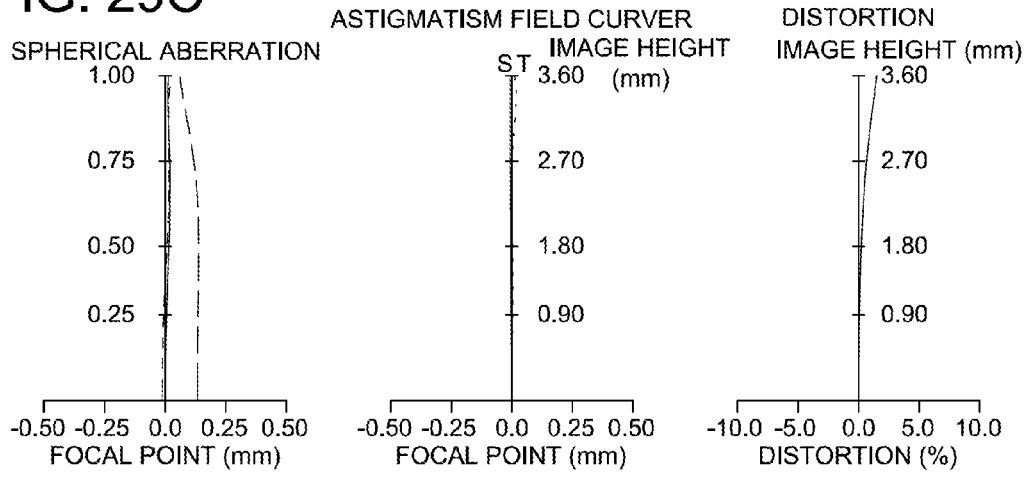

FIG. 10 is a cross-sectional view diagram showing an example of the arrangement of lens groups in a variable power optical system according to the Implementation Example 4. FIG. 11 is a diagram showing the form of movement of the different lens groups during power variation of a variable power optical system of the Implementation Example 4. FIG. 29 is an aberration diagram of a variable power optical system of the Implementation Example 4.

The variable power optical system 1D of the Implementation Example 4, as is shown in FIG. 10, is a negative-positive-negative three component zoom construction with the lens groups (Gr1, Gr2, and Gr3) arranged in sequence from the object side towards the image side to have, a first lens group (Gr1) having on the whole a negative optical power, a second lens group (Gr2) including an aperture opening ST and having on the whole a positive optical power, and a third lens group (Gr3) having on the whole a negative optical power, and at the time of zooming, as is shown in FIG. 11, the first lens group (Gr1) is fixed, while the second lens group (Gr2) and the third lens group (Gr3) both move. The aperture opening ST, as is shown in FIG. 10, moves along with the second lens group (Gr2).

In more concrete terms, the variable power optical system 1D of the Implementation Example 4 is constituted as follows with the different lens groups (Gr1, Gr2, and Gr3) arranged in sequence from the object side towards the image side as follows.

The first lens group (Gr1) is constituted from a negative meniscus lens (the first lens L1), which is convex on the object side, as a single negative lens. Both sides of the first lens L1 are aspherical surfaces.

The second lens group (Gr2) is constituted from a both sides convex positive lens (the second lens L2), an aperture opening ST, and a both sides convex positive lens (the third lens L3). In this manner the second lens group (Gr2) includes an aperture opening ST, the aperture opening ST is placed between the second lens L2 and the third lens L3, and moves together with this second lens group (Gr2). The second lens L2 and the third lens L3 have aspherical surfaces on both sides.

The third lens group (Gr3) has, as the front group (Gr3f) a negative meniscus lens (the fourth lens L4) that is concave on the object side, and as the rear lens group (Gr3b) a both sides convex positive lens (the fifth lens L5). The fourth and fifth lenses L4 and L5 both have aspherical surfaces on both sides.

Further, on the image side of the third lens group (Gr3) is placed, via a parallel plate FT, the light receiving surface (imaging surface) of an imaging element SR The parallel plate FT is various types of optical filters, or the cover glass of the imaging element, etc.

In the variable power optical system 1D of this Implementation Example 4, at the time of varying the power from the wide angle end, through the middle point, to the telephoto end, as is shown in FIG. 11, the first lens group (Gr1) is fixed, the second lens group (Gr2) is moved in a curved manner so as to move towards the object (in a curve that is convex towards the object), and the third lens group (Gr3) is moved in a relatively gradually curved manner so as to move towards the object (in a curve that is convex towards the object), and the aperture opening ST moves along with the second lens group (Gr2). During this type of power variation from the wide angle end towards the telephoto end, the first group (Gr1) and the second group (Gr2), and the first group (Gr1) and the third group (Gr3) move so that their respective spacing becomes smaller, and the second group (Gr2) and the third group (Gr3) move so that their spacing becomes larger.

The construction data of the different lenses in the variable power optical system 1D of this Implementation Example 4 is given below.

Numerical Value Implementation Example 4

| Unit mm | | | | |
|---|---|---|---|---|
| Surface data | | | | |
| Surface number | r | d | nd | vd |
| Object surface | ∞ | ∞ | | |
| 1* | 15.9658 | 0.7000 | 1.74944 | 51.81 |
| 2* | 2.4449 | Variable | | |
| 3* | 2.3564 | 1.3412 | 1.61286 | 61.69 |
| 4* | −98.1335 | 0.6775 | | |
| 5 (Aperture) | ∞ | 0.4662 | | |
| 6* | 11.2224 | 1.1538 | 1.54969 | 68.80 |
| 7* | −2.4396 | Variable | | |
| 8* | −1.5846 | 0.6000 | 1.82114 | 24.05 |
| 9* | −14.6529 | 1.5229 | | |
| 10* | 12.3935 | 1.6097 | 1.82114 | 24.05 |
| 11* | −13.2328 | Variable | | |
| 12 | ∞ | 0.3000 | 1.51680 | 64.20 |
| 13 | ∞ | 0.3000 | | |
| Image surface | ∞ | | | |

Aspherical surface data

First surface

K = 0.00000e+000, A4 = 2.71623e−003, A6 = −1.09201e−004, A8 = −3.51360e−006, A10 = 3.71380e−007
Second surface K = 0.00000e+000, A4 = 3.04603e−003, A6 = −4.92241e−005, A8 = 1.49656e−004, A10 = −3.94034e−005
Third surface K = 0.00000e+000, A4 = −1.08838e−003, A6 = 7.29077e−004, A8 = −2.98727e−004, A10 = 1.21046e−004
Fourth surface K = 0.00000e+000, A4 = 8.64007e−003, A6 = 1.45506e−004, A8 = 3.64774e−004, A10 = 8.58387e−005
Sixth surface K = 0.00000e+000, A4 = −2.89966e−002, A6 = −2.02397e−002, A8 = 2.49041e−003, A10 = −1.37424e−002
Seventh surface K = 0.00000e+000, A4 = −2.93127e−002, A6 = −1.08407e−002, A8 = 3.01610e−003, A10 = −3.61399e−003
Eighth surface K = 0.00000e+000, A4 = −9.29677e−004, A6 = 2.02667e−002, A8 = 4.70282e−003, A10 = −1.42172e−003
Ninth surface K = 0.00000e+000, A4 = −1.31371e−003, A6 = 1.11398e−002, A8 = −2.35122e−003, A10 = 1.57976e−004

-continued

| Unit mm |
|---|
| Tenth surface |

K = 0.00000e+000, A4 = −4.79750e−003, A6 = 4.50956e−004, A8 = −2.20297e−005, A10 = 5.22302e−007
Eleventh surface K = 0.00000e+000, A4 = −1.42619e−003, A6 = −4.92437e−005, A8 = 1.16658e−005, A10 = −6.12440e−007

Various data

| Zoom data Zoom ratio 2.74 | | | |
|---|---|---|---|
| | Wide angle | Middle point | Telephoto |
| Focal distance | 3.523 | 6.853 | 9.646 |
| F-Number | 4.158 | 5.969 | 7.100 |
| Angle of view | 47.168 | 29.008 | 21.503 |
| Image height | 3.800 | 3.800 | 3.800 |
| Overall lens length | 13.798 | 13.798 | 13.798 |
| BF | 0.798 | 3.307 | 3.955 |
| d2 | 4.419 | 1.623 | 0.432 |
| d7 | 0.510 | 0.797 | 1.339 |
| d11 | 0.311 | 2.804 | 3.440 |

| Zoom lens group data | | | |
|---|---|---|---|
| Group | Starting surface | Ending surface | Focal distance |
| 1 | 1 | 2 | −3.940 |
| 2 | 3 | 7 | 2.870 |
| 3 | 8 | 11 | −5.105 |

With the above lens placement and constitution, the spherical aberration (sine condition), astigmatism, and distortion in the imaging lens 1D of the Implementation Example 4 are shown in FIG. 29.

Implementation Example 5

Figure 12A:
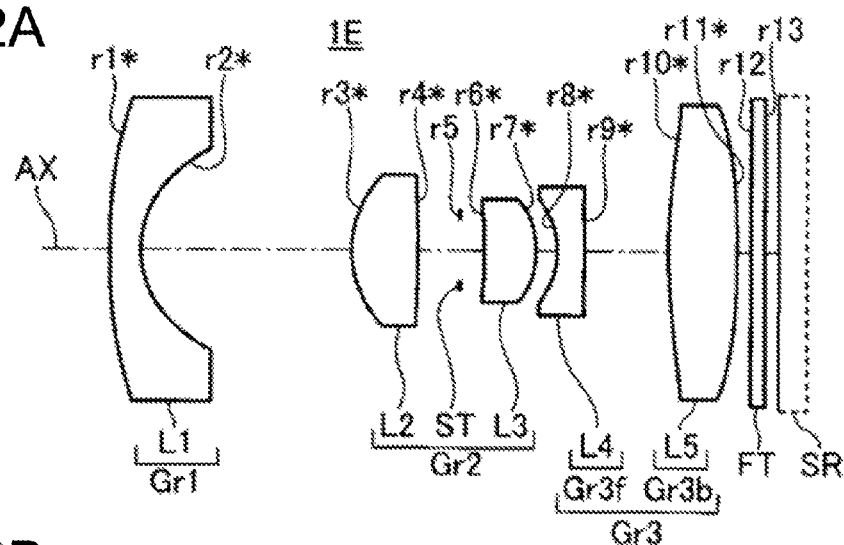
FIGS. 12A, 12B, and 12C are cross-sectional view diagrams showing an example of the arrangement of lens groups in a variable power optical system according to the Implementation Example 5.
Figure 12B:
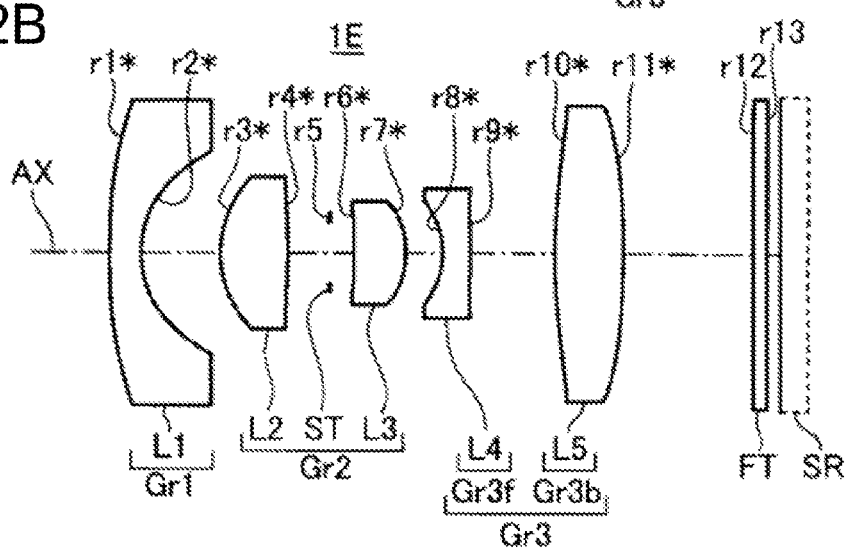
Figure 12C:
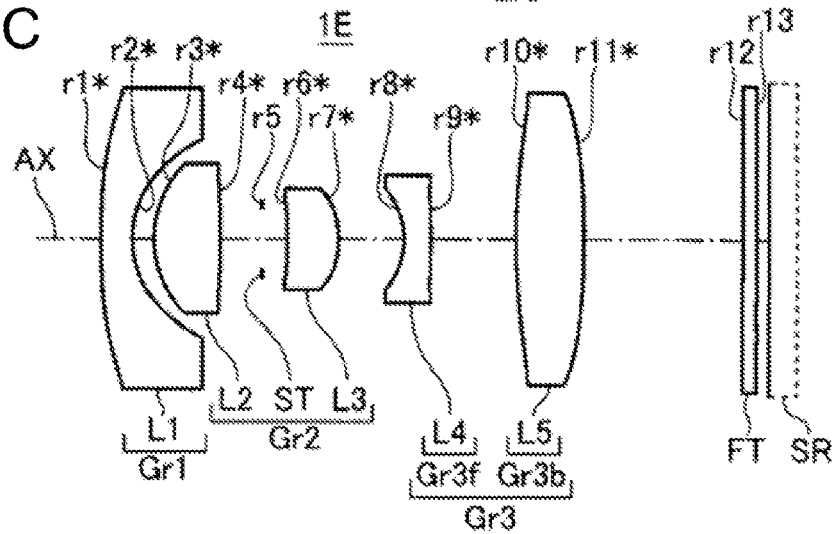
Figure 30A:
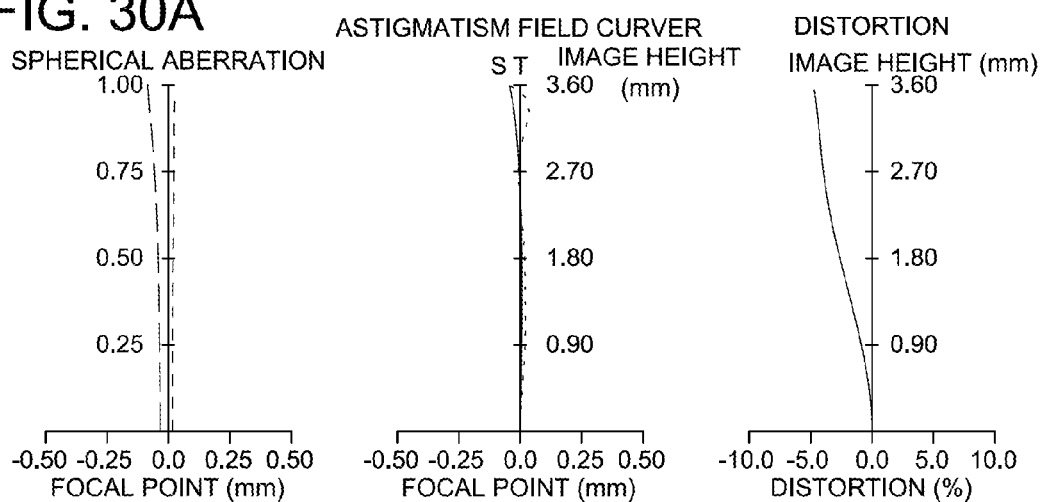
FIGS. 30A, 30B, and 30C are aberration diagrams of a variable power optical system of the Implementation Example 5.
Figure 30B:
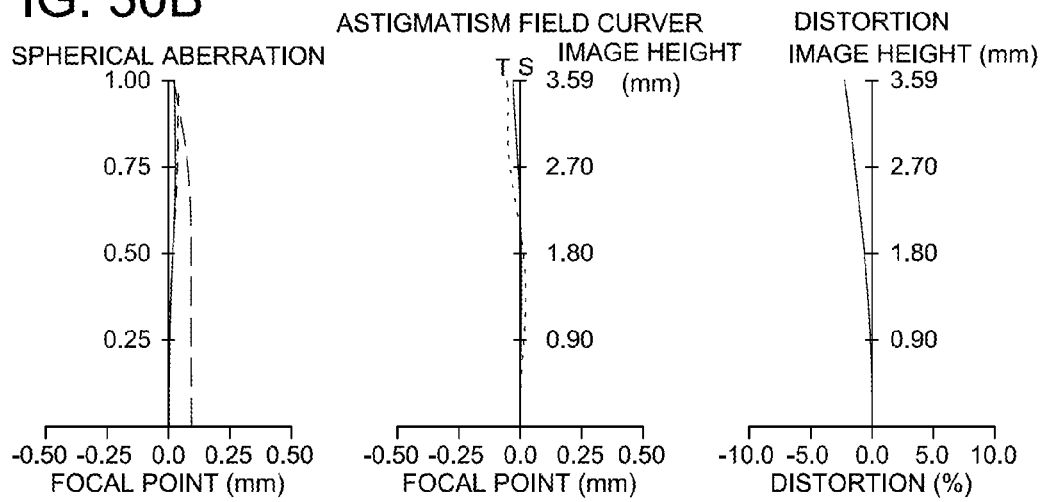
Figure 30C:
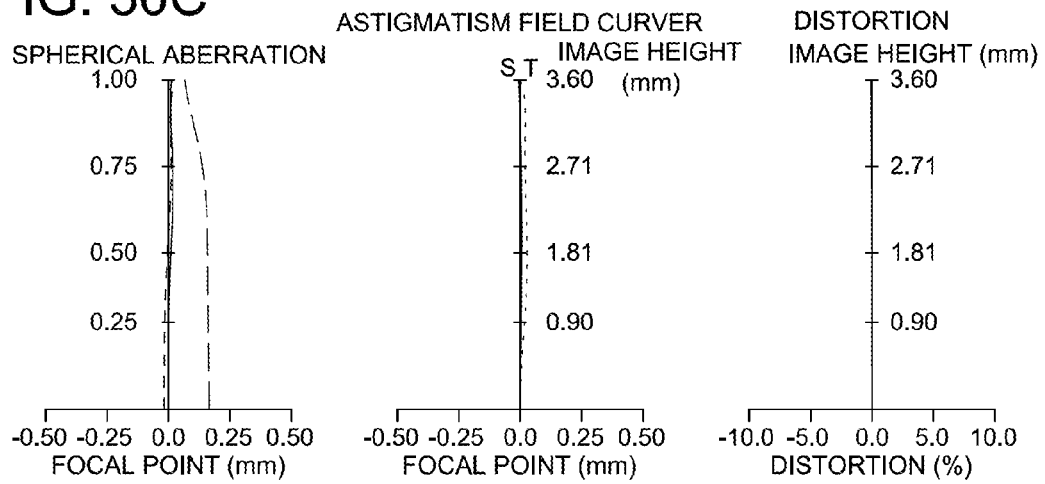

FIG. 12 is a cross-sectional view diagram showing an example of the arrangement of lens groups in a variable power optical system according to the Implementation Example 5. FIG. 13 is a diagram showing the form of movement of the different lens groups during power variation of a variable power optical system of the Implementation Example 5. FIG. 30 is an aberration diagram of a variable power optical system of the Implementation Example 5.

The variable power optical system 1E of the Implementation Example 5, as is shown in FIG. 12, is a negative-positive-negative three component zoom construction with the lens groups (Gr1, Gr2, and Gr3) arranged in sequence from the object side towards the image side to have, a first lens group (Gr1) having on the whole a negative optical power, a second lens group (Gr2) including an aperture opening ST and having on the whole a positive optical power, and a third lens group (Gr3) having on the whole a negative optical power, and at the time of zooming, as is shown in FIG. 13, the first lens group (Gr1) is fixed, while the second lens group (Gr2) and the third lens group (Gr3) both move. The aperture opening ST, as is shown in FIG. 12, moves along with the second lens group (Gr2).

In more concrete terms, the variable power optical system 1E of the Implementation Example 5 is constituted as follows with the different lens groups (Gr1, Gr2, and Gr3) arranged in sequence from the object side towards the image side as follows.

The first lens group (Gr1) is constituted from a negative meniscus lens (the first lens L1), which is convex on the object side, as a single negative lens. Both sides of the first lens L1 are aspherical surfaces.

The second lens group (Gr2) is constituted from a both sides convex positive lens (the second lens L2), an aperture opening ST, and a positive meniscus lens (the third lens L3), which is concave on the object side. In this manner the second lens group (Gr2) includes an aperture opening ST, the aperture opening ST is placed between the second lens L2 and the third lens L3, and moves together with this second lens group (Gr2). The second lens L2 and the third lens L3 have aspherical surfaces on both sides.

The third lens group (Gr3) has, as the front group (Gr3f) a negative meniscus lens (the fourth lens L4) that is concave on the object side, and as the rear lens group (Gr3b) a both sides convex positive lens (the fifth lens L5). The fourth and fifth lenses L4 and L5 both have aspherical surfaces on both sides.

Further, on the image side of the third lens group (Gr3) is placed, via a parallel plate FT, the light receiving surface (imaging surface) of an imaging element SR The parallel plate FT is various types of optical filters, or the cover glass of the imaging element, etc.

In the variable power optical system 1E of this Implementation Example 5, at the time of varying the power from the wide angle end, through the middle point, to the telephoto end, as is shown in FIG. 13, the first lens group (Gr1) is fixed, the second lens group (Gr2) is moved in a curved manner so as to move towards the object (in a curve that is convex towards the object), and the third lens group (Gr3) is moved in a relatively gradually curved manner so as to move towards the object (in a curve that is convex towards the object), and the aperture opening ST moves along with the second lens group (Gr2). During this type of power variation from the wide angle end towards the telephoto end, the first group (Gr1) and the second group (Gr2), and the first group (Gr1) and the third group (Gr3) move so that their respective spacing becomes smaller, and the second group (Gr2) and the third group (Gr3) move so that their spacing becomes larger.

The construction data of the different lenses in the variable power optical system 1E of this Implementation Example 5 is given below.

Numerical Value Implementation Example 5

| Unit mm | | | | |
|---|---|---|---|---|
| Surface data | | | | |
| Surface number | r | d | nd | vd |
| Object surface | ∞ | ∞ | | |
| 1* | 26.1624 | 0.7000 | 1.74329 | 49.32 |
| 2* | 2.6094 | Variable | | |
| 3* | 2.6164 | 1.4902 | 1.58912 | 61.24 |
| 4* | −15.7891 | 0.9240 | | |
| 5 (Aperture) | ∞ | 0.5452 | | |
| 6* | −369.7917 | 1.1512 | 1.59201 | 67.02 |
| 7* | −2.3676 | Variable | | |
| 8* | −1.9002 | 0.6000 | 1.82114 | 24.05 |
| 9* | −21.1272 | 1.8807 | | |
| 10* | 12.0972 | 1.5312 | 1.82114 | 24.05 |
| 11* | −28.6789 | Variable | | |
| 12 | ∞ | 0.3000 | 1.51680 | 64.20 |
| 13 | ∞ | 0.3000 | | |
| Image surface | ∞ | | | |

-continued

| Unit mm |
|---|
| Aspherical surface data |

First surface

K = 0.00000e+000, A4 = 3.44696e−003, A6 = −1.49312e−004, A8 = −5.89446e−006, A10 = 4.55112e−007

Second surface

K = 0.00000e+000, A4 = 3.75919e−003, A6 = −1.81468e−004, A8 = 1.91166e−004, A10 = −4.81285e−005

Third surface

K = 0.00000e+000, A4 = −1.71347e−003, A6 = 2.18507e−004, A8 = −1.52881e−004, A10 = 5.43761e−006

Fourth surface

K = 0.00000e+000, A4 = 5.79510e−003, A6 = −2.41064e−004, A8 = −1.67861e−004, A0 = 4.37211e−005

Sixth surface

K = 0.00000e+000, A4 = −2.76521e−002, A6 = −2.29342e−002, A8 = 1.08296e−002, A10 = −1.52428e−002

Seventh surface

K = 0.00000e+000, A4 = −1.98107e−002, A6 = −1.03755e−002, A8 = 3.96418e−003, A10 = −3.02392e−003

Eighth surface

K = 0.00000e+000, A4 = −2.93947e−003, A6 = 1.35488e−002, A8 = 5.04294e−004, A10 = −1.05224e−003

Ninth surface

K = 0.00000e+000, A4 = −2.12763e−003, A6 = 9.79816e−003, A8 = −2.41730e−003, A10 = 1.81287e−004

Tenth surface

K = 0.00000e+000, A4 = −4.31285e−003, A6 = 4.89881e−004, A8 = −2.39540e−005, A10 = 1.35308e−007

Eleventh surface

K = 0.00000e+000, A4 = −2.02479e−003, A6 = 1.77995e−005, A8 = 1.48032e−005, A10 = −1.07978e−00

| Various data |
|---|
| Zoom data |
| Zoom ratio 2.74 |

| | Wide angle | Middle point | Telephoto |
|---|---|---|---|
| Focal distance | 3.603 | 7.008 | 9.861 |
| F-Number | 4.036 | 5.911 | 7.100 |
| Angle of view | 47.470 | 28.600 | 20.702 |
| Image height | 3.720 | 3.720 | 3.720 |
| Overall lens length | 14.798 | 14.798 | 14.798 |
| BF | 0.810 | 3.386 | 4.041 |
| d2 | 4.684 | 1.758 | 0.475 |
| d7 | 0.482 | 0.830 | 1.459 |
| d11 | 0.323 | 2.881 | 3.520 |

| Zoom lens group data | | | |
|---|---|---|---|
| Group | Starting surface | Ending surface | Focal distance |
| 1 | 1 | 2 | −3.949 |
| 2 | 3 | 7 | 3.208 |
| 3 | 8 | 11 | −4.979 |

With the above lens placement and constitution, the spherical aberration (sine condition), astigmatism, and distortion in the imaging lens 1E of the Implementation Example 5 are shown in FIG. 30.

Implementation Example 6

Figure 14A:
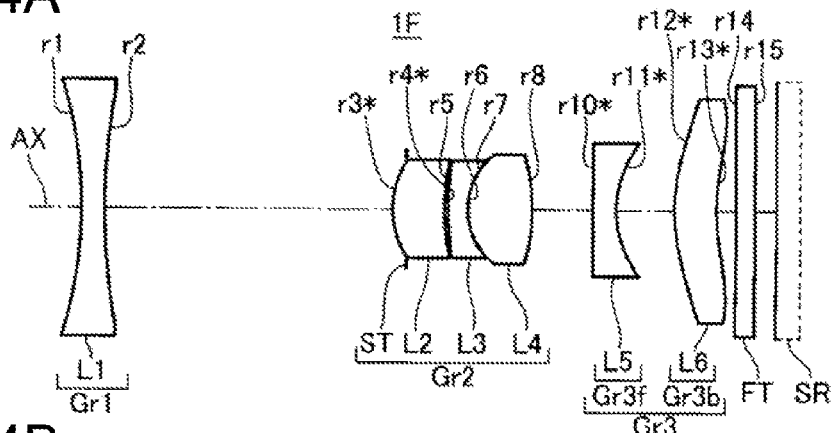
FIGS. 14A, 14B, and 14C are cross-sectional view diagrams showing an example of the arrangement of lens groups in a variable power optical system according to the Implementation Example 6.
Figure 14B:
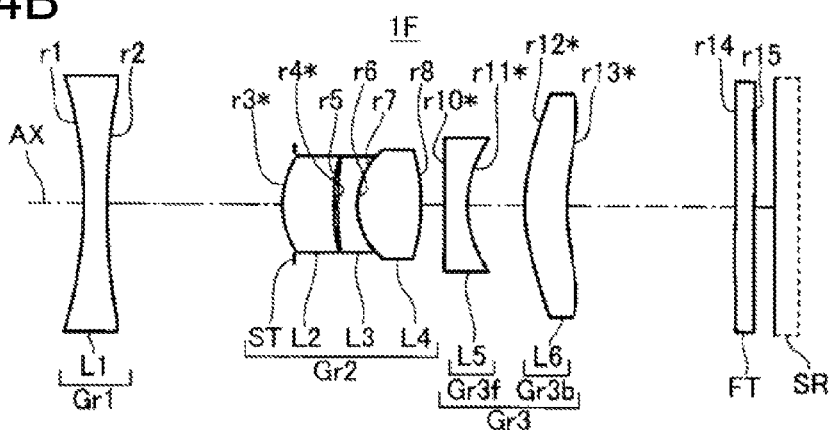
Figure 14C:
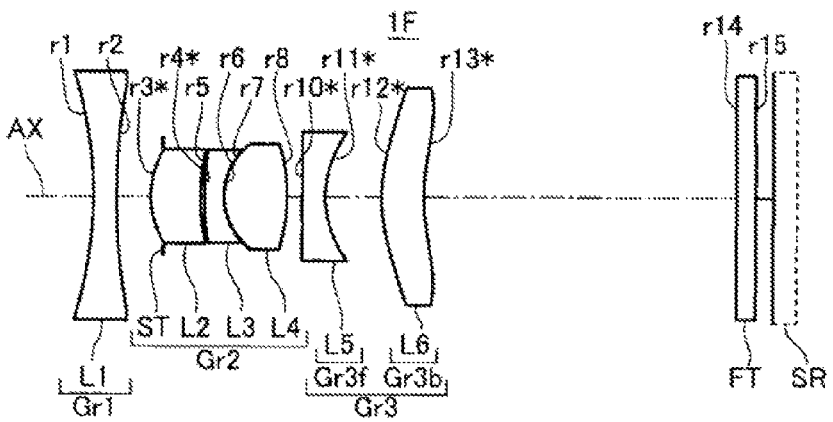
Figure 31A:
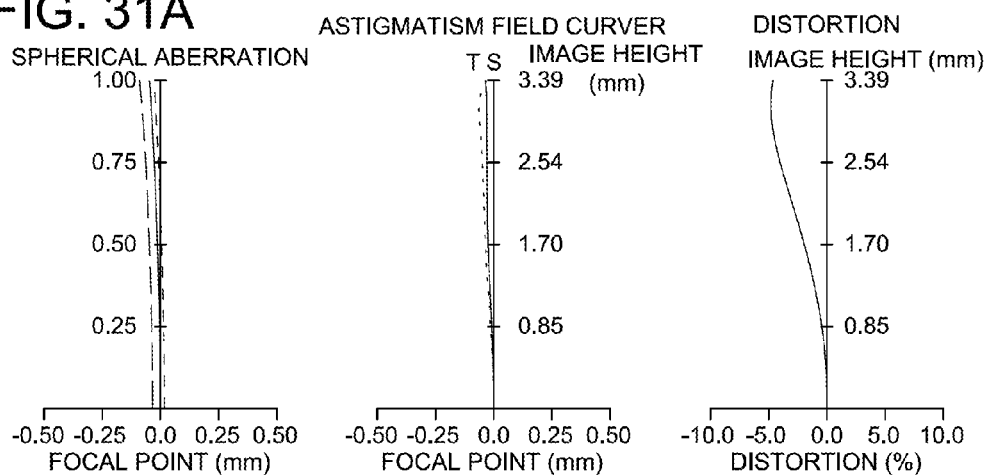
FIGS. 31A, 31B, and 31C are aberration diagrams of a variable power optical system of the Implementation Example 6.
Figure 31B:
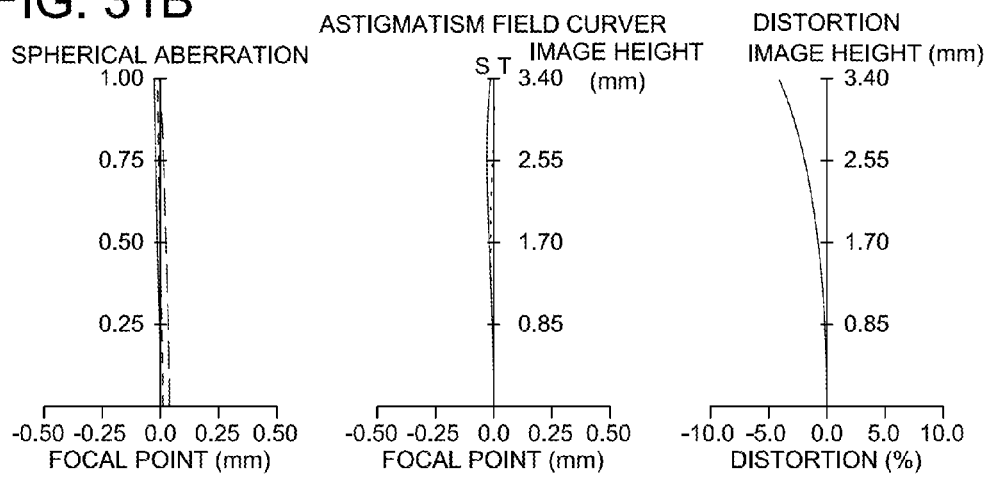
Figure 31C:
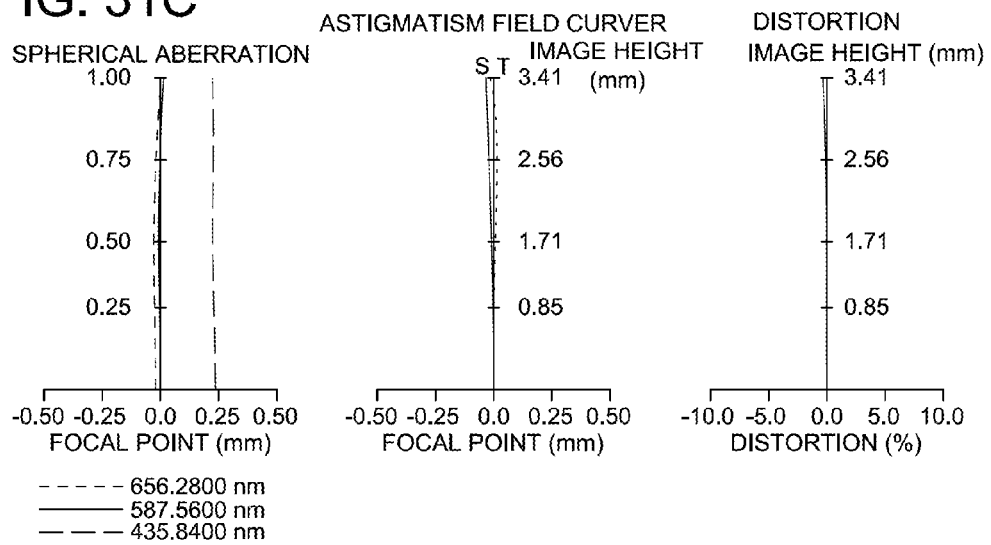

FIG. 14 is a cross-sectional view diagram showing an example of the arrangement of lens groups in a variable power optical system according to the Implementation Example 6. FIG. 15 is a diagram showing the form of movement of the different lens groups during power variation of a variable power optical system of the Implementation Example 6. FIG. 31 is an aberration diagram of a variable power optical system of the Implementation Example 6.

The variable power optical system 1F of the Implementation Example 6, as is shown in FIG. 14, is a negative-positive-negative three component zoom construction with the lens groups (Gr1, Gr2, and Gr3) arranged in sequence from the object side towards the image side to have, a first lens group (Gr1) having on the whole a negative optical power, a second lens group (Gr2) including an aperture opening ST and having on the whole a positive optical power, and a third lens group (Gr3) having on the whole a negative optical power, and at the time of zooming, as is shown in FIG. 15, the first lens group (Gr1) is fixed, while the second lens group (Gr2) and the third lens group (Gr3) both move. The aperture opening ST, as is shown in FIG. 14, moves along with the second lens group (Gr2).

In more concrete terms, the variable power optical system 1F of the Implementation Example 6 is constituted as follows with the different lens groups (Gr1, Gr2, and Gr3) arranged in sequence from the object side towards the image side as follows.

The first lens group (Gr1) is constituted from a both sides concave negative lens (the first lens L1), as a single negative lens.

The second lens group (Gr2) is constituted from an aperture opening ST, a positive meniscus lens (the second lens L2) that is convex on the object side, a negative meniscus lens (the third lens L3) that is convex on the object side, and a both sides convex positive lens (the fourth lens L4). In this manner the second lens group (Gr2) includes an aperture opening ST, the aperture opening ST, so that the aperture opening ST moves together with the second lens group (Gr2), is provided on the outer periphery on the object side surface of the second lens L2, and the object side surface of the second lens L2 is mated with its opening part. Because of this, the surface of the aperture opening ST is extending to the object side surface of the second lens L2. The second lens L2 has aspherical surfaces on both sides. Further, the third lens L3 and the fourth lens L4 are integrated in a fixed manner as a cemented lens. In addition, in the present patent specification, the number of lenses in a cemented lens is not the one overall cemented lens, but is expressed by the number of individual lenses constituting the cemented lens.

The third lens group (Gr3) has, as the front group (Gr3f) a negative meniscus lens (the fifth lens L5) that is convex on the object side, and as the rear lens group (Gr3b) a positive meniscus lens (the sixth lens L6) that is convex on the object side. The fifth and sixth lenses L5 and L6 both have aspherical surfaces on both sides, and for example, are lenses made of a plastic material.

Further, on the image side of the third lens group (Gr3) is placed, via a parallel plate FT, the light receiving surface (imaging surface) of an imaging element SR The parallel plate FT is various types of optical filters, or the cover glass of the imaging element, etc.

In the variable power optical system 1F of this Implementation Example 6, at the time of varying the power from the wide angle end, through the middle point, to the telephoto end, as is shown in FIG. 15, the first lens group (Gr1) is fixed, the second lens group (Gr2) is moved in a curved manner so as to move towards the object (in a curve that is convex towards the object), and the third lens group (Gr3) is moved in a curved manner so as to move towards the object (in a curve that is convex towards the object), and the aperture opening ST moves along with the second lens group (Gr2). During this type of power variation from the wide angle end towards the telephoto end, the first group (Gr1) and the second group (Gr2), the first group (Gr1) and the third group (Gr3), and the second group (Gr2) and the third group (Gr3) move so that their respective spacing becomes smaller.

The construction data of the different lenses in the variable power optical system 1F of this Implementation Example 6 is given below.

Numerical Value Implementation Example 6

Unit mm

Surface data

| Surface number | r | d | nd | vd |
| --- | --- | --- | --- | --- |
| Object surface | ∞ | ∞ | | |
| 1 | −12.6582 | 0.6017 | 1.48740 | 70.43 |
| 2 | 19.5880 | Variable | | |
| 3* (Aperture) | 2.6477 | 1.3355 | 1.58913 | 61.24 |
| 4* | 9.6106 | 0.1004 | | |
| 5 | 11.0970 | 0.5000 | 1.82910 | 41.90 |
| 6 | 2.0182 | 0.0100 | 1.51400 | 42.83 |
| 7 | 2.0182 | 1.6639 | 1.56909 | 61.33 |
| 8 | −5.6982 | 0.1001 | | |
| 9 | ∞ | Variable | | |
| 10* | 49.1135 | 0.6000 | 1.53048 | 55.72 |
| 11* | 2.8943 | 1.5037 | | |
| 12* | 5.1142 | 1.1037 | 1.53048 | 55.72 |
| 13* | 6.1918 | Variable | | |
| 14 | ∞ | 0.5000 | 1.51680 | 64.20 |
| 15 | ∞ | 0.5000 | | |
| Image surface | ∞ | | | |

Aspherical surface data

Third surface

K = 0.00000e+000, A4 = 1.50512e−003, A6 = 6.43329e−004,
A8 = −5.24537e−005, A10 = 7.02653e−005
Fourth surface K = 0.00000e+000, A4 = 1.11651e−002, A6 = 2.02226e−003,
A8 = −2.91277e−004, A10 = 3.23750e−004
Tenth surface K = 0.00000e+000, A4 = −4.71934e−003, A6 = −1.00792e−004,
A8 = 2.16727e−004, A10 = 1.06804e−006
Eleventh surface K = 0.00000e+000, A4 = −7.80656e−003, A6 = −7.52190e−004,
A8 = 3.00546e−004, A10 = −3.21351e−005
Twelfth surface K = 0.00000e+000, A4 = −5.01676e−003, A6 = −2.94759e−005,
A8 = 1.02364e−005, A10 = 1.10577e−007
Thirteenth surface K = 0.00000e+000, A4 = −7.57986e−003, A6 = 1.62809e−004,
A8 = −2.36264e−005, A10 = 1.36748e−006

Various data

Zoom data
Zoom ratio 2.73

| | Wide angle | Middle point | Telephoto |
| --- | --- | --- | --- |
| Focal distance | 6.331 | 10.421 | 17.312 |
| F-Number | 3.575 | 5.178 | 7.100 |
| Angle of view | 29.503 | 18.815 | 11.157 |
| Image height | 3.400 | 3.400 | 3.400 |

-continued

| Unit mm | | | |
|---|---|---|---|
| Overall lens length | 17.880 | 17.853 | 17.785 |
| BF | 1.500 | 5.396 | 9.277 |
| d2 | 7.485 | 4.584 | 0.905 |
| d9 | 1.495 | 0.500 | 0.299 |
| d13 | 0.551 | 4.420 | 8.233 |

| Zoom lens group data | | | |
|---|---|---|---|
| Group | Starting surface | Ending surface | Focal distance |
| 1 | 1 | 2 | −15.680 |
| 2 | 3 | 9 | 5.096 |
| 3 | 10 | 13 | −6.594 |

With the above lens placement and constitution, the spherical aberration (sine condition), astigmatism, and distortion in the imaging lens 1F of the Implementation Example 6 are shown in FIG. 31.

Implementation Example 7

Figure 16A:
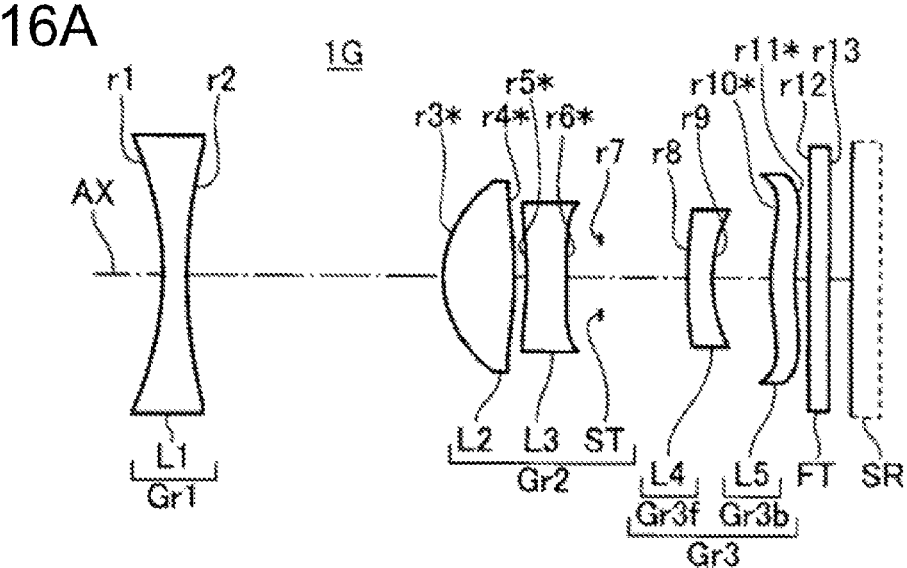
FIGS. 16A, 16B, and 16C are cross-sectional view diagrams showing an example of the arrangement of lens groups in a variable power optical system according to the Implementation Example 7.
Figure 16B:
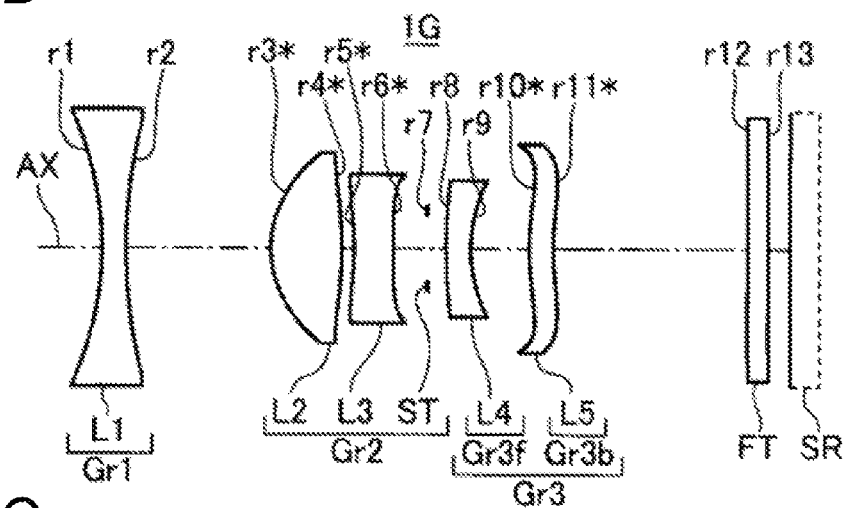
Figure 16C:
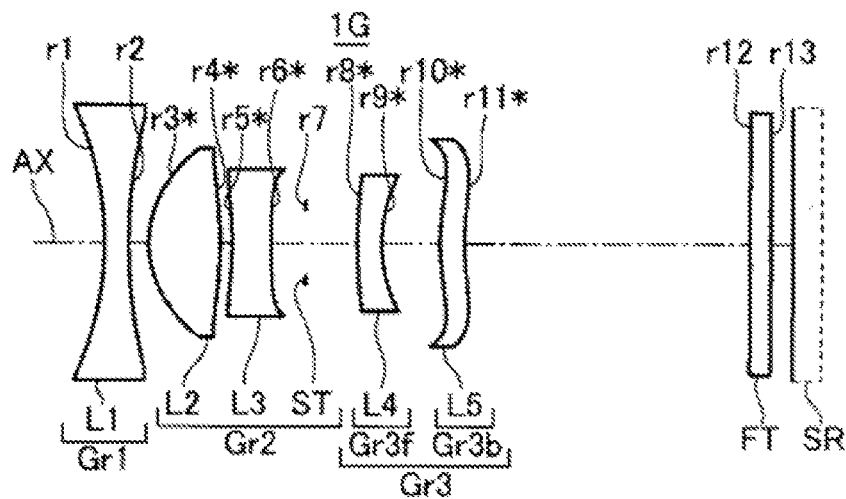
Figure 32A:
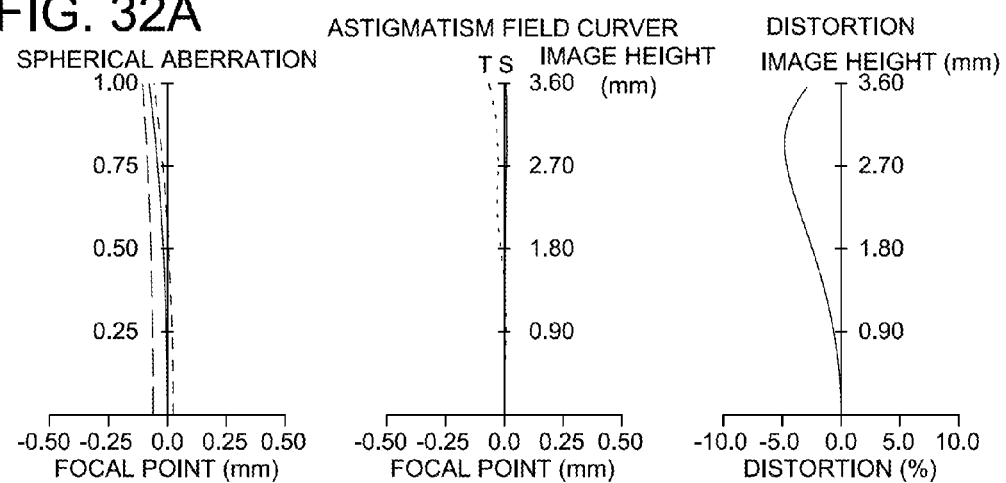
FIGS. 32A, 32B, and 32C are aberration diagrams of a variable power optical system of the Implementation Example 7.
Figure 32B:
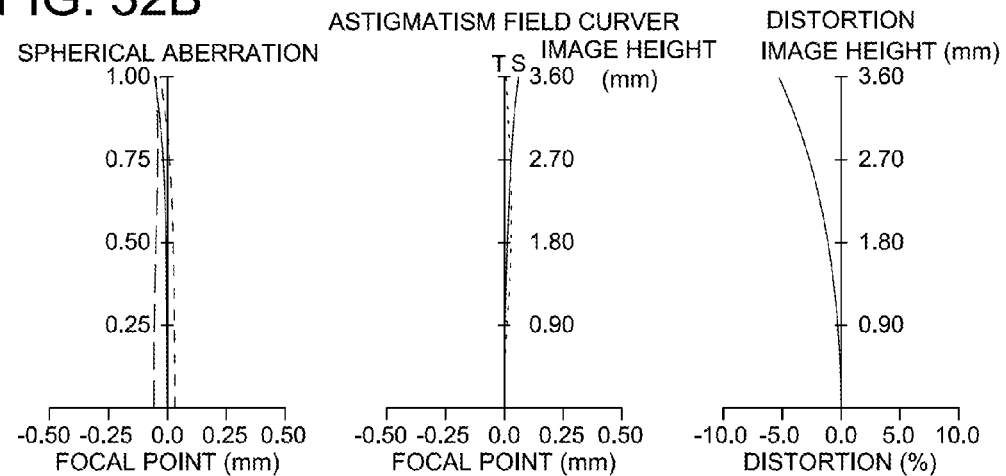
Figure 32C:
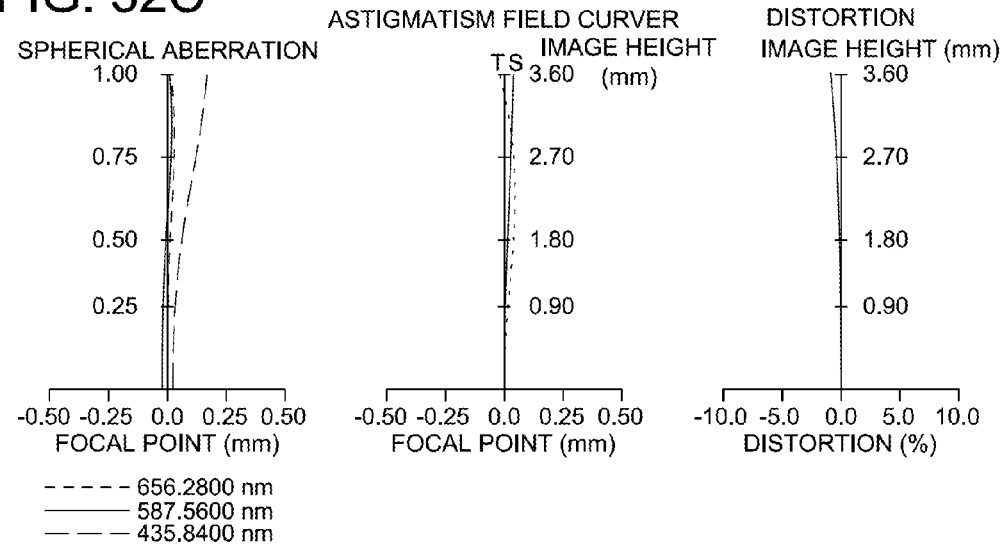

FIG. 16 is a cross-sectional view diagram showing an example of the arrangement of lens groups in a variable power optical system according to the Implementation Example 7. FIG. 17 is a diagram showing the form of movement of the different lens groups during power variation of a variable power optical system of the Implementation Example 7. FIG. 32 is an aberration diagram of a variable power optical system of the Implementation Example 7.

The variable power optical system 1G of the Implementation Example 7, as is shown in FIG. 16, is a negative-positive-negative three component zoom construction with the lens groups (Gr1, Gr2, and Gr3) arranged in sequence from the object side towards the image side to have, a first lens group (Gr1) having on the whole a negative optical power, a second lens group (Gr2) including an aperture opening ST and having on the whole a positive optical power, and a third lens group (Gr3) having on the whole a negative optical power, and at the time of zooming, as is shown in FIG. 17, the first lens group (Gr1) is fixed, while the second lens group (Gr2) and the third lens group (Gr3) both move. The aperture opening ST, as is shown in FIG. 16, moves along with the second lens group (Gr2).

In more concrete terms, the variable power optical system 1G of the Implementation Example 7 is constituted as follows with the different lens groups (Gr1, Gr2, and Gr3) arranged in sequence from the object side towards the image side as follows.

The first lens group (Gr1) is constituted from a both sides concave negative lens (the first lens L1), as a single negative lens.

The second lens group (Gr2) is constituted from a both sides convex positive lens (the second lens L2), a negative meniscus lens (the third lens L3) that is concave on the object side, and an aperture opening ST. In this manner, the second lens group (Gr2) includes an aperture opening ST, the aperture opening ST is placed on the image side of the third lens L3, and moves together with this second lens group (Gr2). The second lens L2 and the third lens L3 have aspherical surfaces on both sides.

The third lens group (Gr3) has, as the front group (Gr3f) a negative meniscus lens (the fourth lens L4) that is convex on the object side, and as the rear lens group (Gr3b) a positive meniscus lens (the fifth lens L5) that is convex on the object side. The fourth and fifth lenses L4 and L5 both have aspherical surfaces on both sides, and for example, are lenses made of a plastic material.

Further, on the image side of the third lens group (Gr3) is placed, via a parallel plate FT, the light receiving surface (imaging surface) of an imaging element SR The parallel plate FT is various types of optical filters, or the cover glass of the imaging element, etc.

In the variable power optical system 1G of this Implementation Example 7, at the time of varying the power from the wide angle end, through the middle point, to the telephoto end, as is shown in FIG. 17, the first lens group (Gr1) is fixed, the second lens group (Gr2) is moved in a curved manner so as to move towards the object (in a curve that is convex towards the object), and the third lens group (Gr3) is moved relatively gradually in a curved manner so as to move towards the object (in a curve that is convex towards the object), and the aperture opening ST moves along with the second lens group (Gr2). During this type of power variation from the wide angle end towards the telephoto end, the first group (Gr1) and the second group (Gr2), the first group (Gr1) and the third group (Gr3) move so that their respective spacing becomes smaller, and the second group (Gr2) and the third group (Gr3), after moving at the middle point temporarily so that the spacing between them becomes smaller, move again so that their respective spacing becomes larger.

The construction data of the different lenses in the variable power optical system 1G of this Implementation Example 7 is given below.

Numerical Value Implementation Example 7

| Unit mm | | | | |
|---|---|---|---|---|
| Surface data | | | | |
| Surface number | R | d | nd | vd |
| Object surface | ∞ | ∞ | | |
| 1 | −9.0972 | 0.6000 | 1.49700 | 81.61 |
| 2 | 14.4432 | Variable | | |
| 3* | 2.9945 | 1.7574 | 1.58913 | 61.24 |
| 4* | −10.6544 | 0.3000 | | |
| 5* | −9.2565 | 0.9780 | 1.82184 | 23.25 |
| 6* | −152.3293 | 0.8373 | | |
| 7 (Aperture) | ∞ | Variable | | |
| 8 | 14.3523 | 0.6000 | 1.48749 | 70.44 |
| 9 | 4.0966 | 1.4500 | | |
| 10* | 6.2843 | 0.6000 | 1.60700 | 27.09 |
| 11* | 6.9666 | Variable | | |
| 12 | ∞ | 0.5000 | 1.51680 | 64.20 |
| 13 | ∞ | 0.5000 | | |
| Image surface | ∞ | | | |

| Aspherical surface data |
|---|
| Third surface |

K = 0.00000e+000, A4 = −1.11541e−003, A6 = −2.66328e−005, A8 = −3.54198e−005, A10 = 1.02073e−006
Fourth surface K = 0.00000e+000, A4 = 2.74860e−003, A6 = 7.81740e−005, A8 = 2.08549e−005, A10 = −2.06030e−006
Fifth surface K = 0.00000e+000, A4 = 6.28485e−003, A6 = 6.45849e−004, A8 = −2.30859e−005, A10 = −6.12957e−006

-continued

Unit mm

Sixth surface

K = 0.00000e+000, A4 = 1.08449e−002, A6 = 2.00891e−003,
A8 = −3.16085e−004, A10 = 1.37724e−004

Tenth surface

K = 0.00000e+000, A4 = −1.44376e−002, A6 = 1.72192e−003,
A8 = −2.16804e−004, A10 = −5.15958e−006

Eleventh surface

K = 0.00000e+000, A4 = −1.62581e−002, A6 = 1.57776e−003,
A8 = −1.85613e−004, A10 = 8.87265e−008

Various data

Zoom data
Zoom ratio 2.77

| | Wide angle | Middle point | Telephoto |
|---|---|---|---|
| Focal distance | 6.168 | 10.218 | 17.098 |
| F-Number | 3.445 | 5.013 | 7.100 |
| Angle of view | 31.068 | 20.471 | 12.007 |
| Image height | 3.600 | 3.600 | 3.600 |
| Overall lens length | 16.879 | 16.879 | 16.879 |
| BF | 1.232 | 5.707 | 7.966 |
| d2 | 6.347 | 3.585 | 0.500 |
| d7 | 2.177 | 0.464 | 1.290 |
| d11 | 0.402 | 4.877 | 7.136 |

Zoom lens group data

| Group | Starting surface | Ending surface | Focal distance |
|---|---|---|---|
| 1 | 1 | 2 | −11.1360 |
| 2 | 3 | 7 | 5.548 |
| 3 | 8 | 11 | −13.858 |

With the above lens placement and constitution, the spherical aberration (sine condition), astigmatism, and distortion in the imaging lens 1G of the Implementation Example 7 are shown in FIG. 32.

Implementation Example 8

Figure 33A:
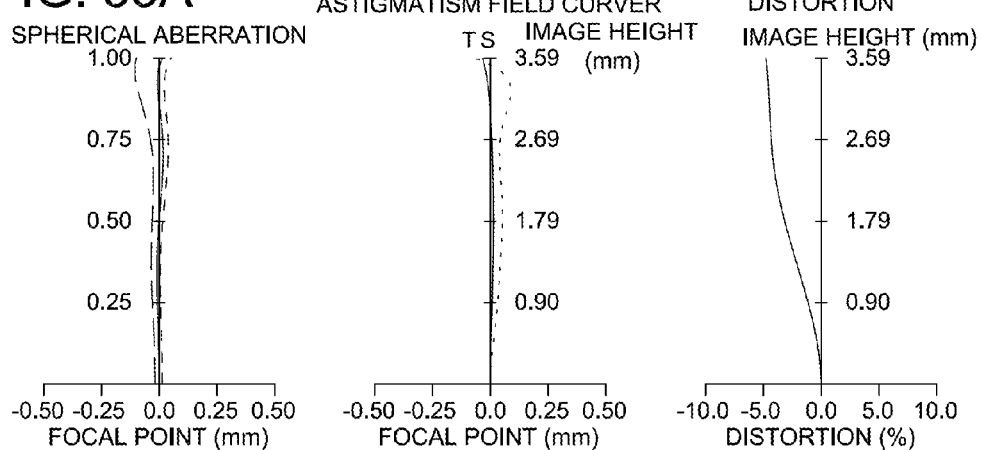
FIGS. 33A, 33B, and 33C are aberration diagrams of a variable power optical system of the Implementation Example 8.
Figure 33B:
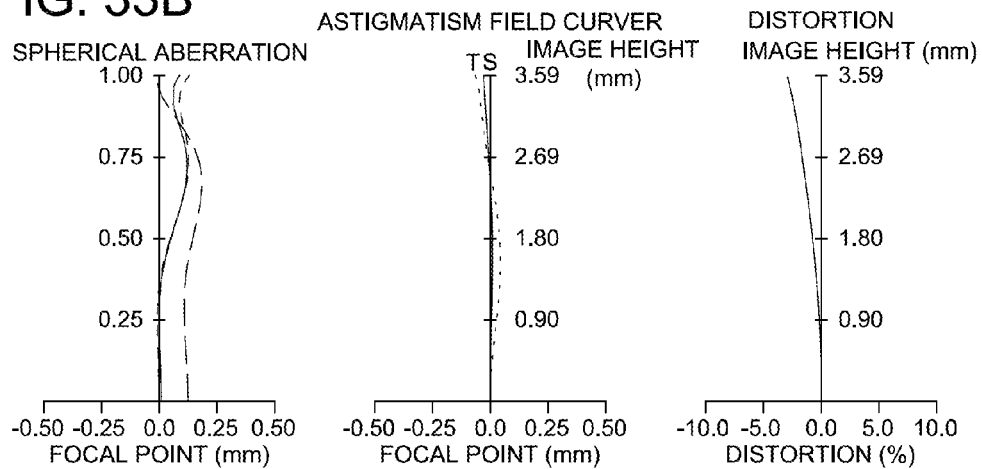
Figure 33C:
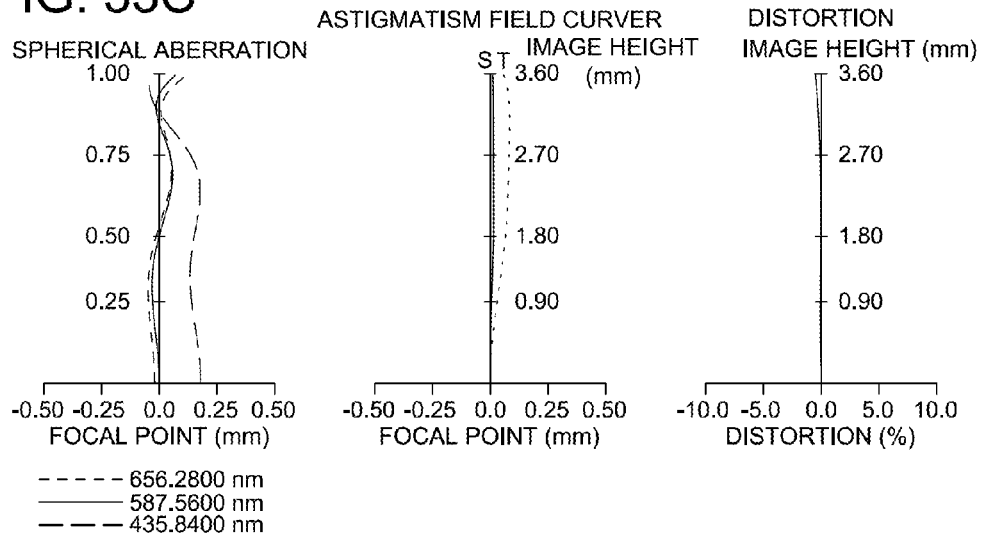

FIG. 18 is a cross-sectional view diagram showing an example of the arrangement of lens groups in a variable power optical system according to the Implementation Example 8. FIG. 19 is a diagram showing the form of movement of the different lens groups during power variation of a variable power optical system of the Implementation Example 8. FIG. 33 is an aberration diagram of a variable power optical system of the Implementation Example 8.

The variable power optical system 1H of the Implementation Example 8, as is shown in FIG. 18, is a negative-positive-negative three component zoom construction with the lens groups (Gr1, Gr2, and Gr3) arranged in sequence from the object side towards the image side to have, a first lens group (Gr1) having on the whole a negative optical power, a second lens group (Gr2) including an aperture opening ST and having on the whole a positive optical power, and a third lens group (Gr3) having on the whole a negative optical power, and at the time of zooming, as is shown in FIG. 19, the first lens group (Gr1) is fixed, while the second lens group (Gr2) and the third lens group (Gr3) both move. The aperture opening ST, as is shown in FIG. 18, moves along with the second lens group (Gr2).

In more concrete terms, the variable power optical system 1H of the Implementation Example 8 is constituted as follows with the different lens groups (Gr1, Gr2, and Gr3) arranged in sequence from the object side towards the image side as follows.

The first lens group (Gr1) is constituted from a negative meniscus lens (the first lens L1) that is convex on the object side, as a single negative lens. Both surfaces of the first lens L1 are aspherical surfaces.

The second lens group (Gr2) is constituted from a both sides convex positive lens (the second lens L2), an aperture opening ST, and a both sides convex positive lens (the third lens L3). In this manner, the second lens group (Gr2) includes an aperture opening ST, the aperture opening ST is placed between the second lens L2 and the third lens L3, and moves together with this second lens group (Gr2). The second lens L2 and the third lens L3 have aspherical surfaces on both sides.

The third lens group (Gr3) has, as the front group (Gr3f) a both sides concave negative lens (the fourth lens L4), and as the rear lens group (Gr3b) a both sides convex positive lens (the fifth lens L5). The fourth and fifth lenses L4 and L5 both have aspherical surfaces on both sides.

Further, on the image side of the third lens group (Gr3) is placed, via a parallel plate FT, the light receiving surface (imaging surface) of an imaging element SR The parallel plate FT is various types of optical filters, or the cover glass of the imaging element, etc.

In the variable power optical system 1H of this Implementation Example 8, at the time of varying the power from the wide angle end, through the middle point, to the telephoto end, as is shown in FIG. 19, the first lens group (Gr1) is fixed, the second lens group (Gr2) is moved in a curved manner so as to move towards the object (in a curve that is convex towards the object), and the third lens group (Gr3) is moved relatively gradually in a curved manner so as to move towards the object (in a curve that is convex towards the object), and the aperture opening ST moves along with the second lens group (Gr2). During this type of power variation from the wide angle end towards the telephoto end, the first group (Gr1) and the second group (Gr2), and the first group (Gr1) and the third group (Gr3) move so that their respective spacing becomes smaller, and the second group (Gr2) and the third group (Gr3) move so that their spacing becomes larger.

The construction data of the different lenses in the variable power optical system 1H of this Implementation Example 8 is given below.

Numerical Value Implementation Example 8

Unit mm

Surface data

| Surface number | r | d | nd | vd |
|---|---|---|---|---|
| Object surface | ∞ | ∞ | | |
| 1* | 31.0357 | 0.7000 | 1.74329 | 49.32 |
| 2* | 2.6500 | Variable | | |
| 3* | 3.0069 | 1.7119 | 1.58912 | 61.24 |
| 4* | −14.2690 | 0.9102 | | |
| 5 (Aperture) | ∞ | 0.3884 | | |
| 6* | 15.1698 | 1.4435 | 1.59201 | 67.02 |
| 7* | −2.8072 | Variable | | |
| 8* | −2.5624 | 0.6000 | 1.82114 | 24.05 |
| 9* | 43.7239 | 2.1862 | | |
| 10* | 13.3396 | 1.4254 | 1.82114 | 24.05 |
| 11* | −46.2959 | Variable | | |
| 12 | ∞ | 0.3000 | 1.51680 | 64.20 |
| 13 | ∞ | 0.3000 | | |
| Image surface | ∞ | | | |

-continued

Unit mm

Aspherical surface data

First surface

K = 0.00000e+000, A4 = 4.06344e−003, A6 = −1.77768e−004,
A8 = −5.00332e−006, A10 = 3.96545e−007
Second surface K = 0.00000e+000, A4 = 4.67428e−003, A6 = −1.87404e−004,
A8 = 2.19124e−004, A10 = −4.92291e−005
Third surface K = 0.00000e+000, A4 = −1.52289e−003, A6 = 1.42892e−004,
A8 = −5.51317e−005, A10 = −1.82257e−005
Fourth surface K = 0.00000e+000, A4 = 3.49270e−003, A6 = 5.88060e−005,
A8 = −3.65148e−004, A10 = 4.01074e−005
Sixth surface K = 0.00000e+000, A4 = −9.54990e−003, A6 = −1.82411e−002,
A8 = 1.11116e−002, A10 = −5.45217e−003
Seventh surface K = 0.00000e+000, A4 = −1.08040e−002, A6 = −5.85410e−003,
A8 = 2.26914e−003, A10 = −8.34719e−004
Eighth surface K = 0.00000e+000, A4 = −1.70307e−002, A6 = 1.19198e−002,
A8 = −1.34320e−003, A10 = −3.05345e−004
Ninth surface K = 0.00000e+000, A4 = −5.03318e−003, A6 = 8.86177e−003,
A8 = −1.98253e−003, A10 = 1.32628e−004
Tenth surface K = 0.00000e+000, A4 = −1.17859e−003, A6 = 1.03235e−004,
A8 = −6.24704e−006, A10 = −2.70616e−008
Eleventh surface K = 0.00000e+000, A4 = −6.19518e−004, A6 = −4.56551e−005,
A8 = 6.41247e−006, A10 = −5.35658e−007

Various data

Zoom data
Zoom ratio 2.73

| | Wide angle | Middle point | Telephoto |
|---|---|---|---|
| Focal distance | 3.469 | 6.751 | 9.482 |
| F-Number | 2.880 | 4.225 | 5.062 |
| Angle of view | 47.295 | 28.618 | 20.735 |
| Image height | 3.570 | 3.570 | 3.570 |
| Overall lens length | 15.567 | 15.545 | 15.532 |
| BF | 0.806 | 3.459 | 4.134 |
| d2 | 4.945 | 1.954 | 0.644 |
| d7 | 0.450 | 0.766 | 1.390 |
| d11 | 0.308 | 2.961 | 3.636 |

Zoom lens group data

| Group | Starting surface | Ending surface | Focal distance |
|---|---|---|---|
| 1 | 1 | 2 | −3.939 |
| 2 | 3 | 7 | 3.288 |
| 3 | 8 | 11 | −5.229 |

With the above lens placement and constitution, the spherical aberration (sine condition), astigmatism, and distortion in the imaging lens 1H of the Implementation Example 8 are shown in FIG. 33.

Implementation Example 9

Figure 20A:
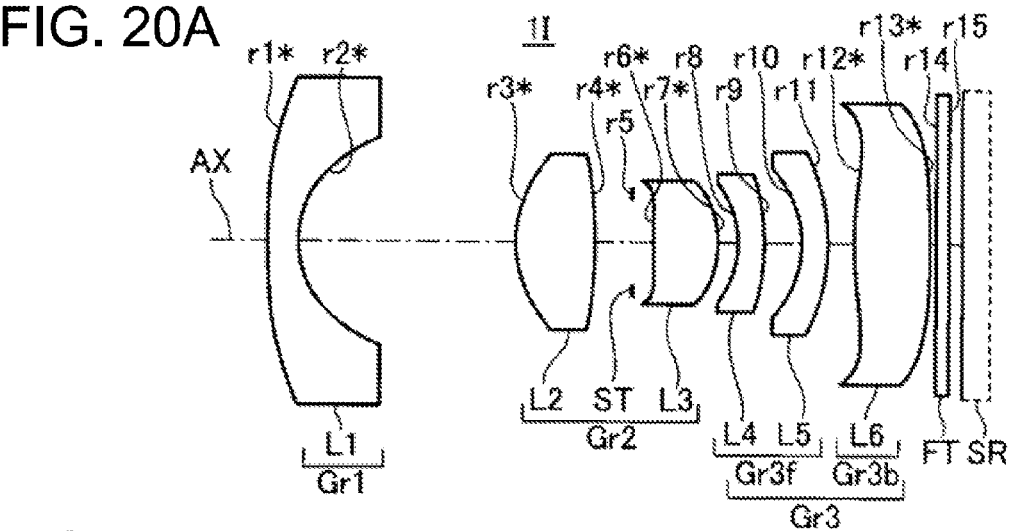
FIGS. 20A, 20B, and 20C are cross-sectional view diagrams showing an example of the arrangement of lens groups in a variable power optical system according to the Implementation Example 9.
Figure 20B:
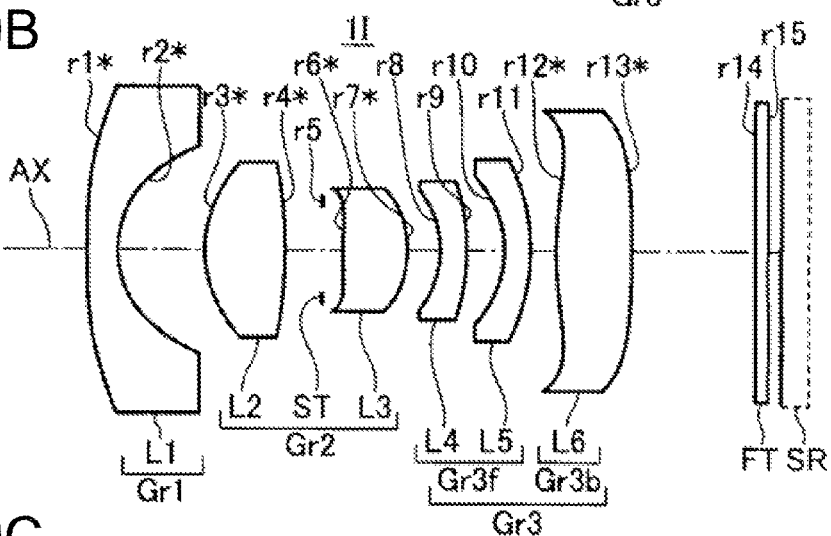
Figure 20C:
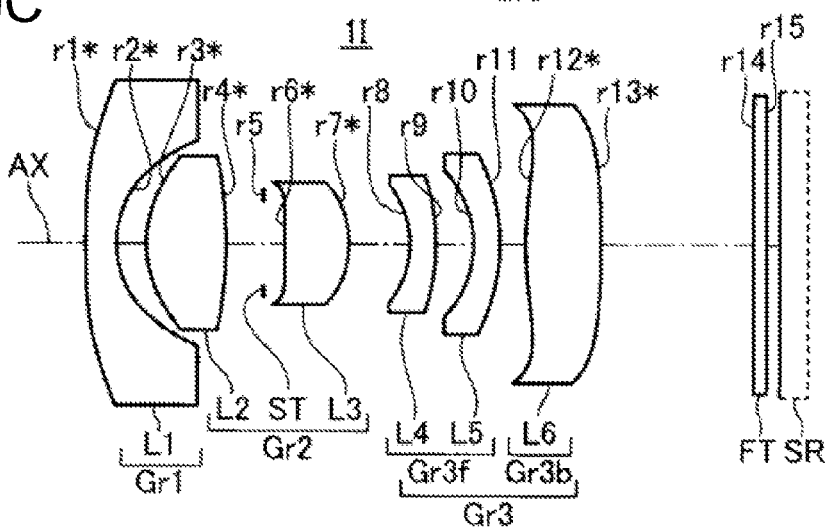
Figure 34A:
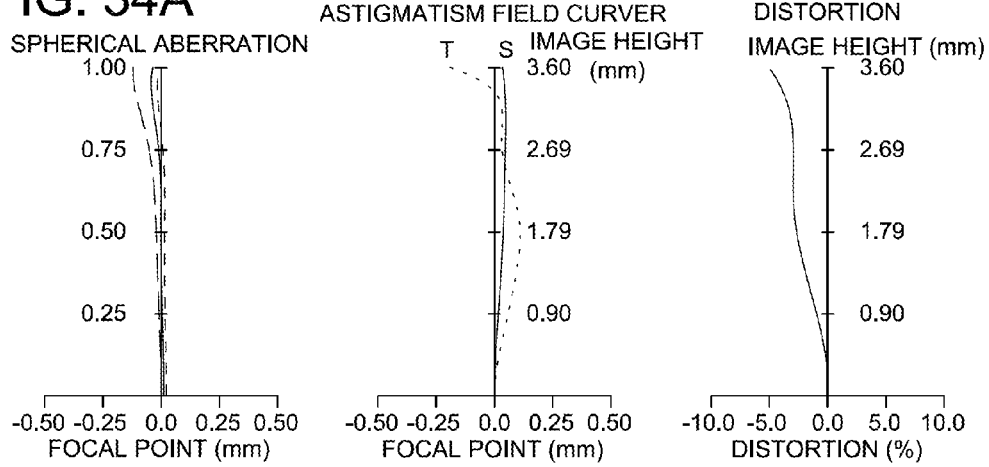
FIGS. 34A, 34B, and 34C are aberration diagrams of a variable power optical system of the Implementation Example 9.
Figure 34B:
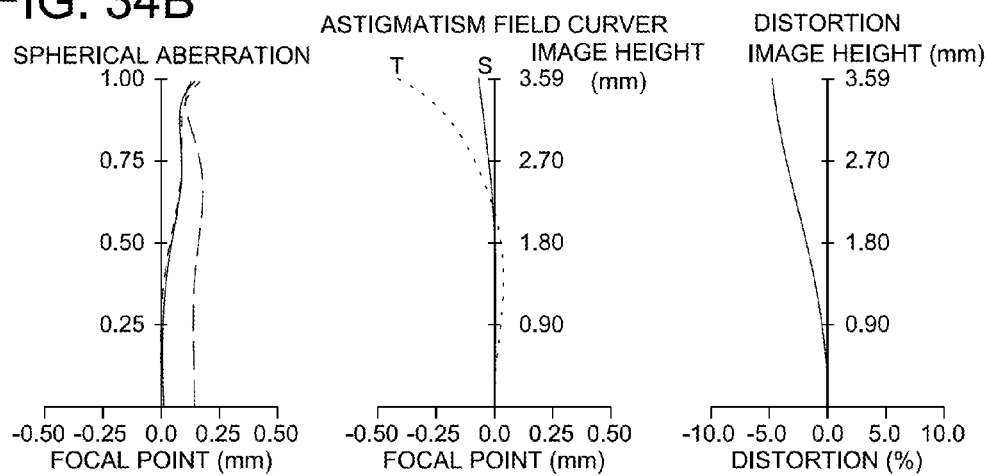
Figure 34C:
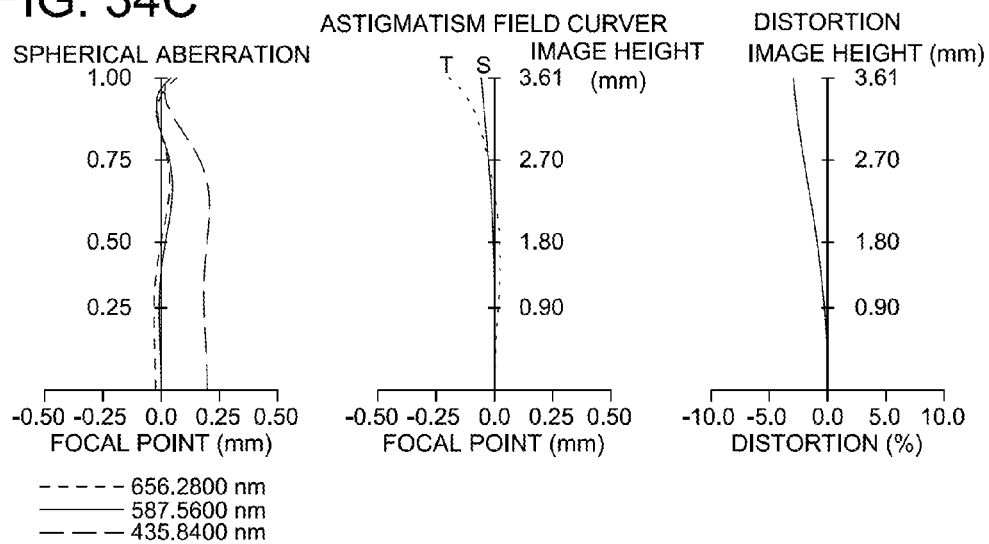

FIG. 20 is a cross-sectional view diagram showing an example of the arrangement of lens groups in a variable power optical system according to the Implementation Example 9. FIG. 21 is a diagram showing the form of movement of the different lens groups during power variation of a variable power optical system of the Implementation Example 9. FIG. 34 is an aberration diagram of a variable power optical system of the Implementation Example 9.

The variable power optical system 1I of the Implementation Example 9, as is shown in FIG. 20, is a negative-positive-negative three component zoom construction with the lens groups (Gr1, Gr2, and Gr3) arranged in sequence from the object side towards the image side to have, a first lens group (Gr1) having on the whole a negative optical power, a second lens group (Gr2) including an aperture opening ST and having on the whole a positive optical power, and a third lens group (Gr3) having on the whole a negative optical power, and at the time of zooming, as is shown in FIG. 21, the first lens group (Gr1) is fixed, while the second lens group (Gr2) and the third lens group (Gr3) both move. The aperture opening ST, as is shown in FIG. 20, moves along with the second lens group (Gr2).

In more concrete terms, the variable power optical system 1I of the Implementation Example 9 is constituted as follows with the different lens groups (Gr1, Gr2, and Gr3) arranged in sequence from the object side towards the image side as follows.

The first lens group (Gr1) is constituted from a negative meniscus lens (the first lens L1) that is convex on the object side, as a single negative lens. Both surfaces of the first lens L1 are aspherical surfaces.

The second lens group (Gr2) is constituted from a both sides convex positive lens (the second lens L2), an aperture opening ST, and a both sides convex positive lens (the third lens L3). In this manner, the second lens group (Gr2) includes an aperture opening ST, the aperture opening ST is placed between the second lens L2 and the third lens L3, and moves together with this second lens group (Gr2). The second lens L2 and the third lens L3 have aspherical surfaces on both sides.

The third lens group (Gr3) has, as the front group (Gr3f) a negative meniscus lens (the fourth lens L4) which is concave on the object side, and as the rear lens group (Gr3b) a negative meniscus lens (the fifth lens L5) which is concave on the object side, and a both sides convex positive lens (the sixth lens L6). The sixth lens L6 has aspherical surfaces on both sides.

Further, on the image side of the third lens group (Gr3) is placed, via a parallel plate FT, the light receiving surface (imaging surface) of an imaging element SR The parallel plate FT is various types of optical filters, or the cover glass of the imaging element, etc.

In the variable power optical system 1I of this Implementation Example 9, at the time of varying the power from the wide angle end, through the middle point, to the telephoto end, as is shown in FIG. 21, the first lens group (Gr1) is fixed, the second lens group (Gr2) is moved in a curved manner so as to move towards the object (in a curve that is convex towards the object), and the third lens group (Gr3) is moved relatively gradually in a curved manner so as to move towards the object (in a curve that is convex towards the object), and the aperture opening ST moves along with the second lens group (Gr2). During this type of power variation from the wide angle end towards the telephoto end, the first group (Gr1) and the second group (Gr2), and the first group (Gr1) and the third group (Gr3) move so that their respective spacing becomes smaller, and the second group (Gr2) and the third group (Gr3) move so that their spacing becomes larger.

The construction data of the different lenses in the variable power optical system 1I of this Implementation Example 9 is given below.

Numerical Value Implementation Example 9

Unit mm

Surface data

| Surface number | r | d | nd | vd |
|---|---|---|---|---|
| Object surface | ∞ | ∞ | | |
| 1* | 39.6920 | 0.7000 | 1.74329 | 49.32 |
| 2* | 2.6464 | Variable | | |
| 3* | 2.9569 | 1.8157 | 1.58912 | 61.24 |
| 4* | −11.1753 | 0.8411 | | |
| 5 (Aperture) | ∞ | 0.4790 | | |
| 6* | 25.3599 | 1.4623 | 1.59201 | 67.02 |
| 7* | −2.7300 | Variable | | |
| 8 | −2.4670 | 0.6000 | 2.00170 | 20.59 |
| 9 | −5.6445 | 0.8505 | | |
| 10 | −2.7456 | 0.6000 | 2.00170 | 20.59 |
| 11 | −5.0974 | 0.5894 | | |
| 12* | 9.4220 | 1.7149 | 1.81467 | 22.41 |
| 13 | −32.8590 | Variable | | |
| 14 | ∞ | 0.3000 | 1.51680 | 64.20 |
| 15 | ∞ | 0.3000 | | |
| Image surface | ∞ | | | |

Aspherical surface data

First surface

K = 0.00000e+000, A4 = 4.74570e−003, A6 = −1.90865e−004, A8 = −4.99066e−006, A10 = 3.62306e−007
Second surface K = 0.00000e+000, A4 = 4.80252e−003, A6 = −1.31168e−004, A8 = 2.44871e−004, A10 = −4.94571e−005
Third surface K = 0.00000e+000, A4 = −3.43021e−003, A6 = 1.81093e−004, A8 = −5.27130e−005, A10 = −1.36913e−005
Fourth surface K = 0.00000e+000, A4 = 1.93611e−003, A6 = 2.12138e−004, A8 = −2.70160e−004, A10 = 2.92300e−005
Sixth surface K = 0.00000e+000, A4 = −1.28537e−002, A6 = −1.45090e−002, A8 = 9.62833e−003, A10 = −5.73414e−003
Seventh surface K = 0.00000e+000, A4 = −1.00000e−002, A6 = −4.82247e−003, A8 = 1.48349e−003, A10 = −7.13851e−004
Twelfth surface K = 0.00000e+000, A4 = −4.43387e−003, A6 = 5.52296e−005, A8 = −1.09670e−005, A10 = −1.12433e−006
Thirteenth surface K = 0.00000e+000, A4 = −1.87455e−003, A6 = −1.26700e−004, A8 = 9.86027e−006, A10 = −1.04734e−006

Various data

Zoom data
Zoom ratio 2.73

| | Wide angle | Middle point | Telephoto |
|---|---|---|---|
| Focal distance | 3.288 | 6.402 | 8.966 |
| F-Number | 2.880 | 4.235 | 5.059 |
| Angle of view | 48.841 | 30.421 | 22.373 |
| Image height | 3.570 | 3.570 | 3.570 |
| Overall lens length | 15.680 | 15.656 | 15.644 |

Unit mm

| | | | |
|---|---|---|---|
| BF | 0.649 | 3.282 | 3.931 |
| d2 | 4.921 | 1.971 | 0.673 |
| d7 | 0.457 | 0.751 | 1.387 |
| d11 | 0.152 | 2.783 | 3.434 |

Zoom lens group data

| Group | Starting surface | Ending surface | Focal distance |
|---|---|---|---|
| 1 | 1 | 2 | −3.846 |
| 2 | 3 | 7 | 3.339 |
| 3 | 8 | 13 | −5.334 |

With the above lens placement and constitution, the spherical aberration (sine condition), astigmatism, and distortion in the imaging lens 1I of the Implementation Example 9 are shown in FIG. 34.

Implementation Example 10

Figure 35A:
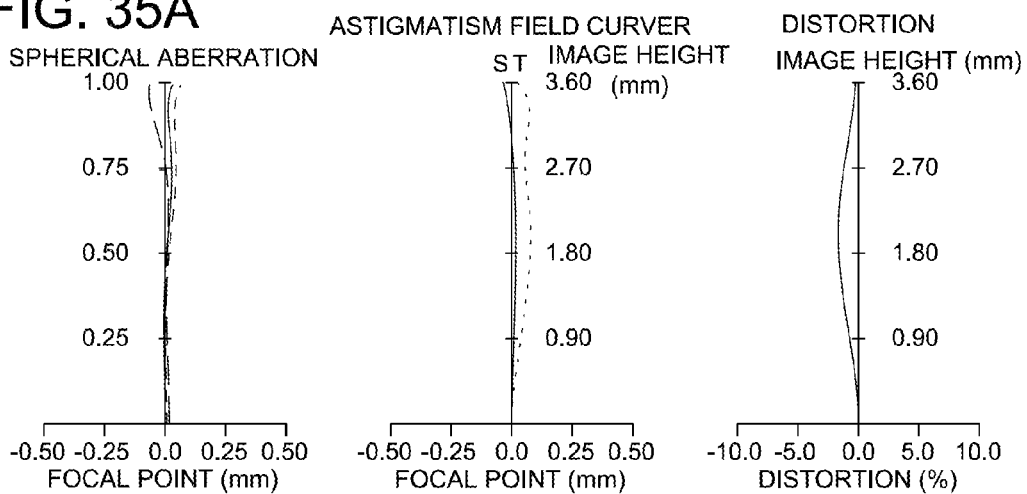
FIGS. 35A, 35B, and 35C are aberration diagrams of a variable power optical system of the Implementation Example 10.
Figure 35B:
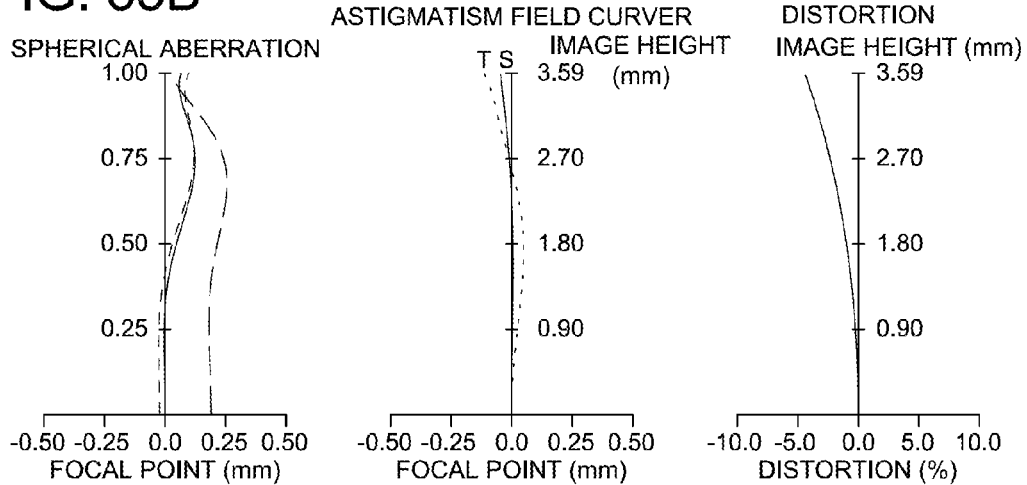
Figure 35C:
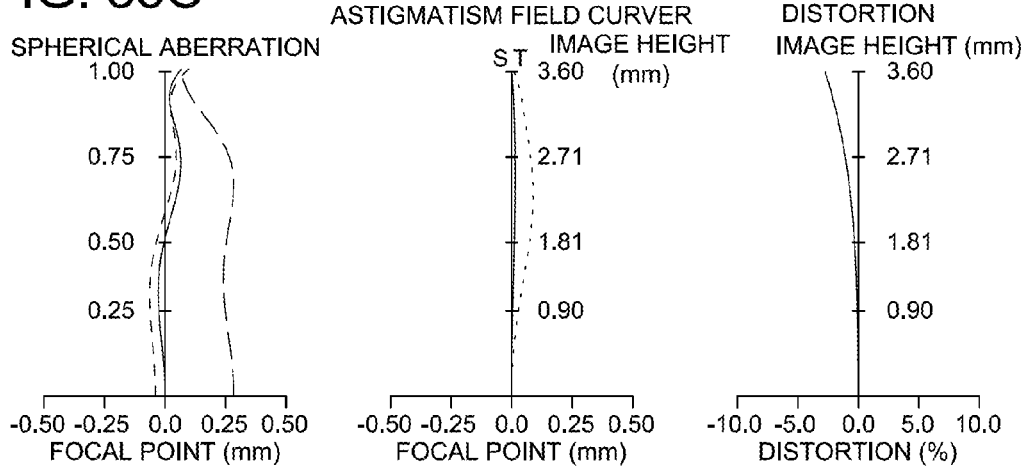

FIG. 22 is a cross-sectional view diagram showing an example of the arrangement of lens groups in a variable power optical system according to the Implementation Example 10. FIG. 23 is a diagram showing the form of movement of the different lens groups during power variation of a variable power optical system of the Implementation Example 10. FIG. 35 is an aberration diagram of a variable power optical system of the Implementation Example 10.

The variable power optical system 1J of the Implementation Example 10, as is shown in FIG. 22, is a negative-positive-negative three component zoom construction with the lens groups (Gr1, Gr2, and Gr3) arranged in sequence from the object side towards the image side to have, a first lens group (Gr1) having on the whole a negative optical power, a second lens group (Gr2) including an aperture opening ST and having on the whole a positive optical power, and a third lens group (Gr3) having on the whole a negative optical power, and at the time of zooming, as is shown in FIG. 23, the first lens group (Gr1) is fixed, while the second lens group (Gr2) and the third lens group (Gr3) both move. The aperture opening ST, as is shown in FIG. 22, moves along with the second lens group (Gr2).

In more concrete terms, the variable power optical system 1J of the Implementation Example 10 is constituted as follows with the different lens groups (Gr1, Gr2, and Gr3) arranged in sequence from the object side towards the image side as follows.

The first lens group (Gr1) is constituted from a negative meniscus lens (the first lens L1) that is convex on the object side, as a single negative lens. Both surfaces of the first lens L1 are aspherical surfaces.

The second lens group (Gr2) is constituted from a both sides convex positive lens (the second lens L2), an aperture opening ST, and a both sides convex positive lens (the third lens L3). In this manner, the second lens group (Gr2) includes an aperture opening ST, the aperture opening ST is placed between the second lens L2 and the third lens L3, and moves together with this second lens group (Gr2). The second lens L2 and the third lens L3 have aspherical surfaces on both sides.

The third lens group (Gr3) has, as the front group (Gr3f) a negative meniscus lens (the fourth lens L4) that is concave on the object side and a negative meniscus lens (the fifth lens L5) that is concave on the object side, and as the rear lens group (Gr3b), a both sides convex positive lens (the sixth lens L6).

One side each (the surface on the object side) of the fourth lens L4 and the fifth lens L5 is an aspherical surface. The sixth lens L6 has aspherical surfaces on both sides.

Further, on the image side of the third lens group (Gr3) is placed, via a parallel plate FT, the light receiving surface (imaging surface) of an imaging element SR The parallel plate FT is various types of optical filters, or the cover glass of the imaging element, etc.

In the variable power optical system 1J of this Implementation Example 10, at the time of varying the power from the wide angle end, through the middle point, to the telephoto end, as is shown in FIG. 23, the first lens group (Gr1) is fixed, the second lens group (Gr2) is moved in a curved manner so as to move towards the object (in a curve that is convex towards the object), and the third lens group (Gr3) is moved relatively gradually in a curved manner so as to move towards the object (in a curve that is convex towards the object), and the aperture opening ST moves along with the second lens group (Gr2). During this type of power variation from the wide angle end towards the telephoto end, the first group (Gr1) and the second group (Gr2), and the first group (Gr1) and the third group (Gr3) move so that their respective spacing becomes smaller, and the second group (Gr2) and the third group (Gr3) move so that their spacing becomes larger.

The construction data of the different lenses in the variable power optical system 1J of this Implementation Example 10 is given below.

Numerical Value Implementation Example 10

| Unit mm | | | | |
|---|---|---|---|---|
| Surface data | | | | |
| Surface number | r | d | nd | vd |
| Object surface | ∞ | ∞ | | |
| 1* | 27.2351 | 0.7000 | 1.74329 | 49.32 |
| 2* | 2.7879 | Variable | | |
| 3* | 2.9657 | 1.9092 | 1.58912 | 61.24 |
| 4* | −9.5923 | 0.8658 | | |
| 5 (Aperture) | ∞ | 0.3703 | | |
| 6* | 26.9866 | 1.3709 | 1.59201 | 67.02 |
| 7* | −2.9700 | Variable | | |
| 8* | −2.8130 | 0.6000 | 1.99683 | 20.82 |
| 9 | −136.6789 | 0.5773 | | |
| 10* | −9.3166 | 0.7496 | 1.74926 | 24.52 |
| 11 | −12.3350 | 1.1741 | | |
| 12* | 12.4606 | 1.8106 | 1.98996 | 21.15 |
| 13* | −1445.888 | Variable | | |
| 14 | ∞ | 0.3000 | 1.51680 | 64.20 |
| 15 | ∞ | 0.3000 | | |
| Image surface | ∞ | | | |

Aspherical surface data

First surface

K = 0.00000e+000, A4 = 4.21776e−003, A6 = −1.66415e−004, A8 = −5.21394e−006, A10 = 3.50020e−007
Second surface K = 0.00000e+000, A4 = 5.09199e−003, A6 = −6.11707e−005, A8 = 1.64833e−004, A10 = −3.51411e−005
Third surface K = 0.00000e+000, A4 = −2.36920e−003, A6 = 8.39052e−005, A8 = −2.64407e−005, A10 = −1.59758e−005

-continued

| Unit mm |
|---|
| Fourth surface |

K = 0.00000e+000, A4 = 4.43020e−003, A6 = 1.43378e−004, A8 = −2.77549e−004, A10 = 2.71469e−005
Sixth surface K = 0.00000e+000, A4 = −6.43075e−003, A6 = −1.50037e−002, A8 = 8.24496e−003, A10 = −4.07997e−003
Seventh surface K = 0.00000e+000, A4 = −1.22504e−002, A6 = −4.46868e−003, A8 = 1.52961e−003, A10 = −6.58218e−004
Eighth surface K = 0.00000e+000, A4 = −2.52125e−002, A6 = 6.45131e−003, A8 = 5.13176e−004, A10 = −3.14722e−004
Tenth surface K = 0.00000e+000, A4 = 1.57000e−002, A6 = −5.50692e−003, A8 = 5.54627e−004, A10 = −6.39857e−005
Twelfth surface K = 0.00000e+000, A4 = −4.88553e−003, A6 = 2.03789e−004, A8 = 1.10458e−005, A10 = −7.98793e−007
Thirteenth surface K = 0.00000e+000, A4 = −2.66149e−003, A6 = −8.67757e−005, A8 = 1.38722e−005, A10 = −4.87221e−007

| Various data | | | |
|---|---|---|---|
| Zoom data Zoom ratio 2.73 | | | |
| | Wide angle | Middle point | Telephoto |
| Focal distance | 3.762 | 7.294 | 10.268 |
| F-Number | 2.880 | 4.278 | 5.171 |
| Angle of view | 43.572 | 27.159 | 19.720 |
| Image height | 3.570 | 3.570 | 3.570 |
| Overall lens length | 16.140 | 16.112 | 16.094 |
| BF | 0.600 | 3.238 | 3.959 |
| d2 | 4.961 | 1.985 | 0.646 |
| d7 | 0.452 | 0.762 | 1.362 |
| d13 | 0.102 | 2.740 | 3.460 |

| Zoom lens group data | | | |
|---|---|---|---|
| Group | Starting surface | Ending surface | Focal distance |
| 1 | 1 | 2 | −4.230 |
| 2 | 3 | 7 | 3.301 |
| 3 | 8 | 13 | −4.853 |

With the above lens placement and constitution, the spherical aberration (sine condition), astigmatism, and distortion in the imaging lens 1J of the Implementation Example 9 are shown in FIG. 35.

Implementation Example 11

Figure 24A:
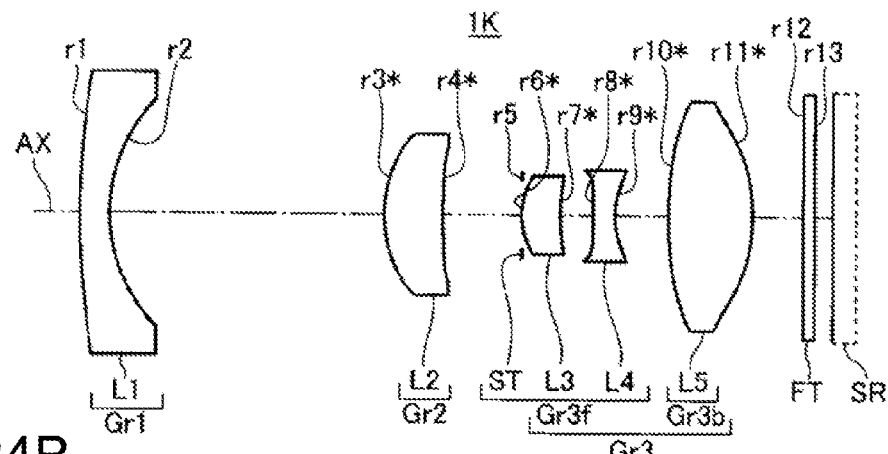
FIGS. 24A, 24B, and 24C are cross-sectional view diagrams showing an example of the arrangement of lens groups in a variable power optical system according to the Implementation Example 11.
Figure 24B:
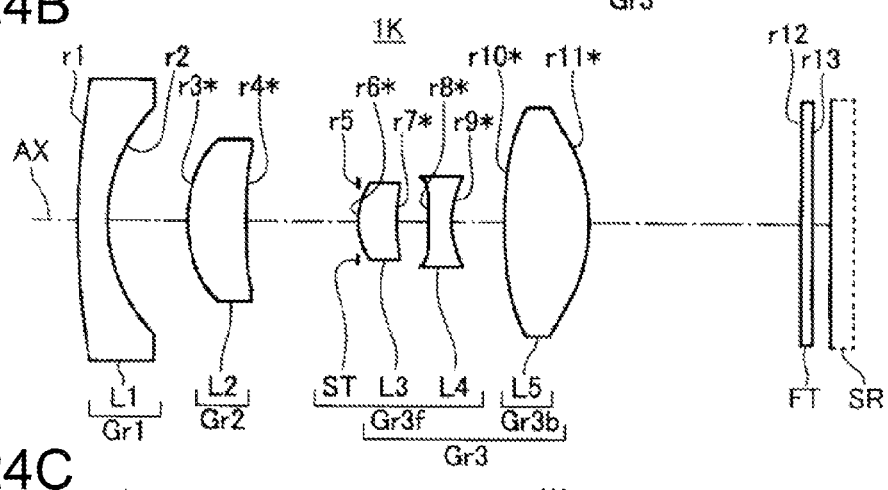
Figure 24C:
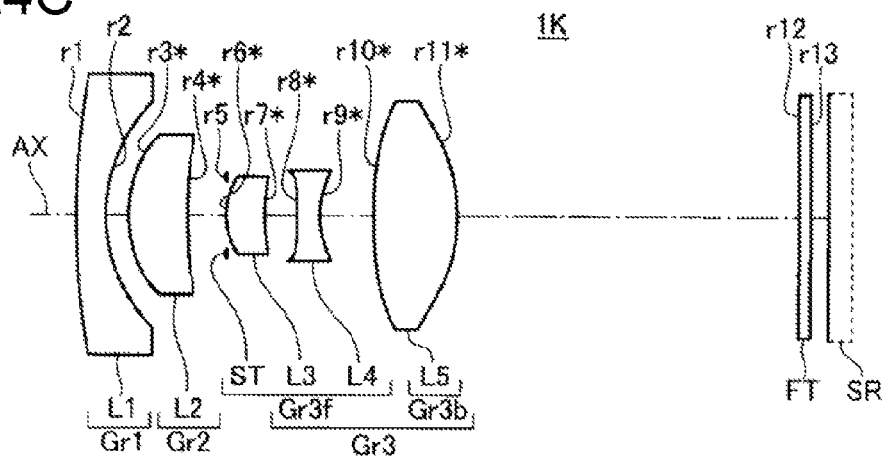
Figure 36A:
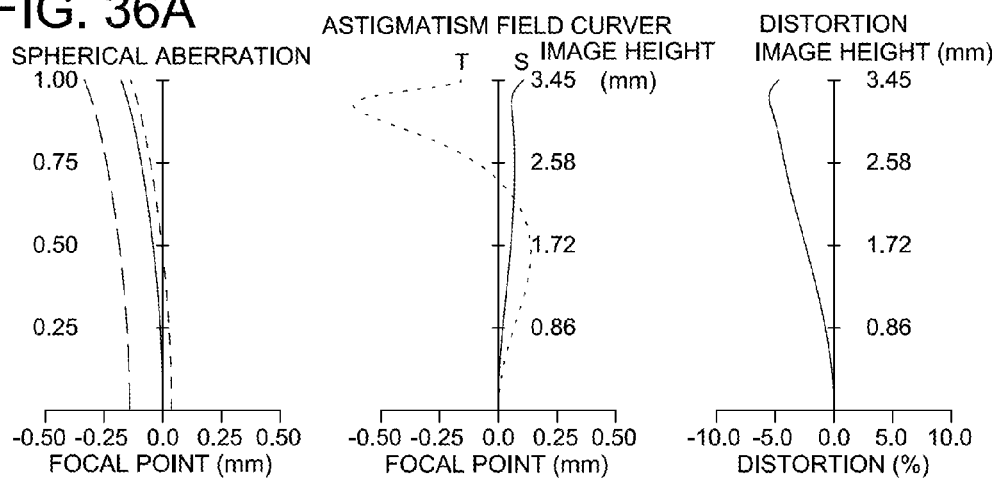
FIGS. 36A, 36C, and 36C are aberration diagrams of a variable power optical system of the Implementation Example 11.
Figure 36B:
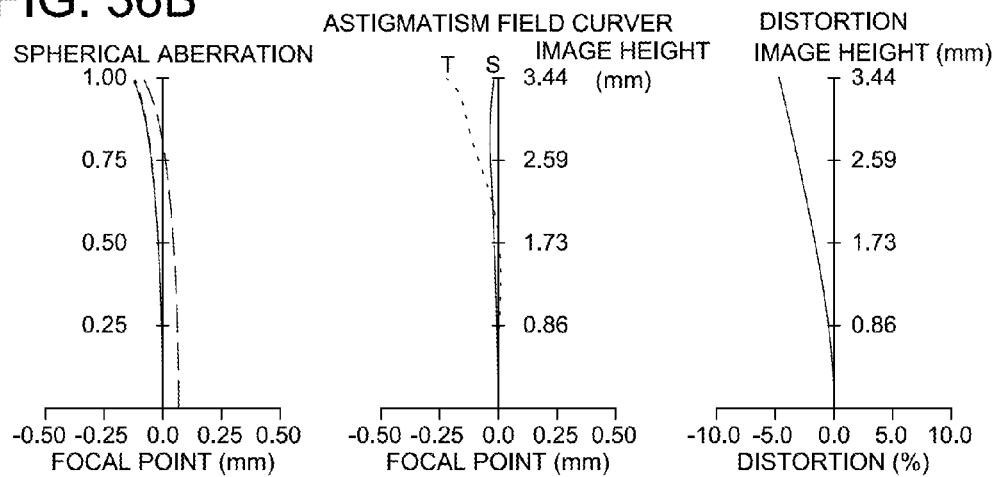
Figure 36C:
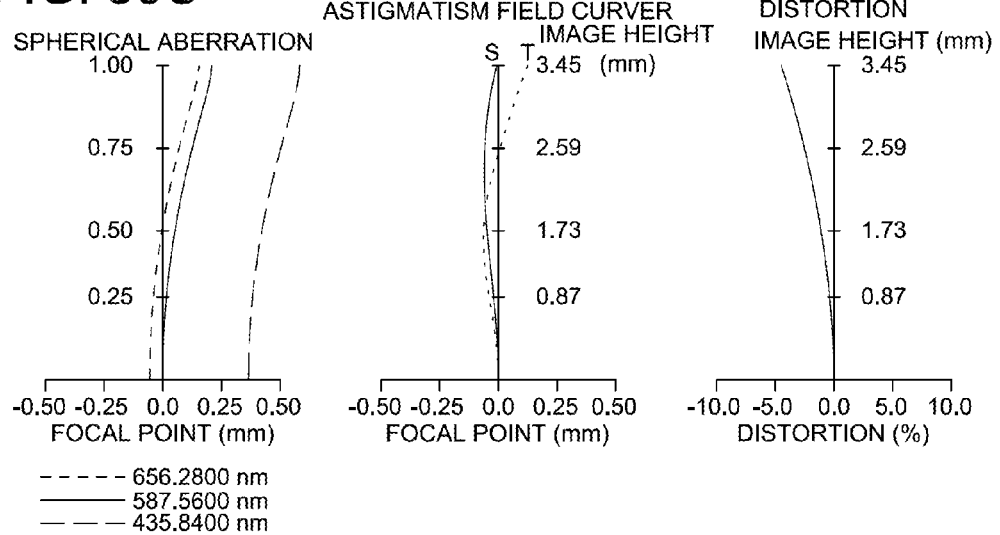

FIG. 24 is a cross-sectional view diagram showing an example of the arrangement of lens groups in a variable power optical system according to the Implementation Example 11. FIG. 25 is a diagram showing the form of movement of the different lens groups during power variation of a variable power optical system of the Implementation Example 11. FIG. 36 is an aberration diagram of a variable power optical system of the Implementation Example 11.

The variable power optical system 1K of the Implementation Example 11, as is shown in FIG. 24, is a negative-positive-negative three component zoom construction with the lens groups (Gr1, Gr2, and Gr3) arranged in sequence from the object side towards the image side to have, a first lens group (Gr1) having on the whole a negative optical power, a second lens group (Gr2) having on the whole a positive optical power, and a third lens group (Gr3) including an aperture opening ST and having on the whole a negative optical power, and at the time of zooming, as is shown in FIG. 25, the first lens group (Gr1) is fixed, while the second lens group (Gr2) and the third lens group (Gr3) both move. The aperture opening ST, as is shown in FIG. 24, moves along with the third lens group (Gr3).

In more concrete terms, the variable power optical system 1K of the Implementation Example 11 is constituted as follows with the different lens groups (Gr1, Gr2, and Gr3) arranged in sequence from the object side towards the image side as follows.

The first lens group (Gr1) is constituted from a negative meniscus lens (the first lens L1) that is convex on the object side, as a single negative lens. Both surfaces of the first lens L1 are aspherical surfaces.

The second lens group (Gr2) is constituted from a positive meniscus lens (the second lens L2) that is convex on the object side. The second lens L2 has aspherical surfaces on both sides.

The third lens group (Gr3) has, an aperture opening ST, as the front group (Gr3$f$) a positive meniscus lens (the third lens L3) which is convex on the object side and a both sides concave negative lens (the fourth lens L4), and as the rear lens group (Gr3$b$), a both sides convex positive lens (the fifth lens L5). In this manner, the third lens group (Gr3) includes an aperture opening ST, the aperture opening ST is placed on the object side of the third lens L3, and moves together with this third lens group (Gr3). Both sides of the third lens L3, the fourth lens L4, and the fifth lens L5 are aspherical surfaces, and the fifth lens L5, for example, is a lens made of a plastic material.

Further, on the image side of the third lens group (Gr3) is placed, via a parallel plate FT, the light receiving surface (imaging surface) of an imaging element SR The parallel plate FT is various types of optical filters, or the cover glass of the imaging element, etc.

In the variable power optical system 1K of this Implementation Example 11, at the time of varying the power from the wide angle end, through the middle point, to the telephoto end, as is shown in FIG. 25, the first lens group (Gr1) is fixed, the second lens group (Gr2) is moved in a curved manner so as to move towards the object (in a curve that is convex towards the object), and the third lens group (Gr3) is moved in a curved manner so as to move towards the object (in a curve that is convex towards the object), and the aperture opening ST moves along with the second lens group (Gr2). During this type of power variation from the wide angle end towards the telephoto end, the first group (Gr1) and the second group (Gr2), and the first group (Gr1) and the third group (Gr3) move so that their respective spacing becomes smaller, and the second group (Gr2) and the third group (Gr3), after moving at the middle point temporarily so that the spacing between them becomes smaller, move again so that their respective spacing becomes larger.

The construction data of the different lenses in the variable power optical system 1K of this Implementation Example 11 is given below.

Numerical Value Implementation Example 11

| Unit mm | | | | |
|---|---|---|---|---|
| Surface data | | | | |
| Surface number | r | d | nd | vd |
| Object surface | ∞ | ∞ | | |
| 1 | 24.1406 | 0.8000 | 1.85000 | 40.03 |
| 2 | 4.8437 | Variable | | |
| 3* | 3.9385 | 1.5655 | 1.53048 | 55.72 |
| 4* | 21.9017 | Variable | | |
| 5 (Aperture) | ∞ | 0.0000 | | |
| 6* | 2.1411 | 1.0187 | 1.55989 | 43.15 |
| 7* | 6.3667 | 0.8591 | | |
| 8* | 126.8910 | 0.6000 | 1.79850 | 22.59 |
| 9* | 2.4313 | 1.4168 | | |
| 10* | 14.0519 | 2.2338 | 1.62913 | 57.13 |
| 11* | −5.7438 | Variable | | |
| 12 | ∞ | 0.3000 | 1.51680 | 64.20 |
| 13 | ∞ | 0.5000 | | |
| Image surface | ∞ | | | |

Aspherical surface data

Third surface

K = 0.00000e+000, A4 = −2.16013e−003, A6 = 1.18630e−003, A8 = −1.79126e−004, A10 = 2.95581e−005

Fourth surface

K = 0.00000e+000, A4 = −3.08874e−003, A6 = 2.35627e−003, A8 = −3.53501e−004, A10 = 6.77048e−005

Sixth surface

K = 0.00000e+000, A4 = 8.88847e−004, A6 = 5.21710e−004, A8 = −7.36543e−004, A10 = 1.27051e−005

Seventh surface

K = 0.00000e+000, A4 = 7.23018e−003, A6 = −4.51061e−003, A8 = −5.73410e−003, A10 = 5.57955e−004

Eighth surface

K = 0.00000e+000, A4 = −2.30240e−002, A6 = −1.51543e−002, A8 = −9.17182e−003, A10 = −2.64712e−003

Ninth surface

K = 0.00000e+000, A4 = −6.78390e−003, A6 = −1.36949e−002, A8 = −2.08024e−003, A10 = 1.75925e−003

Tenth surface

K = 0.00000e+000, A4 = 1.12840e−003, A6 = −1.66988e−004, A8 = 8.44998e−005, A10 = −5.28425e−006

Eleventh surface

K = 0.00000e+000, A4 = −2.97572e−003, A6 = 2.92814e−004, A8 = −6.99552e−005, A10 = 1.28303e−005

| Various data | | | |
|---|---|---|---|
| Zoom data Zoom ratio 2.73 | | | |
| | Wide angle | Middle point | Telephoto |
| Focal distance | 4.749 | 9.215 | 12.942 |
| F-Number | 4.019 | 5.702 | 7.100 |
| Angle of view | 37.400 | 21.507 | 15.678 |
| Image height | 3.450 | 3.450 | 3.450 |
| Overall lens length | 19.928 | 19.891 | 19.835 |
| BF | 2.064 | 6.322 | 9.709 |
| d2 | 7.272 | 2.117 | 0.608 |

-continued

| Unit mm | | | |
|---|---|---|---|
| d4 | 2.098 | 2.958 | 1.024 |
| d11 | 1.336 | 5.624 | 9.011 |

Zoom lens group data

| Group | Starting surface | Ending surface | Focal distance |
|---|---|---|---|
| 1 | 1 | 2 | −7.267 |
| 2 | 3 | 4 | 8.787 |
| 3 | 5 | 11 | 11.680 |

With the above lens placement and constitution, the spherical aberration (sine condition), astigmatism, and distortion in the imaging lens 1K of the Implementation Example 11 are shown in FIG. 36.

The respective values when the conditional equations (1) to (12) are applied to the variable power optical systems 1A to 1K of the Implementation Examples 1 to 11 described above are given in Table 1 and Table 2.

TABLE 1

| | Implementation Example 1 | Implementation Example 2 | Implementation Example 3 | Implementation Example 4 | Implementation Example 5 | Implementation Example 6 |
|---|---|---|---|---|---|---|
| (1) f2/\|f3\| | 0.57 | 0.38 | 0.53 | 0.56 | 0.64 | 0.77 |
| (2) Da/D3 | 0.49 | 0.47 | 0.42 | 0.41 | 0.47 | 0.47 |
| (3) \|f3\|/fw | 1.34 | 2.00 | 1.47 | 1.45 | 1.38 | 1.04 |
| (4) \|f1\|/fw | 1.13 | 1.11 | 1.14 | 1.12 | 1.10 | 2.48 |
| (5) ν1 | 49.62 | 44.92 | 51.57 | 51.82 | 49.33 | 70.44 |
| (6) r12/fw | 0.72 | 0.72 | 0.68 | 0.69 | 0.72 | 3.09 |
| (7) \|f1\|/f3\| | 0.85 | 0.55 | 0.77 | 0.77 | 0.79 | 2.38 |
| (8) \|f1\|/f2 | 1.48 | 1.45 | 1.47 | 1.37 | 1.23 | 3.08 |
| (9) f2/fw | 0.77 | 0.76 | 0.78 | 0.81 | 0.89 | 0.80 |
| (10) 2 ωw | 76.59 | 77.66 | 96.33 | 93.74 | 92.41 | 59.24 |
| (11) T1/(fw × ft)$^{0.5}$ | 0.10 | 0.10 | 0.13 | 0.12 | 0.12 | 0.06 |
| (12) TL/2Y' | 2.55 | 2.59 | 1.85 | 1.82 | 1.99 | 2.63 |

TABLE 2

| | Implementation Example 7 | Implementation Example 8 | Implementation Example 9 | Implementation Example 10 | Implementation Example 11 |
|---|---|---|---|---|---|
| f2/\|f3\| | 0.40 | 0.63 | 0.63 | 0.68 | 0.75 |
| Da/D3 | 0.71 | 0.52 | 0.20 | 0.24 | 0.23 |
| \|f3\|/fw | 2.25 | 1.51 | 1.62 | 1.29 | 2.46 |
| \|f1\|/fw | 1.81 | 1.14 | 1.17 | 1.12 | 1.53 |
| ν1 | 81.61 | 49.32 | 49.33 | 49.32 | 40.03 |
| r12/fw | 2.34 | 0.76 | 0.80 | 0.74 | 1.02 |
| \|f1\|/f3\| | 0.80 | 0.75 | 0.72 | 0.87 | 0.62 |
| \|f1\|/f2 | 2.01 | 1.20 | 1.15 | 1.28 | 0.83 |
| f2/fw | 0.90 | 0.95 | 1.02 | 0.88 | 1.85 |
| 2 ωw | 62.14 | 94.59 | 97.68 | 87.14 | 74.80 |
| T1/(fw × ft)$^{0.5}$ | 0.06 | 0.12 | 0.13 | 0.11 | 0.10 |
| TL/2Y' | 2.34 | 2.18 | 2.20 | 2.26 | 2.89 |

As has been explained above, the variable power optical systems 1A to 1K of the Implementation Examples 1 to 11, as a result of satisfying the requirements of the present invention, while having a relatively high power ratio of about 2 to 3 and realizing compactness, are improving satisfactorily compared to the prior art the tele-centric characteristics, the difference of the angle of incidence to the imaging element, and the different aberrations. Further, the variable power optical systems 1A to 1K of the Implementation Examples 1 to 11, achieve sufficient compactness for installing in a digital device, particularly in a portable terminal, and also, it is possible to adopt an imaging element 16 with a large number of pixels.

Further, in the above Implementation Examples 1 to 11, although variable power optical systems 1A to 1K have shown that the optical power varies in a continuous manner, in order to make them still more compact, they can also be a variable power optical system 1 with the same optical construction but switching between two focal lengths.

As has been described above, according to the present invention, a variable power optical system has a first lens group having a negative optical power, a second lens group having a positive optical power, and a third lens group having negative optical power, the first lens group is constituted from a single negative lens and is fixed during power variation, the third lens group is constituted to have, not only at least one aspherical surface, but also a front group (Gr3f) having negative optical power and a rear group (Gr3b) having a positive optical power. Because of this, it is possible to provide a variable power optical system, which can, while achieving a relatively high power ratio and compactness, correct better compared to prior art the tele-centric characteristics, the difference in the angle of incidence to the imaging element, as well as the different aberrations such as spherical aberration, chromatic aberration, astigmatism, and distortion, etc., and to provide an imaging device and a digital device.

In order to realize the present invention, while the present invention was described appropriately as well as sufficiently in the above through preferred embodiments referring to drawings, it should be recognized that any person in the field can easily make modified forms of implementation or improved forms of the preferred embodiments described above. Therefore, any modified forms of implementation or improved forms made by any person in the field, as long as they are not of the level that deviates from the scope of rights of the scope of the claims described in the claims, shall be considered to be included within the scope of rights of the scope of these claims.

The invention claimed is:

1. A variable power optical system comprising, in order from an object side toward an image side thereof, a first lens group having a negative optical power, a second lens group having a positive optical power and a third lens group, wherein said first lens group is composed of a single negative lens, and is fixed when varying the power of the variable power optical system, and wherein said third lens group comprises at least one aspherical surface, and the group is divided into a front group and a rear group with the largest air space within the group, wherein said front group has a negative optical power, and said rear group has a positive optical power, and wherein said second lens group has an aperture opening within the group, and when varying the optical power of the variable power optical system the aperture opening moves integrally with said second lens group.

2. The variable power optical system of claim 1, wherein said third lens group satisfies the following conditional expression (2):

$$0.3 < Da/D3 < 0.8 \qquad (2)$$

where, Da is the maximum lens spacing within said third lens group, and D3 is, in said third lens group, a distance from a most object side surface to a most image side surface.

3. The variable power optical system of claim 2, wherein said third lens group has a negative optical power as a whole and satisfies the following conditional expression (3):

$$1 < |f3|/fw < 3 \qquad (3)$$

where, f3 is a composite focal length of said third lens group, and fw is a composite focal length of the entire system at a wide-angle end.

4. The variable power optical system of claim 1, wherein that said first lens group satisfies the following conditional expression (4):

$$1 < |f1|/fw < 1.5 \qquad (4)$$

where, f1 is a composite focal length of said first lens group, and fw is a composite focal length of the entire system at a wide-angle end.

5. The variable power optical system of claim 1, wherein said negative lens of said first lens group is a negative meniscus lens having a convex surface on its object side.

6. The variable power optical system of claim 1, wherein a surface on an image side of said negative lens of said first lens group satisfies the following conditional expression (6):

$$0.6 < r12/fw < 0.8 \qquad (6)$$

where, r12 is a radius of curvature of a surface on an image side of said negative lens of said first lens group, and fw is a composite focal length of the entire system at a wide-angle end.

7. The variable power optical system of claim 1, wherein said first lens group and said third lens group satisfy the following conditional expression (7):

$$0.5 < |f1/f3| < 1 \qquad (7)$$

where, f1 is a composite focal length of said first lens group, and f3 is a composite focal length of said third lens group.

8. The variable power optical system of claim 1, wherein said third lens group is composed of one negative lens and one positive lens.

9. The variable power optical system of claim 1, wherein said first lens group and said second lens group satisfy the following conditional expression (8):

$$1.2 < |f1|/f2 < 3.2 \qquad (8)$$

where, f1 is a composite focal length of said first lens group, and f2 is a composite focal length of said second lens group.

10. The variable power optical system of claim 1, wherein said second lens group satisfies the following conditional expression (9):

$$0.7 < f2/fw < 1 \qquad (9)$$

where, f2 is a composite focal length of said second lens group, and fw is a composite focal length of the entire system at a wide-angle end.

11. The variable power optical system of claim 1, wherein said second lens group comprises at least two positive lenses.

12. The variable power optical system of claim 1, wherein said third lens group has a negative optical power as a whole and the variable power optical system consists of three groups of said first to third lens groups.

13. The variable power optical system of claim 1, wherein when varying the power of the variable power optical system only two lens groups of said three lens groups are movable.

14. An imaging device with the feature that, it is provided with the variable power optical system of claim 1, and an imaging element that converts optical images to electrical signals, and said variable power optical system can form an optical image of the object on the light receiving surface of said imaging element.

15. A digital device with the feature that, it is provided with the imaging device according to claim 14 and a control section that can make said imaging device to carry out at least one of still image photography or movie photography of the object of photography, and said variable power optical system of said imaging device is assembled so that an optical image of said object of photography can be formed on the light receiving surface of said imaging element.

16. A variable power optical system comprising, in order from an object side toward an image side thereof, a first lens group having a negative optical power, a second lens group having a positive optical power and a third lens group, wherein said first lens group is composed of a single negative lens, and is fixed when varying the power of the variable power optical system, and wherein said third lens group comprises at least one aspherical surface, and the group is divided into a front group and a rear group with the largest air space within the group, wherein said front group has a negative optical power, and said rear group has a positive optical power, wherein said negative lens of said first lens group satisfies the following conditional expression (5):

$$40 < v1 \qquad (5)$$

where, v1 is the Abbe number of said negative lens of said first lens group.

17. A variable power optical system comprising, in order from an object side toward an image side thereof, a first lens group having a negative optical power, a second lens group having a positive optical power and a third lens group, wherein said first lens group is composed of a single negative lens, and is fixed when varying the power of the variable power optical system, and wherein said third lens group comprises at least one aspherical surface, and the group is divided into a front group and a rear group with the largest air space within the group, wherein said front group has a negative optical power, and said rear group has a positive optical power, wherein focusing is made using said second lens group or said third lens group.

* * * * *